(12) United States Patent
Tanoue et al.

(10) Patent No.: US 8,167,474 B2
(45) Date of Patent: May 1, 2012

(54) SURFACE LIGHT SOURCE DEVICE

(75) Inventors: Yasuhiro Tanoue, Otsu (JP); Gouo Kurata, Kusatsu (JP); Masayuki Shinohara, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 13/162,106

(22) Filed: Jun. 16, 2011

(65) Prior Publication Data

US 2011/0286237 A1 Nov. 24, 2011

Related U.S. Application Data

(63) Continuation of application No. PCT/JP2009/006439, filed on Nov. 27, 2009.

(30) Foreign Application Priority Data

Dec. 16, 2008 (JP) ................................. 2008-320321

(51) Int. Cl.
*F21V 7/04* (2006.01)

(52) U.S. Cl. ......... 362/607; 362/619; 362/621; 362/625

(58) Field of Classification Search .......... 362/606–609, 362/615, 617–628
See application file for complete search history.

(56) References Cited

U.S. PATENT DOCUMENTS

| | | | | |
|---|---|---|---|---|
| 6,053,619 | A * | 4/2000 | Nakamura et al. | 362/609 |
| 7,188,989 | B2 * | 3/2007 | Miyashita | 362/621 |
| 7,607,814 | B2 * | 10/2009 | Destain | 362/609 |
| 7,740,387 | B2 * | 6/2010 | Schultz et al. | 362/606 |

FOREIGN PATENT DOCUMENTS

| | | |
|---|---|---|
| JP | 5-53111 A | 3/1993 |
| JP | 10507306 T | 7/1998 |
| JP | 2002109939 A | 4/2002 |
| JP | 2003215349 A | 7/2003 |
| JP | 2003-272428 A | 9/2003 |
| JP | 2004-69751 A | 3/2004 |
| JP | 2005165199 A | 6/2005 |
| JP | 3828402 B2 | 10/2006 |
| JP | 2008091287 A | 4/2008 |
| JP | 2008198460 A | 8/2008 |
| WO | 2010-070821 A1 | 6/2010 |

OTHER PUBLICATIONS

International Search Report w/translation from PCT/JP2009/006439 dated Feb. 16, 2010 (4 pages).
Written Opinion from PCT/JP2009/006439 dated Feb. 23, 2010 (3 pages).

* cited by examiner

*Primary Examiner* — Thomas Sember
(74) *Attorney, Agent, or Firm* — Osha • Liang LLP

(57) ABSTRACT

A light guide plate is formed of a light introducing part positioned to face a point light source for confining light and a light guide plate body having a thickness smaller than the thickness of an end of the light introducing part on a point light source side and causing the confined light to be output from a light exit surface to outside. The light introducing part has an inclined surface, and a directivity conversion pattern formed on the inclined surface. The directivity conversion pattern is configured by arranging V grooves in parallel to each other, each having a vertical angle of 120°, and each extends in a direction approximately perpendicular to a light incidence end face of the light guide plate. The length of the inclined surface in a inclination direction where part of light incident to the light introducing part enters the inclined surface at least twice.

5 Claims, 52 Drawing Sheets

PRIOR ART

PRIOR ART

FIG.4

| | acrylic resin | polycarbonate resin |
|---|---|---|
| refractive index: n | 1.49 | 1.59 |
| height of tapered part: T (mm) | 4.10 | 4.10 |
| maximum incident angle: α (°) | 42.16 | 38.97 |
| inclination angle of tapered part: θ (°) | 2.84 | 6.03 |
| length of inclined surface: X (mm) | 7.10 | 6.11 |
| height difference of inclined surface: Y (mm) | 0.35 | 0.65 |
| thickness of light guide plate body: t (mm) | 3.75 | 3.45 |

PRIOR ART

PRIOR ART

PRIOR ART

PRIOR ART

PRIOR ART

SURFACE LIGHT SOURCE DEVICE

BACKGROUND OF INVENTION

1. Technical Field

One or more embodiments of the present invention relate to a surface light source device and, more particularly to the structure of a surface light source device for letting light efficiently enter a light guide plate thinner than the thickness of a light source.

2. Background Art

FIG. 1 is a schematic diagram of a conventional liquid-crystal display device using an edge-light type surface light source device. This liquid-crystal display device 11 is configured of a surface light source device 12 and a liquid crystal panel 15.

In the surface light source device 12, a point light source 18 using an LED is disposed so as to face an end face (a light incidence surface) of a light guide plate 17 molded of transparent resin, a diffusion plate 13 and two prism sheets 14 are stacked on an upper surface (a light exit surface) of the light guide plate 17, and a reflecting plate 16 faces a lower surface of the light guide plate 17. Note that the point light source 18 is implemented on a substrate 20. The liquid crystal panel 15 is disposed on one of the prism sheets 14 via a rim sheet 19 (a black frame).

As such, light emitting from the point light source 18 enters the light guide plate 17 from the end face thereof, spreads to be propagated through the light guide plate 17, and exits from an approximately entire upper surface of the light guide plate 17. The light exiting from the upper surface of the light guide plate 17 is transmitted through a diffusion plate 13 and a prism sheet 14 to illuminate the liquid crystal panel 15 from its rear surface. Also, light leaking from a lower surface of the light guide plate 17 is reflected from the reflecting plate 16 to return to the inside of the light guide plate 17 again for reuse.

In this surface light source device 12, in addition to uniform luminance, high luminance and low cost, furthermore a large light-emitting area (an area other than the light exit surface is small) and thin thickness are desired. In particular, when incorporated in a portable device, the surface light source device 12 has been increasingly desired to be made thinner, as the portable device is made thinner.

The size of each component of a surface light source device generally used is as follows.

Sum of the thicknesses of the substrate and the point light source: 600 μm

Height of the light exit window of the point light source: 300 μm

Thickness of the prism sheet: 62 μm (per sheet)

Thickness of the diffusion plate: 55 μm

Thickness of the light guide plate: 250 μm to 650 μm

Thickness of the reflecting plate: 60 μm

Thickness of the rim sheet: 55 μm

Thus, the thickness of the surface light source device is on the order of 600 μm on a point light source side, and approximately 489 μm to 889 μm on a light guide plate side even when the thickness of a rim sheet is excluded. Therefore, the thickness on a light guide plate side occupying most of the area of the surface light source device is desired to be made thinner.

Most of the thickness of the surface light source device is occupied by the light guide plate. However, if the thickness of the light guide plate is made thinner than the height of a light exit window (a light-emitting window) of the point light source, light not incident to the light guide plate of light exiting from the point light source is increased, and light use efficiency of the surface light source device is decreased. For this reason, the thickness of the light guide plate is restricted by the height of the light exit window of the point light source, and it is difficult to make the thickness of the light guide plate thinner than the height of the light exit window of the point light source. Similarly, when the light source is a cold-cathode-fluorescent tube, it is difficult to make the thickness of the light guide plate thinner than a diameter of a cold-cathode-fluorescent tube.

(Regarding Patent Document 1)

FIG. 2 is a side view of a liquid-crystal display device 21 disclosed in Japanese Unexamined Patent Application Publication No. 1993-53111 (Patent Document 1). In a surface light source device 22 for use in this liquid-crystal display device 21, to efficiently let light from a fluorescent tube 23 enter a light guide plate having a thickness thinner than that of the fluorescent tube 23, a tapered part 25 is provided at a thin portion of the light guide plate, that is, at an end of a light guide plate body 24. An end face of the tapered part 25 has a height approximately equal to the diameter of the fluorescent tube 23, and the fluorescent tube 23 faces that end face. And, the light entering from the end face of the tapered part 25 is totally reflected from front and rear surfaces of the tapered part 25 to be guided to the light guide plate body 24, and is output from an upper surface of the light guide plate body 24 toward a liquid crystal panel 26.

The surface light source device 22 disclosed in Patent Document 1 discloses guiding the light of the fluorescent tube 23 to the light guide plate without leakage. For this purpose, the height of the end face of the tapered part 25 is made approximately equal to the diameter of the fluorescent tube 23, thereby introducing the light of the fluorescent tube 23 into the tapered part 25 without leakage. However, in this surface light source device 22, leakage of light in the tapered part 25 cannot be prevented. For this reason, light leaking from the tapered part 25 is viewed brightly from an observer's side, and the edge of a display part (a screen) of the liquid-crystal display device 21 emits light with high luminance, thereby degrading the quality of the display part.

The reason why leakage of light from the tapered part 25 cannot be prevented in the structure of the surface light source device 22 as described above is described by using FIG. 3. Now, consider light that tends to leak most at the tapered part 25. If this light that tends to leak most can be prevented, this means no leakage of light at the tapered part 25. The light that tends to leak most is a light beam L having the largest incident angle $\alpha$ among light beams output from the fluorescent tube 23 and entering the tapered part 25. Therefore, consider a structure in which the light beam L having the largest incident angle $\alpha$ measured from a direction perpendicular to the end face of the tapered part 25 does not leak at the tapered part 25 and the thickness of the light guide plate body 24 can be made as thin as possible. To find the structure as described above, as depicted in FIG. 3, a condition can be thought for the light beam L having the maximum incident angle $\alpha$ being totally reflected at an upper end (a point A) of the inclined surface of the tapered part 25, being totally reflected again at a point B on a lower surface of the light guide plate, and then being reflected from an upper surface (at a point C) of the light guide plate body 24 adjacent to the tapered part 25. Note that, in FIG. 3, a flat short part is depicted at the end face portion of the tapered part 25, but this is merely for convenience of representation, and its length can be thought to be short to infinity.

First, the maximum incident angle α of the light beam incident to the light guide plate is determined by $$\sin \alpha = 1/n \quad \text{(Equation 1)}$$

(where n is a refractive index of the light guide plate).

An incident angle at which this light beam L having the largest incident angle α enters the point A having an inclination angle θ in the tapered part 25 is 90°−θ−α, and therefore the condition of the light beam being totally reflected from the inclined surface is $$\theta \leq 90° - 2\alpha \quad \text{(Equation 2)}.$$

Also, an incident angle at which the light totally reflected at the point A enters the lower surface of the tapered part 25 is 90°−2θ−α, and therefore the condition of the light beam being totally reflected at the point B on the lower surface is $$\theta \leq 45° - \alpha \quad \text{(Equation 3)}.$$

If this Equation 3 is satisfied, the light totally reflected at the point B is also totally reflected at a point C of the light guide plate body 24.

Therefore, from Equation 2 and Equation 3, for the light beam L to be totally reflected at the point A, the point B and the point C, it can be found that $$\theta \leq 45° - \alpha \quad \text{(Equation 4)}$$

is satisfied. However, if the inclination angle θ of the tapered part 25 is small, the light totally reflected at the upper end of the inclined surface of the tapered part 25 and then totally reflected from the lower surface of the light guide plate again enters the inclined surface of the tapered part 25 to possibly leak from the tapered part 25. Moreover, if the inclination angle θ is small, the length of the tapered part 25 is long. Therefore, the inclination angle θ may be as long as possible within a range of satisfying Equation 4. Therefore, the inclination angle θ is assumed to have a value as large as possible within a limit of satisfying Equation 4. That is, $$\theta = 45° - \alpha \quad \text{(Equation 5)}$$

And, when the height of the end face of the tapered part 25 is T, the length of the tapered part 25 is X, and a height difference of the inclined surface of the tapered part 25 is Y, the length X and the height difference Y of the tapered part 25 are, from FIG. 3, $$X = T\cot(\alpha+2\theta) + (T-Y)\cot(\alpha+2\theta) = (2T-Y)\cot(\alpha+2\theta),$$

$$Y = X\tan\theta.$$

These are solved for X and Y, and when Equation 5 is used, the following Equation 6 and Equation 7 hold.

[Equation 1]

$$X = \frac{2a(1+a) \times T}{1+2a-a^2} \quad \text{(Equation 6)}$$

$$Y = \frac{2a(1-a) \times T}{1+2a-a^2} \quad \text{(Equation 7)}$$

where
$a = \tan \alpha = \tan(45° - \theta)$

Also, a thickness t of the light guide plate body 24 is represented by the next Equation 8.

[Equation 2]

$$t = T - Y = \frac{(1+a^2) \times T}{1+2a-a^2} \quad \text{(Equation 8)}$$

As a light guide plate material, acrylic resin or polycarbonate resin (PC resin), both of which are typical materials for light guide plates, is assumed. When a refractive index of the light guide plate is taken for calculation as
n=1.49 (in the case of acrylic resin) or
n=1.59 (in the case of polycarbonate resin),
the maximum incident angle α is, from Equation 1,
α=42.16° (in the case of acrylic resin) or
α=38.97° (in the case of polycarbonate resin).
From Equation 3, the inclination angle θ of the tapered part 25 is
θ=2.84° (in the case of acrylic resin) or
θ=6.03° (in the case of polycarbonate resin).

Also, in Patent Document 1, the height of the end face of the tapered part 25 is described as T=4.10 mm. Thus, by using this value of the height T and the value of a above, from Equation 6 to Equation 8, the length X and the height difference Y of the tapered part 25 and a thickness t of the light guide plate body 24 areas follows. When the light guide plate material is acrylic resin, T=4.10 mm and α=42.16° (α=tan α=0.91), and therefore
X=7.10 mm,
Y=0.35 mm, and
t=3.75 mm.

Similarly, when the light guide plate material is polycarbonate resin, T=4.10 mm and α=38.97° (α=tan α=0.81), and therefore
X=6.11 mm,
Y=0.65 mm, and
t=3.45 mm.

FIG. 4 summarizes the calculation results as described above.

According to FIG. 4, the thickness t of the light guide plate body 24 is 3.75 mm (in the case of acrylic resin) or 3.45 mm (in the case of polycarbonate resin). By contrast, in the liquid-crystal display device 21 disclosed in Patent Document 1, it is described that, while the height of the end face of the tapered part 25 is T=4.10 mm, the thickness of the light guide plate body 24 is t=2.2 mm. This value t=2.2 mm is considerably thinner than the value of the thickness t found by the above calculation (in FIG. 4), and therefore light always leaks from the tapered part 25.

Therefore, in the surface light source device 22 disclosed in Patent Document 1, it is impossible to prevent light from leaking form the tapered part 25. Or, in the surface light source device 22 disclosed in Patent Document 1, at least leakage of light from the tapered part 25 is not considered at all.

(Regarding Patent Document 2)

FIG. 5 is a perspective view of a surface light source device disclosed in FIG. 1 of Japanese Unexamined Patent Application Publication No. 2004-69751 (Patent Document 2). In this surface light source device 31, a cone-shaped light guiding part 33 is provided at an end of a light guide sheet 32, and a point light source 35 is disposed so as to face an end face (a light receiving part 34) of the light guiding part 33. Also in this surface light source device 31, the point light source 35 and the light receiving part 34 of the light guiding part 33 are approximately equal in height to each other, and light from the point light source 35 enters into the light guiding part 33 to be guided to the light guide sheet 32.

The surface light source device 31 disclosed in Patent Document 2 discloses guiding the light of the point light source 35 to the light guide sheet 32 without leakage. For this purpose, the height of the light receiving part 34 is approximately equal to the height of the point light source 35 and, with the tapered part of the light guiding part 33, light of the point light source 35 is guided to the light guide sheet 32 without leakage. However, even in this surface light source device 31, leakage of light in the cone-shaped light guiding part 33 cannot be prevented. For this reason, light leaking from the light guiding part 33 is viewed brightly from an observer's side, and the edge of a display part (a screen) of the liquid-crystal display device emits light with high luminance, thereby degrading the quality of the display part.

FIG. 6 is a diagram depicting a section of the light guiding part 33 and the light guide sheet 32 cut along a vertical plane passing an axial center of the light guiding part 33. By using FIG. 6, the fact that leakage of light from the light guiding part 33 cannot be prevented even in the surface light source device 31 of Patent Document 2 will be described. In the surface light source device 31 of Patent Document 2, because acrylic resin is used as the light guide plate material, a maximum incident angle $\alpha$ of a light beam L entering the light guiding part 33 is $\alpha=42.16°$ from FIG. 4. At this time, an inclination angle $\theta$ of the front surface of the light guiding part 33 is $\theta=2.84°$. However, in the surface light source device 31 of Patent Document 2, because a height T of the light receiving part 34 is 0.3 mm and a thickness t of the light guide sheet 32 is 0.1 mm, when the inclination angle of the light guiding part 33 is $\theta=2.84°$, the length of the light guiding part 33 is $X=2.2$ mm. Thus, as depicted in FIG. 6, light totally reflected from the upper end of one inclined surface of the light guiding part 33 enters the other inclined surface at an incident angle of $$90°-(\alpha+30)=39.32°.$$

Because this incident angle of 39.32° is an angle smaller than a critical angle (42.16° of total reflection, the light beam L entering the other inclined surface leaks to outside as depicted in FIG. 6.

Therefore, in the surface light source device 31 disclosed in Patent Document 2, although light can be confined to some extent, but approximately several tens of percent of light leaks from the light guiding part 33, and leaked light lights up brightly on the display surface to degrade the quality of the liquid-crystal display device. Also, in Patent Document 2, prevention of this leakage of light is not considered at all. Moreover, in the surface light source device 31 of Patent Document 2, the end face of the cone-shaped light guiding part 33 and the point light source 35 are disposed so as to face each other. Thus, the position of the light guiding part 33 in the light guide sheet 32 has to be changed depending on the position or size of the point light source 35, and therefore the device lacks versatility.

(Regarding Patent Document 3)

FIG. 7 is a partially-cut-out perspective view of a surface light source device disclosed in Japanese Patent No. 3828402 (Patent Document 3). In this surface light source device 41, a diffusion plate 43 and two prism sheets 44 and 45 are stacked on a light guide plate 42, and a plurality of point light sources 46 are disposed so as to face a light incidence end face of the light guide plate 42. On upper and lower surfaces of a region along the light incidence end face of the light guide plate 42, a plurality of optical directivity diffusion elements 47 extending in a direction perpendicular to the light incidence end face are provided, letting light entering from the point light sources 46 be transmitted along a flat surface of the light guide plate 42 as being diffused along the flat surface. Furthermore, on the upper and lower surfaces of the light guide plate 42, a plurality of dots 48 are provided to let light guided inside the light guide plate 42 exit to outside.

This surface light source device 41 can mitigate a glow of light with high luminance leaking from near the point light sources. In this surface light source device 41, however, the light guide plate 42 has a uniform thickness as a whole. Thus, if incident efficiency of light of each light source is intended not to be decreased, the thickness of the light guide plate 42 cannot be made thinner than the height of the light-emitting surface of the light source.

(Regarding Patent Document 4)

FIG. 8 is a perspective view of a surface light source device disclosed in Japanese Unexamined Patent Application Publication No. 2003-272428 (Patent Document 4). In this surface light source device 51, a plurality of light sources 53 are disposed so as to face a light incidence end face of a light guide plate 52, and a step surface 54 perpendicular to an upper surface of the light guide plate 52 is formed in a zigzag shape so as to face a upper half surface of the light incidence end face, thereby increasing the thickness of the light guide plate 52 on a light incidence end face side and decreasing the thickness of a main part of the light guide plate 52 away from the light incidence end face.

In the above-structured surface light source device 51, light entering from the upper half surface of the light incidence end face to the inside of the light guide plate 52 is regressively reflected from the step surface 54 to return to the incident end face and, by being reflected from the incident end face, the light is guided to a region of the light guide plate having a thin thickness. Thus, the surface light source device can be made thinner, and light use efficiency can be increased.

However, in this surface light source device 51, as depicted in FIG. 9A, depending on the incident angle to the step surface 54, light L is not totally reflected from the step surface 54 to leak to outside and become a loss. Even when a reflecting member 55 is provided to face the step surface 54, part of the leaked light L is absorbed in the reflecting member 55 to become a loss. Moreover, as depicted in FIG. 9B, the light L regressively reflected from part of the step surface 54 partially returns to the inside of the light source 53, and is absorbed by a packaged of the light source 53 to become a loss. For this reason, in the surface light source device 51, light use efficiency is low, although the light guide plate can be made thinner.

Still further, in this surface light source device 51, the zigzag shape of the step surface 54 is required to be formed so as to match the position of each of the light sources 53. When the number or position of the light sources 53 is changed, the light guide plate 52 is required to be redesigned or recreated. Still further, in this surface light source device 51, the shape of the light guide plate 52 is complex and difficult to manufacture.

CITATION LIST

Patent Documents

Patent Document 1: Japanese Unexamined Patent Application Publication No. 1993-53111
Patent Document 2: Japanese Unexamined Patent Application Publication No. 2004-69751
Patent Document 3: Japanese Patent No. 3828402
Patent Document 4: Japanese Unexamined Patent Application Publication No. 2003-272428

SUMMARY OF THE INVENTION

One or more embodiments of the present invention may provide a surface light source device in which an end face of a light introducing part has a thickness approximately equal to the height of a light exit window of a point light source, thereby allowing light to be guided to a light guide plate thinner compared with the height of the light exit window of the point light source, in which leakage of light from the light introducing part is more decreased to increase light use efficiency and the device has a light guide plate shape that is easy to manufacture.

A surface light source device according to one or more embodiments of the present invention include a light source and a light guide plate introducing light of the light source from a light incidence surface and letting the light exit to outside from the light exit surface, the light source being provided at a position where a light-emitting surface thereof faces the light incidence surface of the light guide plate, the light guide plate including a light introducing part for confining the light from the light source entering from the light incidence surface and a light guide plate body having a thickness smaller than a maximum thickness of the light introducing part, being provided so as to continue to the light introducing part, and letting the confined light exit to outside from the light exit surface by light emitting means, a ratio of the thickness of the light guide plate body with respect to the maximum thickness of the light introducing part being equal to or lower than 0.8, the light introducing part having an inclined surface inclined from a surface of a part having a thickness larger than the light guide plate body toward an end of a surface of the light guide plate body, the inclined surface being on a surface on a light exit side of the light guide plate or a surface opposite thereto, an inclination angle of the inclined surface being larger than an inclination angle formed with a line segment connecting an upper end of the inclined surface and an end of a surface opposite to the inclined surface of the light guide plate body on a side away from the light source in a vertical section of the inclined surface along a maximum inclination direction, and is smaller than 90°, the light guide plate having a directivity conversion pattern on the surface on the light exit side or the surface opposite thereto, the directivity conversion pattern for converting a directivity spread of the light entering the light introducing part in a thickness direction of the light guide plate to a directivity characteristic inclined toward a direction parallel to a surface direction of the light guide plate, the inclined surface and the directivity conversion pattern are disposed so that a part of the light entering the light introducing part is reflected simultaneously or alternately from the inclined surface and the directivity conversion pattern to be guided in the light guide plate, and a length of the inclined surface in an inclined direction being defined so that a part of the light entering the light introducing part enters the inclined surface at least twice.

The inclination angle of the inclined surface is decreased so that light in the light introducing part does not leak from the inclined surface when entering the inclined surface for a first time. When the thickness of the light guide plate body is made thinner, light entering the inclined surface for a second time occurs, and the light is prone to leak from the inclined surface when entering for the second time. By contrast, one or more embodiments of the present invention has the structure described above. Therefore, by being reflected from the directivity conversion pattern, the light entering for the second time can be made less prone to leak from the inclined surface, thereby improving efficiency of the surface light source device.

In the surface light source device according to one or more embodiments of the present invention, the directivity conversion pattern is formed on the inclined surface, and an inclination angle frequency distribution of the directivity conversion pattern in a region positioned between an upper end edge and a lower end edge of the inclined surface and having a width equal to the light-emitting surface of the light source has a frequency in a range of inclination angles equal to or larger than 15.5° and equal to or smaller than 43.5° occupying 50% or more of a total. Note that the width of the light-emitting surface of the light source is a light-emitting width of the light source itself, and not the width of an LED chip or the like. According to one or more embodiments, efficiency of the surface light source device having a directivity conversion pattern formed on the inclined surface can be increased.

In the surface light source device according to one or more embodiments of the present invention, the directivity conversion pattern is formed on a surface opposite to the inclined surface of the light guide plate, and an inclination angle frequency distribution of the directivity conversion pattern in a region between a position shifted from the upper end of the inclined surface to a side opposite to the light source by $T \cdot \tan(90° - \alpha - 2\theta)$ and a position shifted from a lower end of the inclined surface to the side opposite to the light source by $t \cdot \tan(90° - \alpha - 2\theta)$ (where T is a maximum thickness of the light introducing part, and t is a thickness of the light guide plate body, $\alpha$ is a critical angle of total reflection of a light guide plate material, and $\theta$ is the inclination angle of the inclined surface) when viewed from a direction perpendicular to the light exit surface, and the region also having a width equal to the light-emitting surface of the light source, has a frequency in a range of inclination angles equal to or larger than 15.5° and equal to or smaller than 43.5° occupying 50% or more of a total. According to one or more embodiments of the present invention, efficiency of the surface light source device having a directivity conversion pattern formed on a surface opposite to the surface where the inclined surface of the light guide plate is provided can be increased.

In the surface light source device according to one or more embodiments of the present invention, the directivity conversion pattern has a depth and height constant with respect to a surface of the inclined surface. According to one or more embodiments, the light amount emitted from the light source and not entering the light introducing part to become a loss can be reduced, thereby improving light use efficiency.

In the surface light source device according to one or more embodiments of the present invention, the directivity conversion pattern is formed of recessed or projecting unit patterns, and when viewed from a direction perpendicular to the light exit surface, the unit patterns extend in a direction perpendicular to the light incident surface and are arranged in parallel to each other in a direction parallel to the light-emitting surface. According to one or more embodiments, light entering from the light incident surface can be guided approximately straight as it is. Also, the directivity conversion pattern can be easily fabricated.

Note that one or more embodiments of the present invention have features obtained by combining components described above as appropriate, and one or more embodiments of the present invention can have many variations by combining these components.

BRIEF DESCRIPTION OF THE DRAWINGS

FIG. 4 depicts an example of design of the surface light source device of FIG. 2.

DETAILED DESCRIPTION

One or more embodiments of the present invention are described with reference to the attached drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

First Embodiment

Figure 1:
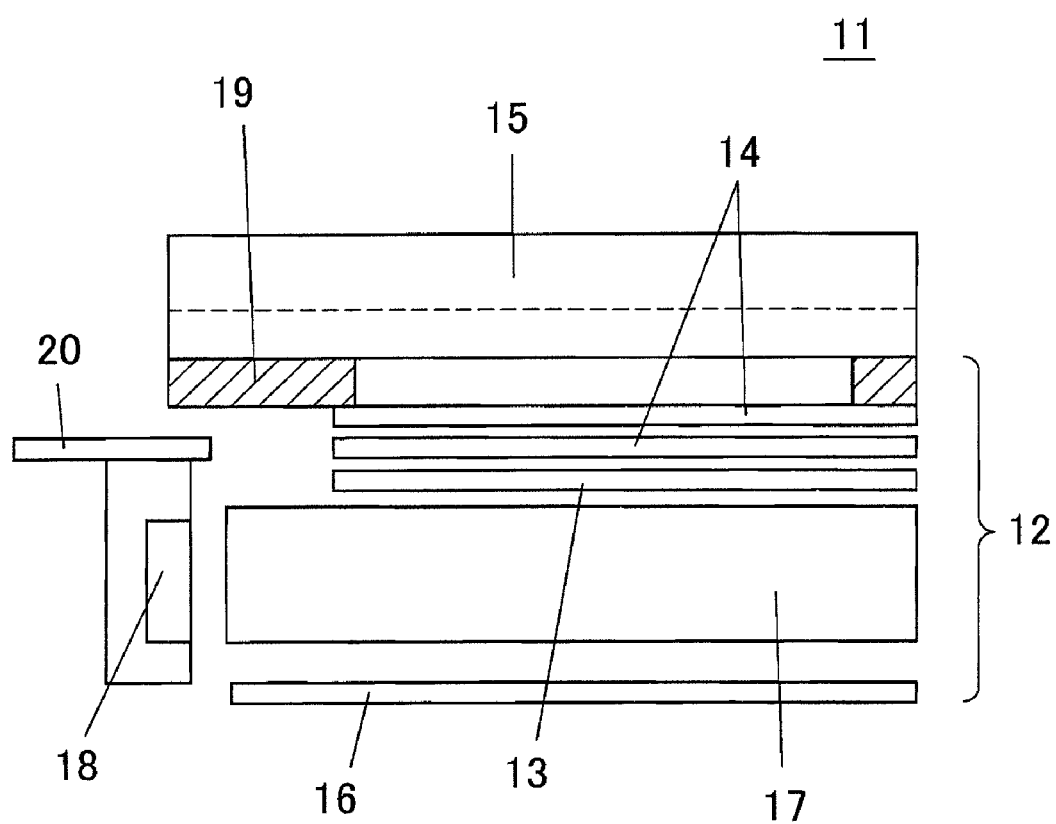
FIG. 1 is a schematic diagram of a conventional liquid-crystal display device using an edge-light type surface light source device.
Figure 2:
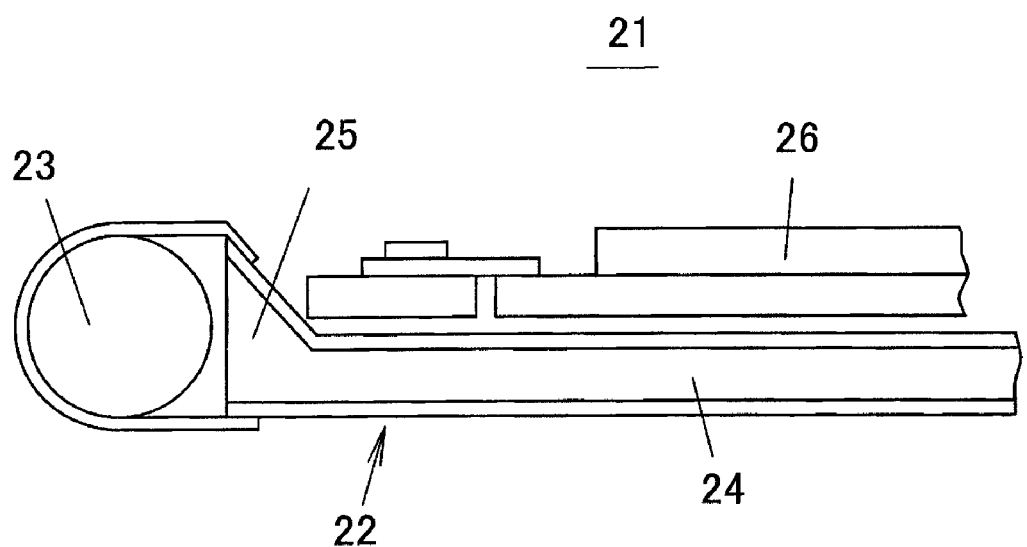
FIG. 2 is a side view of a liquid-crystal display device disclosed in Patent Document 1.
Figure 3:
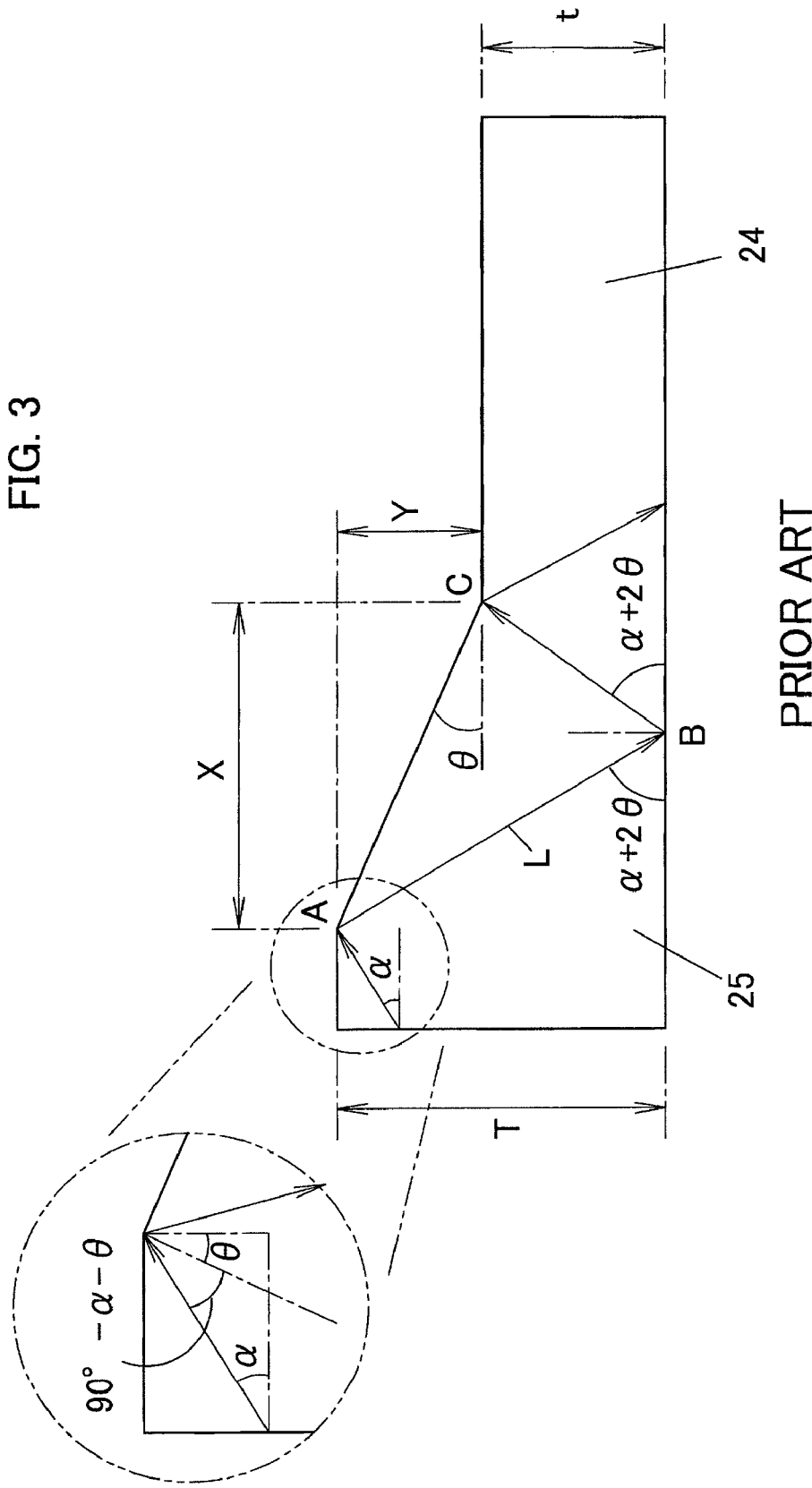
FIG. 3 is a diagram for describing the reason for the occurrence of a leakage of light at a tapered part in the surface light source device of FIG. 2.
Figure 5:
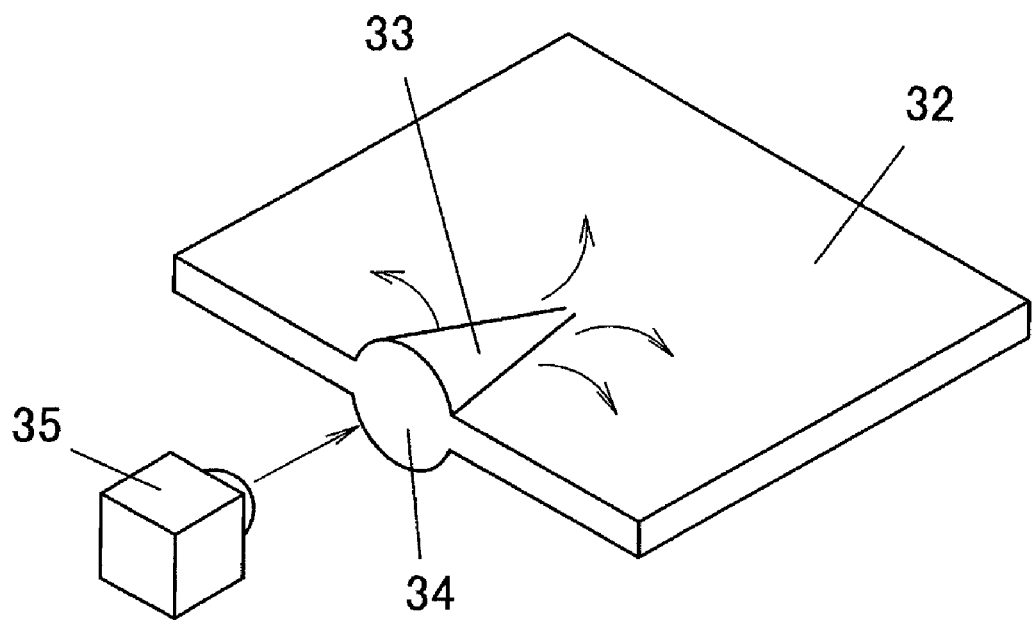
FIG. 5 is a perspective view of a surface light source device disclosed in Patent Document 2.
Figure 6:
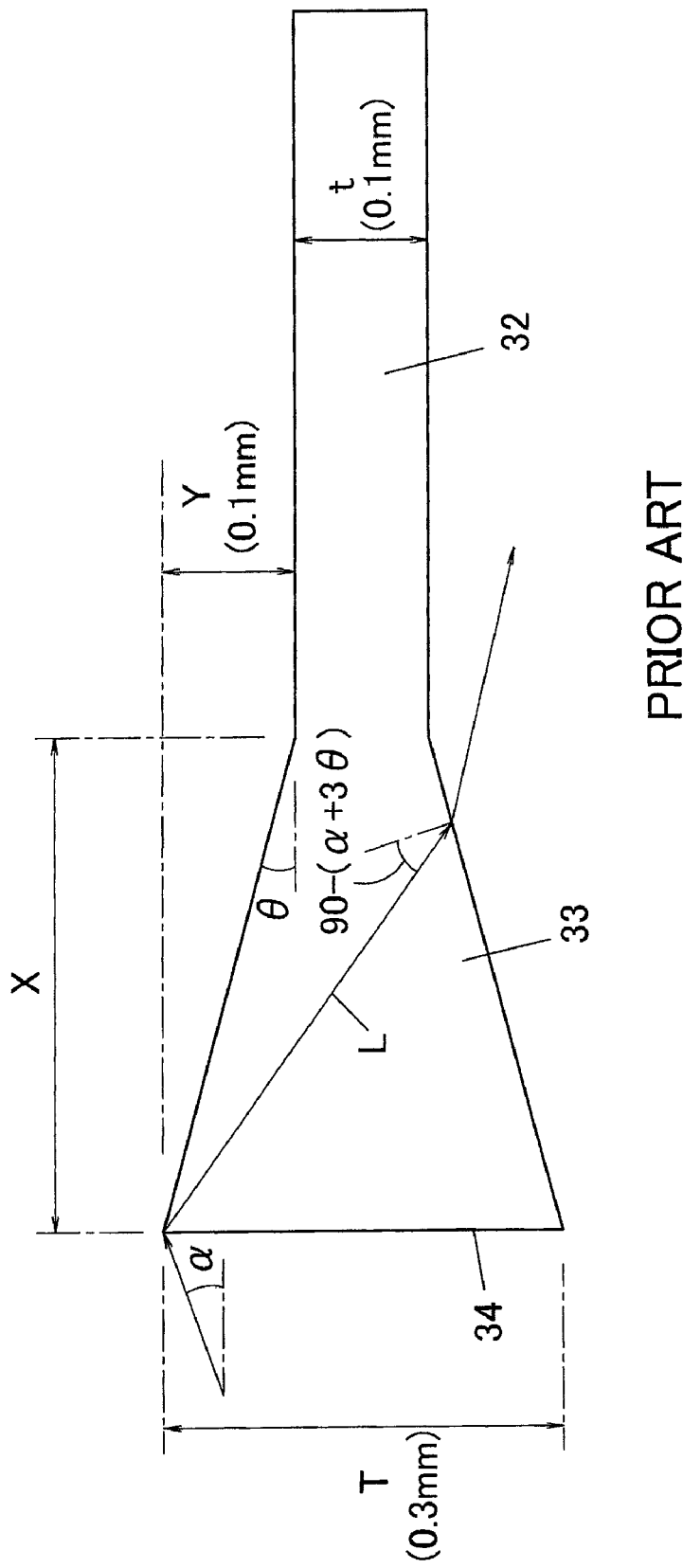
FIG. 6 is a diagram depicting a section of a light guiding part and a light receiving part cut along a vertical plane passing an axial center of alight guiding part in the surface light source device of FIG. 5.
Figure 7:
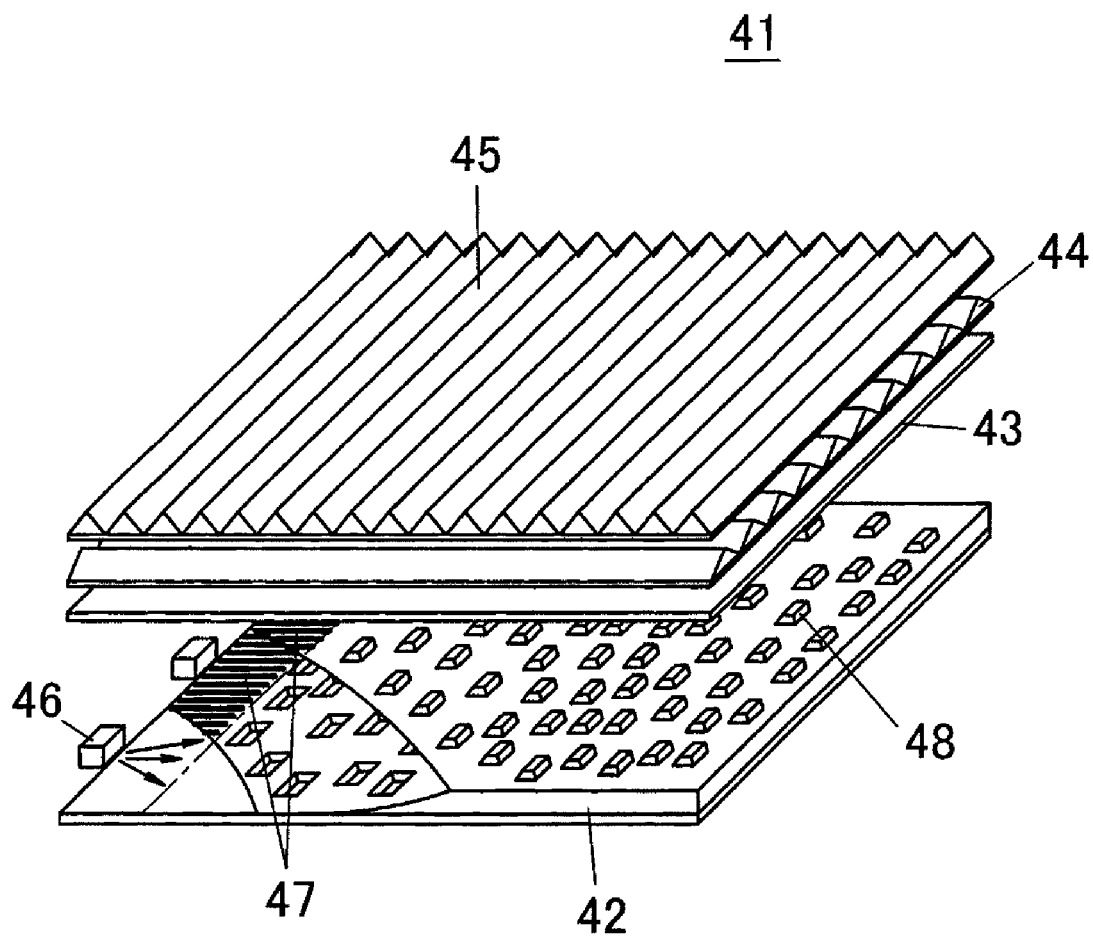
FIG. 7 is a partially-cut-out perspective view of a surface light source device disclosed in Patent Document 3.
Figure 8:
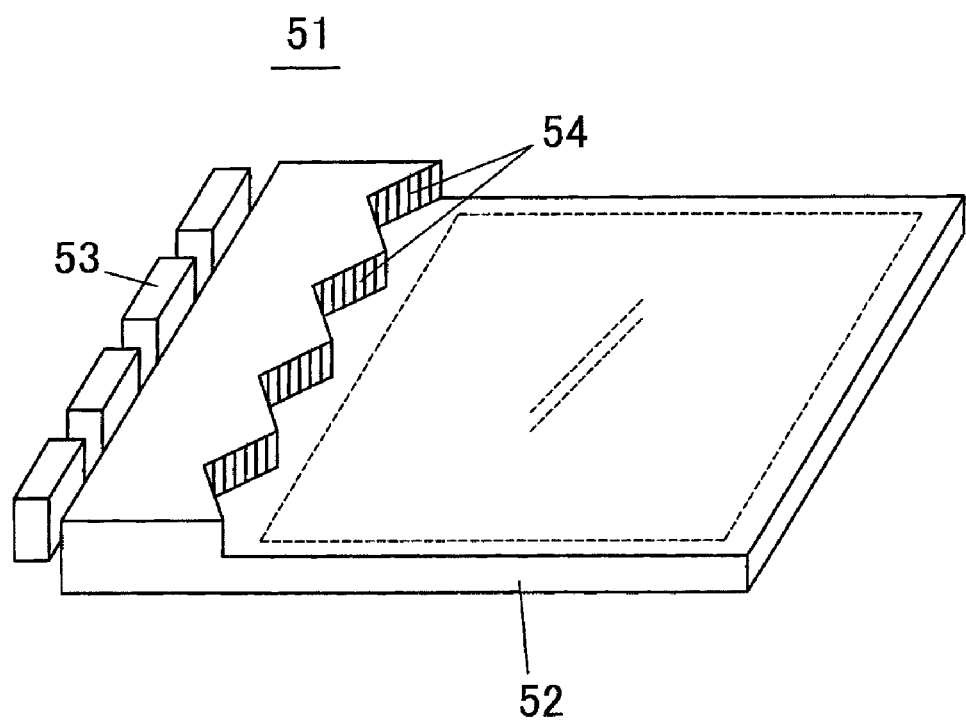
FIG. 8 is a perspective view of a surface light source device disclosed in Patent Document 4.
Figure 9A:
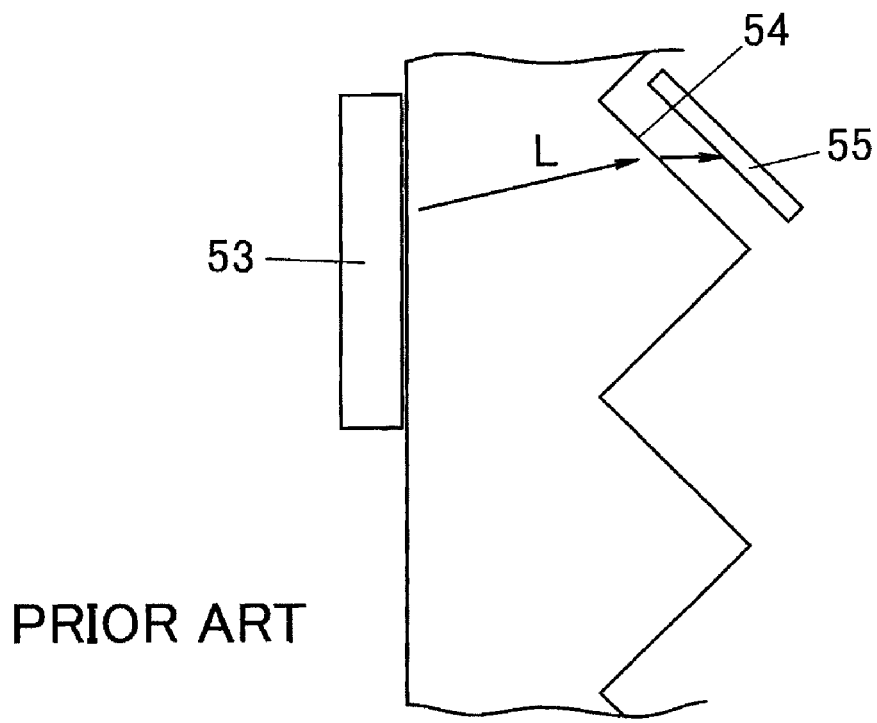
FIGS. 9A and 9B are schematic diagrams for describing the reason for the occurrence of a loss of light in the surface light source device of Patent Document 4.
Figure 9B:
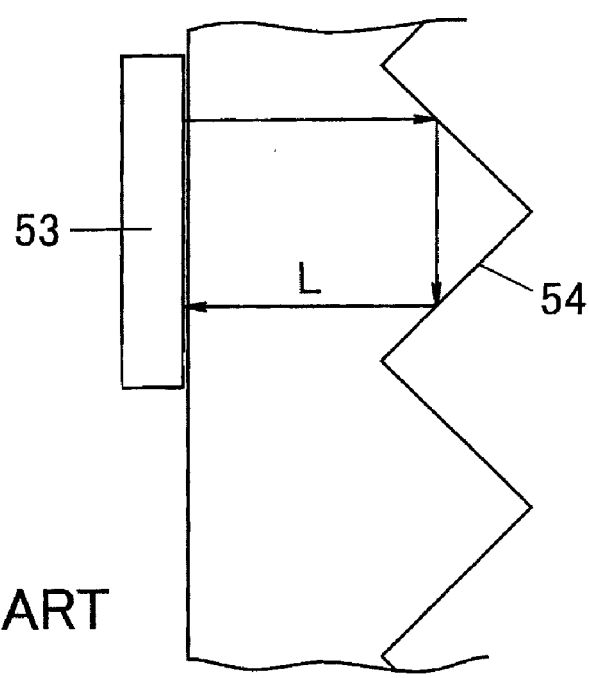
Figure 10:
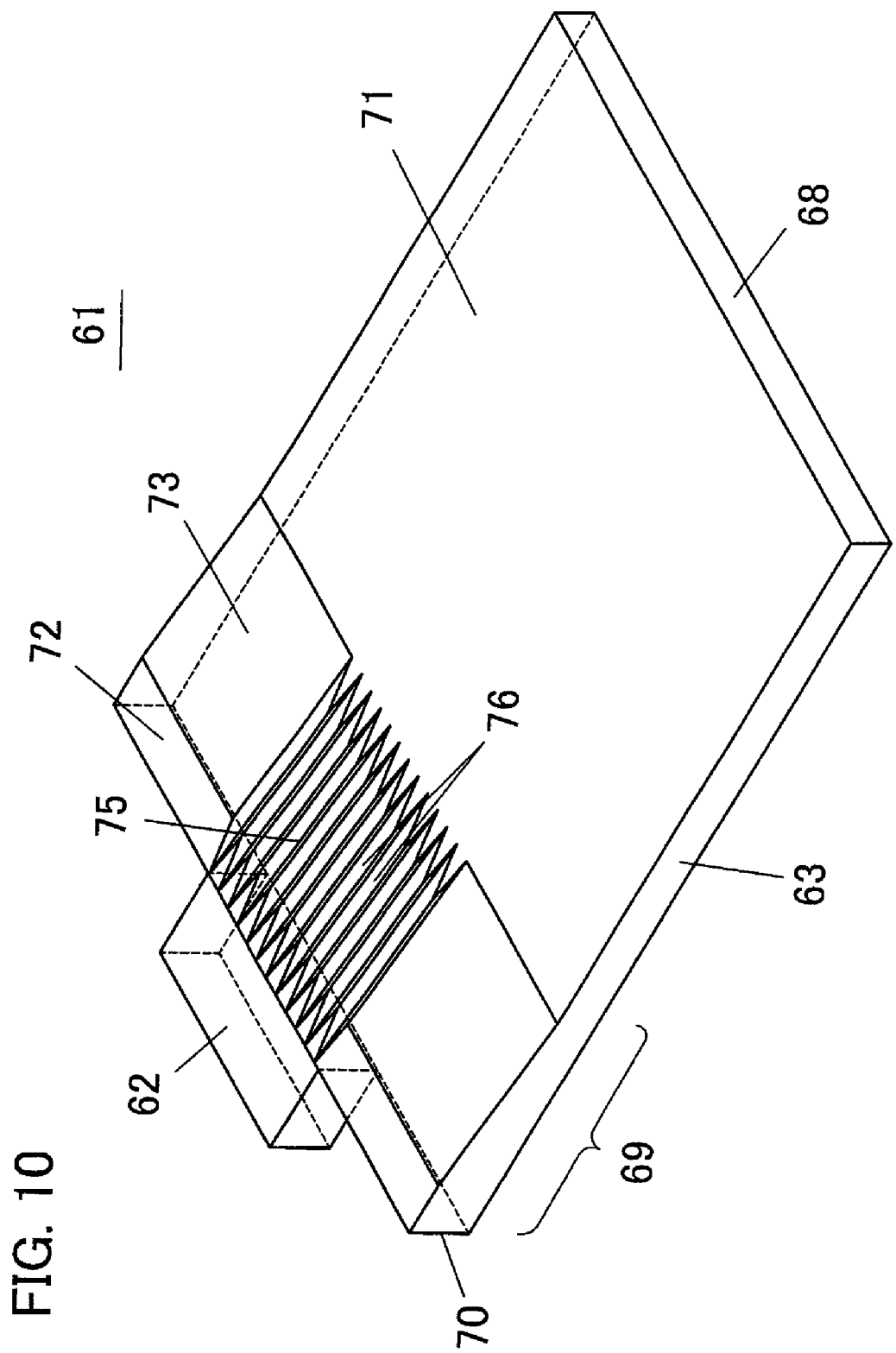
FIG. 10 is a perspective view of a surface light source device according to a first embodiment of the present invention.
Figure 11:
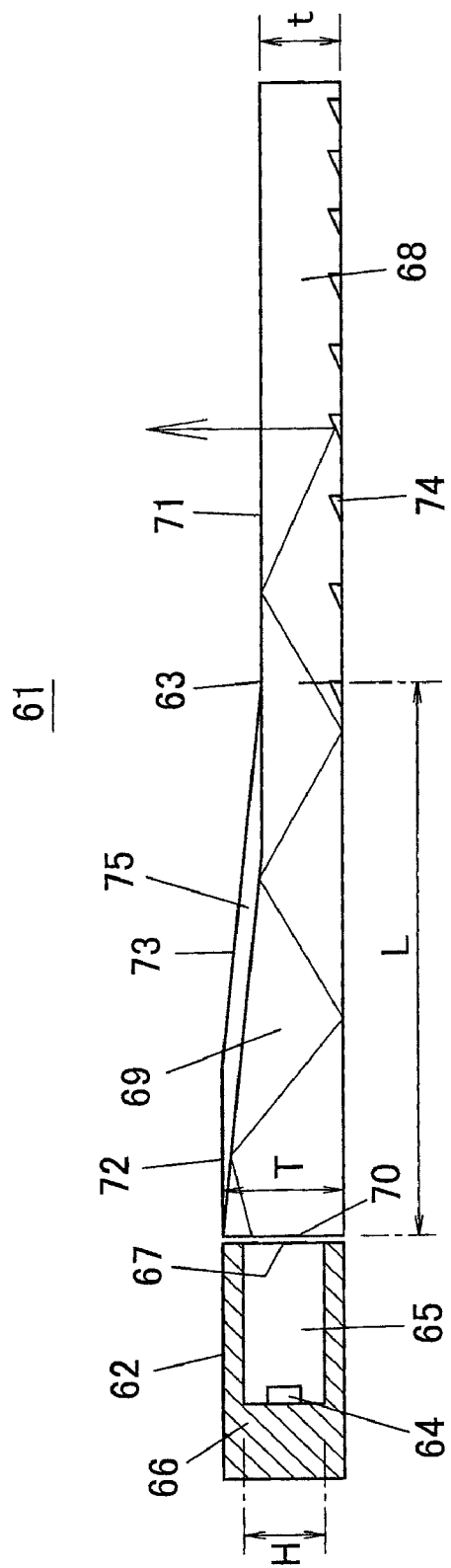
FIG. 11 is a schematic sectional view of the surface light source device according to the first embodiment of the present invention.

A surface light source device according to a first embodiment of the present invention is described. FIG. 10 is a perspective view of a surface light source device 61 according to the first embodiment of the present invention, and FIG. 11 is a schematic sectional view thereof. The surface light source device 61 includes a point light source 62 and a light guide plate 63. The point light source 62 has one or plurality of LEDs incorporated therein, and emits white light. A LED 64 is sealed in a transparent sealing resin 65. Furthermore, the transparent sealing resin 65 is covered with a white resin 66 except the front, and the front of the transparent sealing resin 65 exposed from the white resin 66 serves as a light exit window 67 (a light-emitting surface). This point light source 62 is small compared with the width (or the dimension in a depth direction on paper in FIG. 11) of the light guide plate 63, and is thus called a point light source, in contrast to a cold-cathode-fluorescent tube being called a linear light source.

Note that the point light source is not the one in the strict sense. The point light source also has a finite width, but does not have a width of 10 mm or longer as the cold-cathode-fluorescent tube. An example of a point light source is a side-view type LED. One or more LED chips are contained in one package, and a plurality of LED chips may be simultaneously sealed. The one having a plurality of chips contained therein may have an opening size in a width direction being on the order of 5 mm, but is sufficiently small compared with the size of the light-emitting surface of the light guide plate being on the other of 2 inches, and therefore can be regarded as a point light source. The point light source may be the one that can emit parallel light, such as a semiconductor laser element.

The light guide plate 63 is formed by providing a light introducing part 69 at an end part of a light guide plate body 68, and is molded with transparent resin having a high refractive index, such as acrylic resin, polycarbonate resin (PC), cycloolefin-type material, or polymethyl methacrylate (PMMA). In the following, the light guide plate 63 is assumed to be made of polycarbonate resin.

The light introducing part 69 is a part of the light guide plate 63 having a large thickness, and the point light source 62 is disposed so as to face a part of a light incidence end face 70 (light incidence surface), which is an end face of the light introducing part 69. The end face of the light introducing part 69 has a thickness T equal to or thicker than a height H of the light exit window 67. For this reason, light emitted from the point light source 62 efficiently enters from the light incidence end face 70 into the light introducing part 69, thereby increasing light use efficiency of the surface light source device 61. On a surface (an upper surface) of the same side as a light exit surface 71 of the light guide plate body 68, a protrusion in the shape of a wedge in parallel to the light incidence end face 70 of the light guide plate 63 extends in a band shape, and this region having a large thickness servers as the light introducing part 69. Of the upper surface of the light introducing part 69, a region at an end on a light incidence end face side is a horizontal surface 72, and an inclined surface 73 is formed from an end of the horizontal surface 72 to the end of the light guide plate body 68.

The light guide plate body 68 occupies most of the area of the light guide plate 63, and has a thickness t thinner than the thickness T of the light introducing part 69, thereby making the light guide plate 63 thinner. The light guide plate body 68 has a flat plate shape with front and rear surfaces parallel to each other, and the thickness of the light guide plate body 68 is approximately uniform. On a surface opposite to the light exit surface 71 of the light guide plate body 68, light emitting means 74 is provided. While a triangular-groove pattern is depicted in FIG. 11 as the light emitting means 74, any pattern can suffice, such as a sandblasted one, one obtained by photo printing of diffusing ink, a diffraction grating pattern, or an arbitrary recessed/projecting pattern. Also, the light emitting means 74 may be provided on the light exit surface 71 or on both of the light exit surface 71 and its opposite surface.

Thus, in this surface light source device 61, as depicted in FIG. 11, light L emitted from the point light source 62 enters from the light incidence end face 70 to the inside the light introducing part 69, and is totally reflected from a directivity conversion pattern 75 and a lower surface of the light introducing part 69, or passes through the light introducing part 69, to be guided to the light guide plate body 68 having a thin thickness. The light guided to the light guide plate body 68 is totally reflected or diffused by the light emitting means 74 to be output from the light exit surface 71 approximately uniformly.

In a partial region of the inclined surface 73 of the light guide plate 69, that is, in a region ahead of the point light source 62, a directivity conversion pattern 75 made of a plurality of V grooves 76 (or a mountain-shaped pattern) is formed. The V grooves 76 are arranged in parallel to each other, and each V groove 76 extends to a direction perpendicular to the light incidence end face 70 when viewed from a direction perpendicular to the light guide plate body 68. Each V groove 76 has a uniform sectional shape along its length direction and has the same V-groove shape, and the V grooves 76 have the same depth and length. Each V groove 76 has a vertical angle of 120° in a section perpendicular to a length direction. However, because the V grove 76 is formed so as not to be deeper than the light exit surface 71, the depth of the V groove 76 is gradually changed at an upper end and a lower end. In this manner, with the V groove 76 not deeper than the light exit surface 71, the length of the end face of the V groove 76 appearing on the horizontal surface 72 can be shortened, and therefore the length of the horizontal surface 72 can be shortened. Conversely, as the depth of the V groove 76 is deeper, the length of the horizontal surface 72 is longer. Therefore, making the depth of the V groove 76 too deep may increase a region unused for display. In the light guide plate 63 depicted in FIG. 10, the V groove 76 is provided in a recessed shape as if it is obtained by carving the inclined surface 73, and a ridge line between the V grooves 76 is in the same plane as the inclined surface 73. An upper end of the V groove 76 reaches an end of the horizontal surface 72 on a light incidence end face side.

It may not preferable to tilt the directivity of light entering the light introducing part 69 from the point light source 62, and therefore the V groove 76 in a length direction may be perpendicular to the light incidence end face 70 when viewed from a direction perpendicular to the light guide plate body 68. However, because the V groove 76 in a length direction can be approximately perpendicular to the light incidence end face 70, the V groove 76 in a length direction may be inclined on the order of ±10° from a direction perpendicular to the light incidence end face 70 when viewed from the direction perpendicular to the light guide plate body 68.

In this manner, by providing the directivity conversion pattern 75 on the inclined surface 73, an effect of decreasing leakage of light entering the light guide plate 63 from the point light source 62 can be obtained. For example, when a light guide plate is used having the thickness t of the light guide plate body 68 being 0.4 mm, the thickness T of the end face of the light introducing part 69 being 0.6 mm, a length K of the light introducing part 69 being 2.5 mm, and an inclination angle θ of the inclined surface 73 being 5.89° and the directivity conversion pattern 75 is not provided on the inclined surface 73, efficiency is 92%. By contrast, when the directivity conversion pattern 75 formed of V grooves 76 having a vertical angle of 120° is provided on the inclined surface 73, efficiency is improved to be 98%. Efficiency herein represents how much light of the incident light that is let enter the light incidence end face 70 or the light introducing part 69 with a flat edge can be transmitted from the light introducing part 69 to the light guide plate body 68 without leakage.

Because the surface light source device 61 depicted in FIG. 10 and FIG. 11 has basic features of one or more embodiments of the present invention, the reason why leakage of light can be decreased while the light guide plate 63 is made thinner, and other features of one or more embodiments of the present invention are described below based on the surface light source device 61 of the first embodiment.

(Light Confining Principle)

First, the reason why light can be efficiently confined in the light guide plate 63 with the combination of the inclined surface 73 and the directivity conversion pattern 75 while the light guide plate body 68 is made thinner in one or more embodiments of the present invention is described.

Figure 12A:
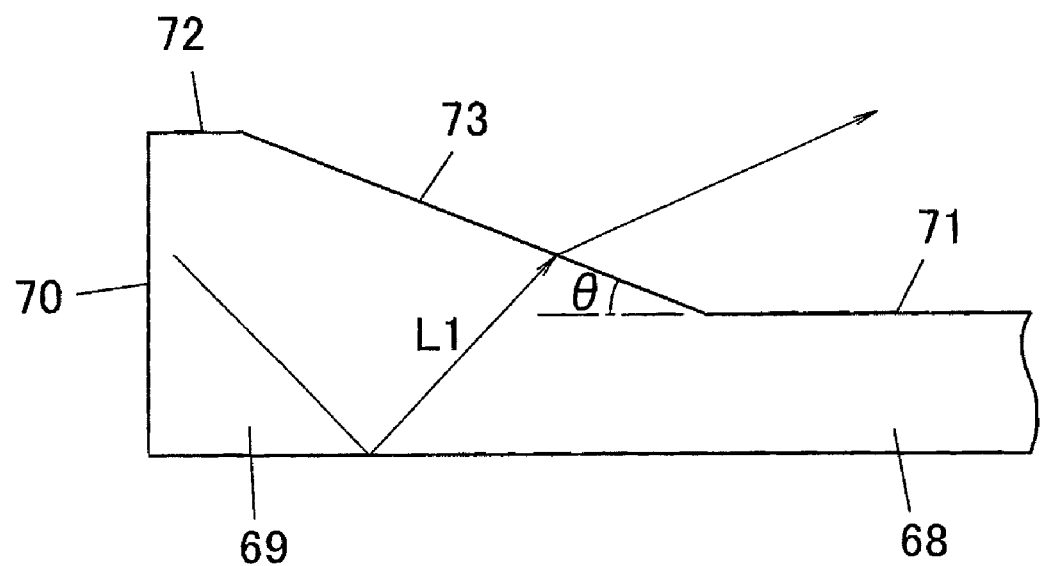
FIG. 12A is a diagram depicting the state in which when an inclined surface of a light introducing part has a large inclination angle, primary incident light leaks from the inclined surface according to one or more embodiments of the present invention.
Figure 13:
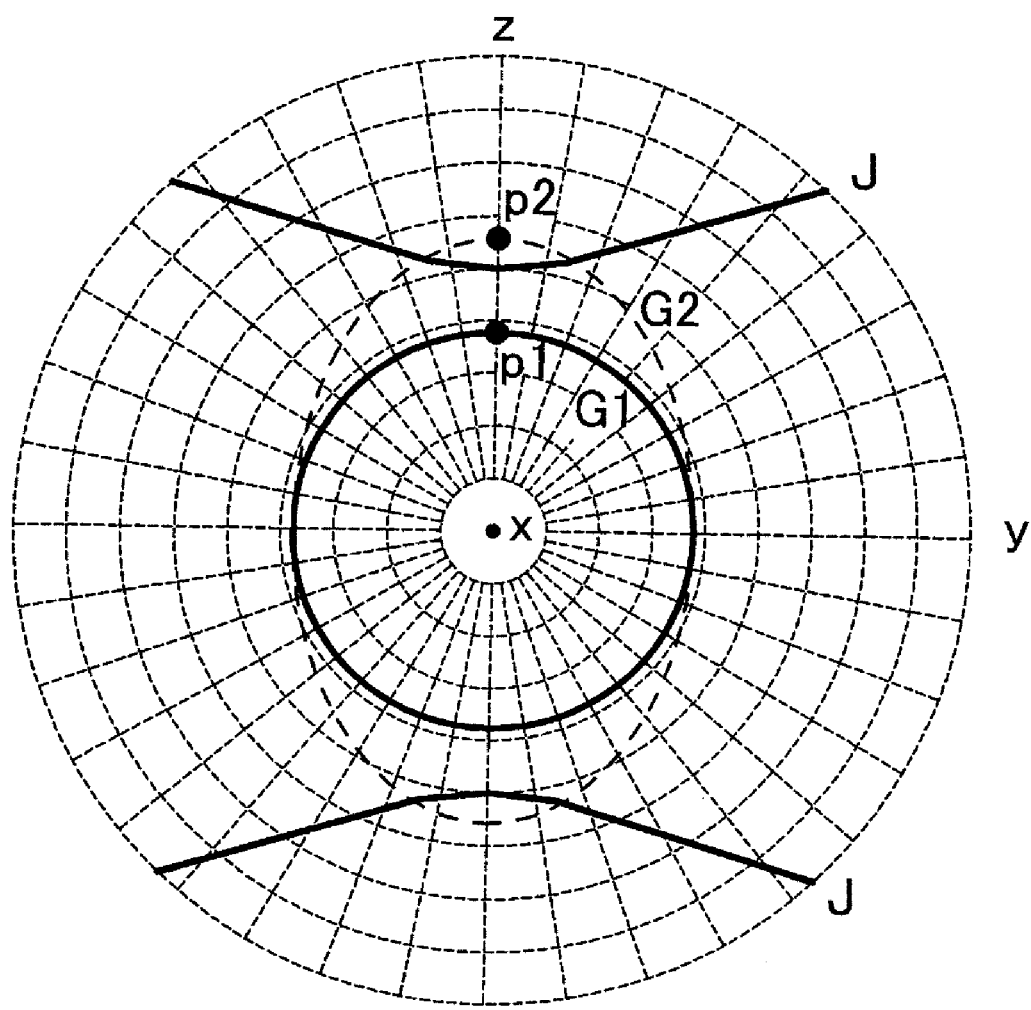
FIG. 13 is a diagram depicting the behavior of light depicted in FIG. 12A with directivity characteristics viewed from a direction perpendicular to a light incidence end face according to one or more embodiments of the present invention.
Figure 14:
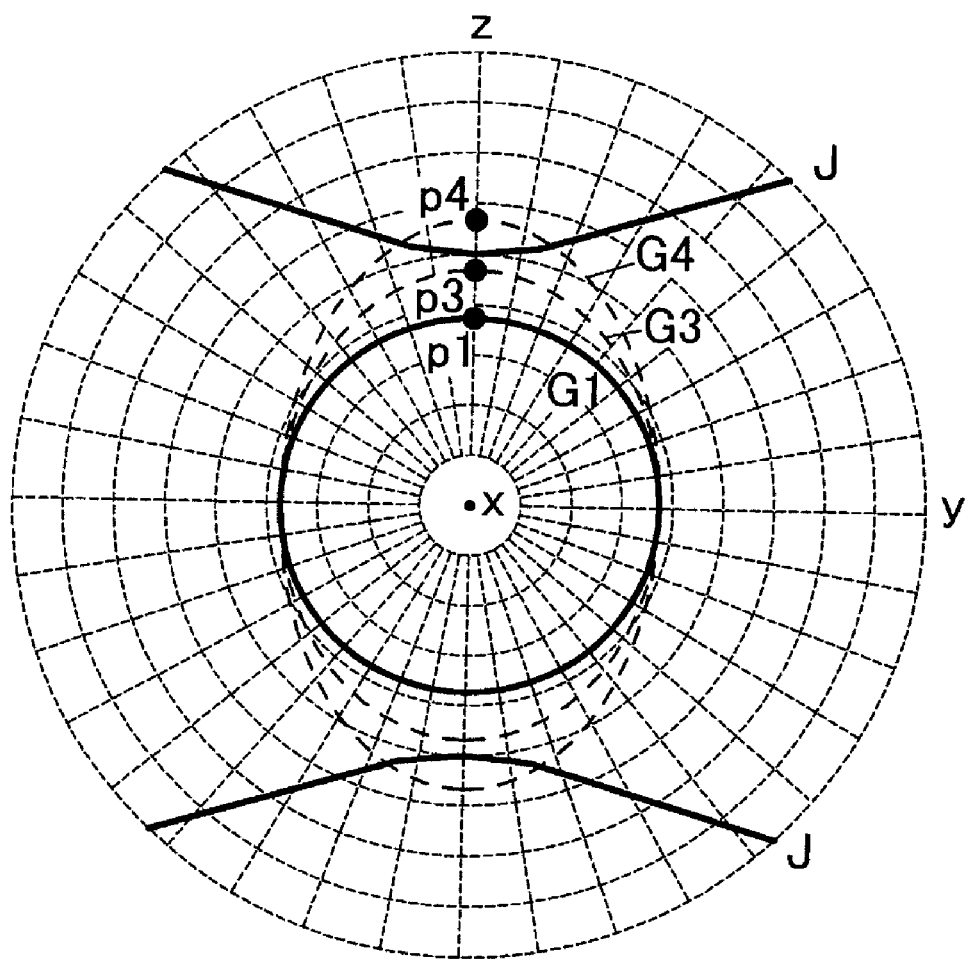
FIG. 14 is a diagram depicting the behavior of light depicted in FIG. 12B with directivity characteristics viewed from a direction perpendicular to a light incidence end face according to one or more embodiments of the present invention.

The reason why the inclined surface 73 is provided in the surface light source device 61 is to increase the area of the light incidence end face 70 to increase the light amount that can be taken in from the point light source 62 and to make the thickness of the light guide plate body 68 thinner. Also, the directivity conversion pattern 75 is to make light less prone to leak from the inclined surface 73. In FIG. 12 to FIG. 14, the case is considered in which no directivity conversion pattern 75 is provided on the inclined surface 73. Also, In FIG. 15 and FIG. 16, the case is considered in which the directivity conversion pattern 75 is provided on the inclined surface 73.

FIG. 13 to FIG. 16 depict directivity characteristics. These directivity characteristics are viewed from a direction perpendicular to the light incidence end face 70 of the light guide plate 63, with the x axis representing an axis in a direction perpendicular to the light incidence end face 70 and oriented toward the inside of the light guide plate, the z axis representing an axis in a direction perpendicular to the light exit surface 71 of the light guide plate 63, and the y axis representing an axis in a direction perpendicular to the x axis and the z axis (a direction parallel to the light incidence end face 70). However, in these directivity characteristics, optical intensity is abstracted, and only the direction of light beams in the light guide plate 63 is represented with polar coordinates. Also, a region inside a circle G1 depicted in FIG. 13 to FIG. 16 represents directivity characteristics of light immediately after entering the light introducing unit 69 from the point light source 62, representing a cone-shaped region with an angle with respect to the x axis being $\alpha=\arcsin(1/n)$, where n is a refractive index of the light guide plate 63. Also, boundary lines J each represent a boundary between light beams totally reflected from the inclined surface 73 and light beams passing through the inclined surface 73. While light beams in a region between two boundary lines J are totally reflected from the inclined surface 73, and light beams outside a region between the boundary lines J pass through the inclined surface 73 to exit outside.

Note that when the light beams are totally reflected from the inclined surface or the like, reflected light beams are light beams positioned oppositely to incident light beams across the x axis. Also, with total reflection on the opposite surface of the light guide plate, the light beams return to the same side as that of the inclined surface and others. For convenience of description, it is assumed that these are light beams positioned on the same side (that is, in a region above the y axis).

First, the case is considered in which no directivity conversion pattern 75 is provided on the inclined surface 73. As depicted in FIG. 12A, when the inclination angle θ of the inclined surface 73 is increased, the height H of the light exit window 67 can be increased. Alternatively, the length of the light introducing part 69 can be shortened to increase the ratio of the area of the light exit surface 71. However, if the inclination angle θ of the inclined surface 73 is increased, this causes a part of light L1 entering the inclined surface 73 for a first time (hereinafter, light entering the inclined surface 73 for a first time is referred to as primary incident light and light entering for a second time is referred to as secondary incident light, for example) to go out of the inclined surface 73 to outside and decrease light use efficiency.

FIG. 13 represents the behavior of light depicted in FIG. 12A with directivity characteristics viewed from a direction perpendicular to the light incidence end face 70. When the inclination angle of the inclined surface 73 is large, changes in angle of light beams before and after total reflection from the inclined surface 73 are large. Therefore, when a light beam p1 on the boundary of a directivity characteristic G1 is totally reflected from the inclined surface 73, the light beam goes over the boundary line J to move in a z axis direction and become a light beam p2. That is, the light goes out of the inclined surface 73 to leak to outside. In view of the directivity characteristics as a whole, when the light having the directivity characteristic G1 is totally reflected from the inclined surface 73, the light spreads in a direction of thickness (a z-axis direction) of the light guide plate 63 to have a directivity characteristic G2 (an oval depicted in a broken line), and light in a region going out of the boundary lines J (primary incident light) leaks from the inclined surface 73.

When the inclination angle θ of the inclined surface 73 is smaller than that of the case of FIG. 12A, leakage of the primary incident light L1 can be suppressed. However, even if the inclination angle θ of the inclined surface 73 is decreased to prevent leakage of the primary incident light L1, as depicted in FIG. 12B, a part of the secondary incident light L2 goes out of the inclined surface 73 to become a loss.

Figure 12B:
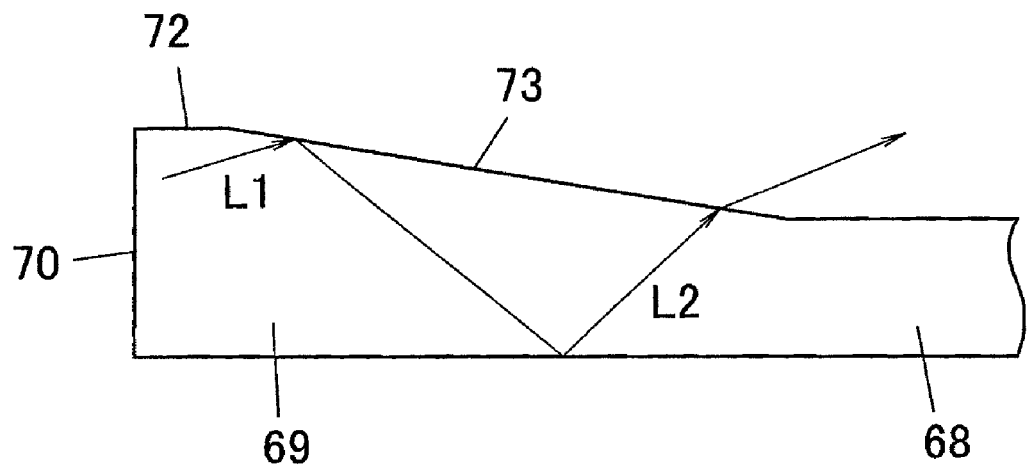
FIG. 12B is a diagram depicting the state in which when the inclined surface of the light introducing part has a small inclination angle, secondary incident light leaks from the inclined surface according to one or more embodiments of the present invention.

FIG. 14 is a diagram depicting the behavior of light depicted in FIG. 12B with directivity characteristics viewed from a direction perpendicular to the light incidence end face 70. When the inclination angle of the inclined surface 73 is decreased, changes in angle of light beams before and after total reflection from the inclined surface 73 are small. Thus, when the light beam p1 (primary incident light) on the boundary of the directivity characteristic G1 is totally reflected from the inclined surface 73, the light is moved in the z-axis direction, but becomes a light beam p3 inside the boundary lies J and does not leak from the inclined surface 73. However, even in this case, when the light beam p3 is further totally reflected from the inclined surface 73, the light beam p3 (secondary incident light) is moved to the z-axis direction to go over the boundary line J to become a light beam p4. As a result, the light goes out of the inclined surface 73 to leak to outside. In view of the directivity characteristics as a whole, when the light having the directivity characteristic G1 is totally reflected from the inclined surface 73, the light spreads in a thickness direction (a z-axis direction) of the light guide plate 63 to have a directivity characteristic G3. When the light is totally reflected from the inclined surface 73 for a second time, the light further spreads in a z-axis direction to have a directivity characteristic G4, and light in regions going over the boundary lines J (secondary incident light) leaks from inclined surface 73.

When the inclination angle θ of the inclined surface 73 is further decreased, the secondary incident light L2 can be prevented from leaking. However, if the inclination angle θ is too decreased, the length of the light introducing part 69 is increased, and the area of the light guide plate body 68 is decreased accordingly. This means that the area that can be used as a light source is decreased, thereby making the device impractical.

Figure 15:
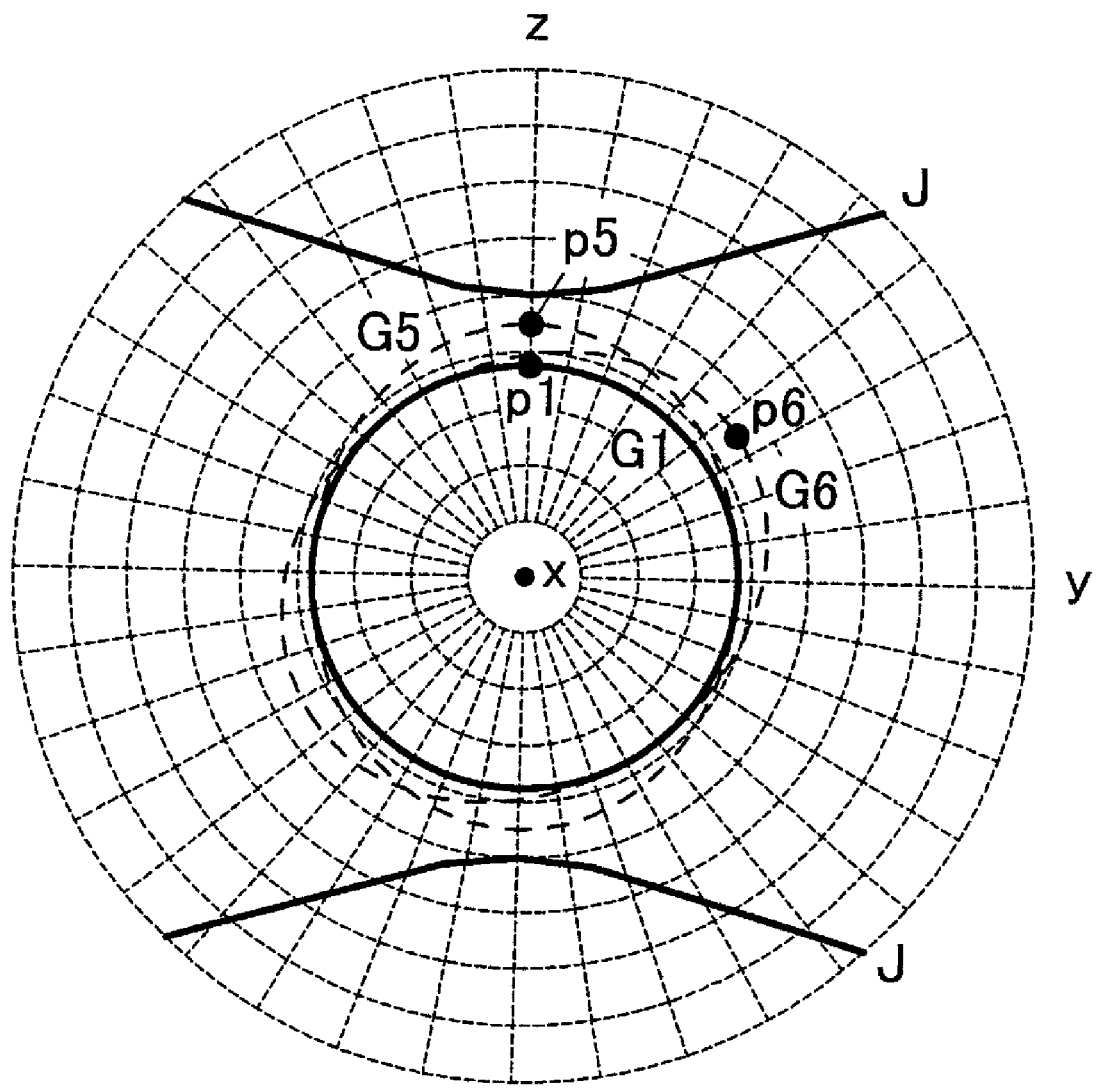
FIG. 15 is a diagram depicting changes in directivity characteristics when primary incident light is totally reflected from the inclined surface and a directivity conversion pattern according to one or more embodiments of the present invention.
Figure 16A:
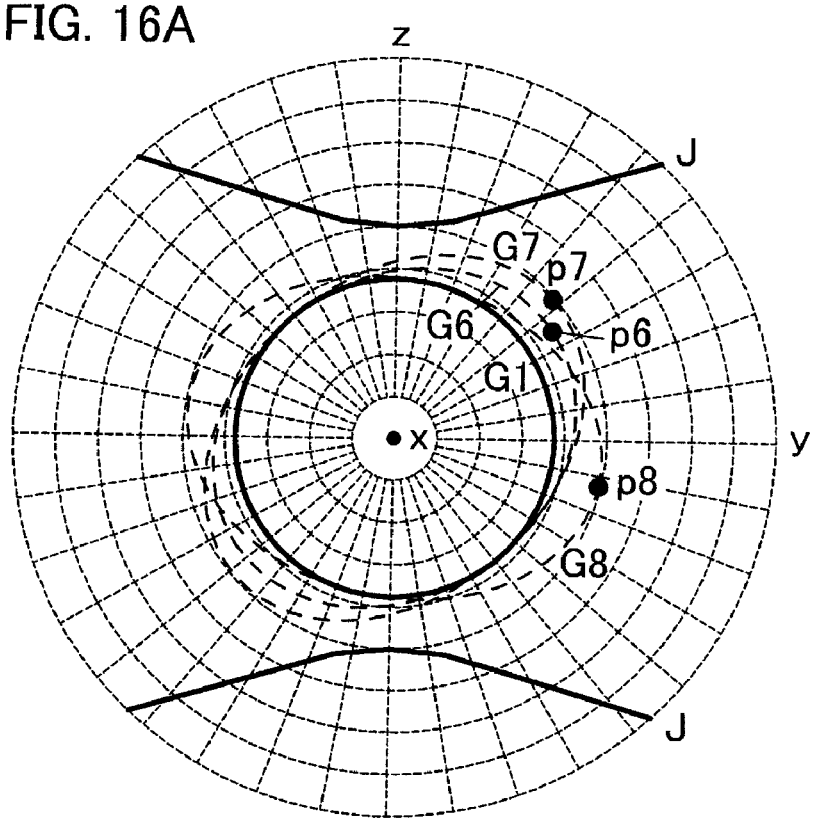
FIGS. 16A and 16B are diagrams each depicting a change in directivity characteristics when secondary incident light is totally reflected from the inclined surface and the directivity conversion pattern according to one or more embodiments of the present invention.
Figure 16B:
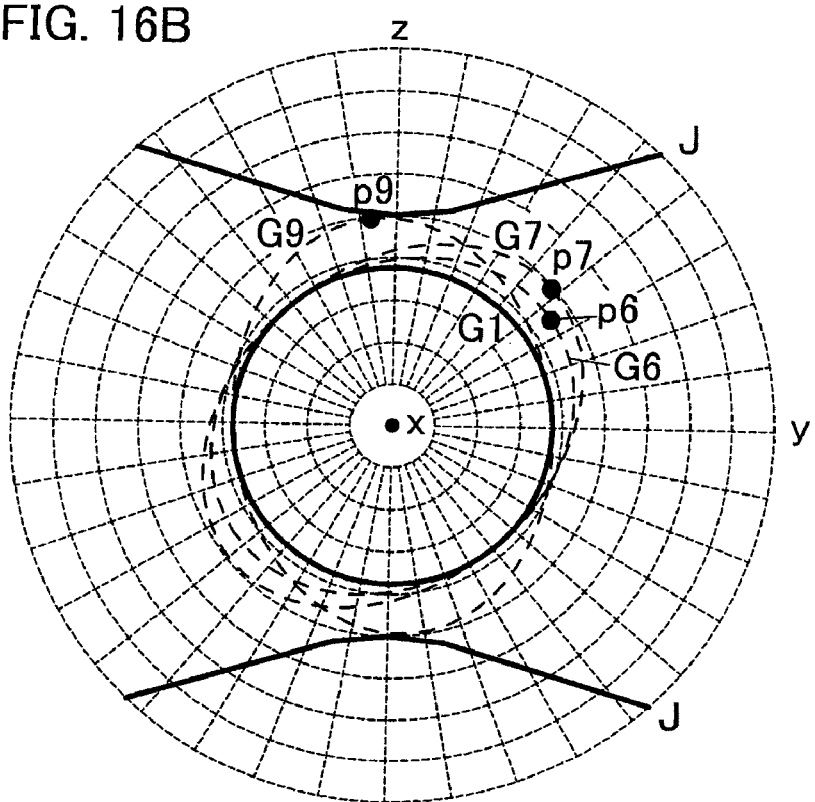

To get around this, in one or more embodiments of the present invention, (1) the inclination angle θ of the inclined surface 73 is decreased in a range in which the light in the light introducing part 69 entering the inclined surface 73 for the first time does not leak from the inclined surface 73 (prevention of leakage of the primary incident light), (2) because a difference between a maximum thickness of the light introducing part 69 and the thickness of the light guide plate body 68 is decreased when the inclination angle θ is decreased, the length of the light introducing part 69 is increased in a range in which light entering the inclined surface 73 at least twice or more is present, thereby decreasing the thickness t of the light guide plate body 68 (making the light guide plate thinner), and (3) with the presence of light entering the inclined surface 73 at least twice or more, the light entering the inclined surface 73 for a second time leaks from the inclined surface 73, and the light entering for the second time is made less prone to leak from the inclined surface 73 by providing the directivity conversion pattern 75 (suppression of leakage of the secondary incident light). That is, by providing the directivity conversion pattern 75 on the inclined surface 73, the light entering the inclined surface 73 for the second time is also made less prone to leak from the inclined surface 73. This principle is described by using the directivity characteristics of FIG. 15, FIG. 16A, and FIG. 16B depicting the case of providing the directivity conversion pattern 75 on the inclined surface 73. Note in these drawings that the length of the inclined surface 73 and the length of the directivity conversion pattern 75 are equal to each other.

When the directivity conversion pattern 75 is provided, as depicted in FIG. 15, when the light beam p1 (primary incident light) on the boundary of the directivity characteristic G1 is totally reflected from the inclined surface 73, the light beam p1 is moved in a z-axis direction to become a light beam p5 inside the boundary lines J. Also, when the light beam p5 is totally reflected from the directivity conversion pattern 75, the light beam is rotated about the x axis to become a light beam p6. In view of the directivity characteristics, when the light having the directivity characteristic G1 enters the inclined surface 73 for a first time and is totally reflected, the light extends in the z-axis direction to have a directivity characteristic G5. However, because the inclination angle θ of the inclined surface 73 is defined so that the primary incident light does not leak, the directivity characteristic G5 does not go over the boundary lines J. Also, when the light having the directivity characteristic G5 is totally reflected from the directivity conversion pattern 75, the directivity characteristic G5 rotates about the x axis to become a directivity characteristic G6. Thus, the directivity characteristic G6 falls within a range between the boundary lines J, and the primary incident light does not leak from the inclined surface 73.

Furthermore, as depicted in FIG. 16A, when a light beam p6 on the boundary of the directivity characteristic G6 (secondary incident light) is totally reflected from the inclined surface 73, the light beam p6 is moved in the z axis direction to become a light beam p7. Also, when the light beam p7 is totally reflected from the directivity conversion pattern 75, the light beam rotates about the x axis to become a light beam p8. In view of the directivity characteristics, when the light having the directivity characteristic G6 enters the inclined surface 73 for a second time and is totally reflected, the light extends in a z-axis direction to have a directivity characteristic G7 Also, when the light having the directivity characteristic G7 is totally reflected from the directivity conversion pattern 75, the directivity characteristic G7 rotates about the x axis to become a directivity characteristic G8, and the directivity characteristic G8 falls within a range between the boundary lines J after all. Therefore, neither the primary incident light nor the secondary incident light leaks from the inclined surface 73.

Also, when the directivity characteristic G7 rotates about the x axis in a direction opposite to that of FIG. 16A, it becomes a directivity characteristic G9 as depicted in FIG. 16B, and the light beam p7 becomes a light beam p9. Thus, also in this case, neither the primary incident light nor the secondary incident light leaks from the inclined surface 73. Furthermore, although not shown, when the length of the directivity conversion pattern 75 is shorter than the length of the inclined surface 73 (in FIG. 11, in the case where, in the inclined surface 73, the directivity conversion pattern 75 is not present in a region near the light exit surface 71 and only a flat inclined surface 73 is present), the secondary incident light does not rotate as G7→G8 in FIG. 16A and does not rotate as G7→G9 in FIG. 16B, and also the secondary incident light does not leak (this case corresponds to the case in which density in an x-axis direction in an inclination angle frequency distribution, which will be described further below, is 50%). That is, the length of the directivity conversion pattern 75 may be shorter than the length of the inclined surface 73.

Note that, as in a fourth embodiment, which will be described further below, when the directivity conversion pattern 75 is provided on a surface opposite to the inclined surface 73, the directivity characteristic is sequentially changed as G1→G5→G6→G7→G8 (or G1→G5→G6→G7→G9), but when the directivity conversion pattern 75 is provided on the inclined surface 73 as in the first embodiment, the directivity characteristic extends in the z-axis direction and rotate about the x axis simultaneously, and therefore the directivity characteristic is changed as G1→G6→G8 (or G1→G6→G9).

(Light Confining Conditions)

Next, conditions for achieving the behavior of the directivity characteristics as depicted in FIG. 15 and FIG. 16 are considered. First, a condition that the primary incident light is totally reflected from the inclined surface 73 without leakage and is further totally reflected without leakage also from a rear surface of the light guide plate 63 to enter again into the inclined surface 73 is considered. This situation is the same as the case in which Equation 1 to Equation 4 are derived, and therefore a condition to be founded is, with reference to Equation 4, $$\theta \leq 45°-\alpha \qquad \text{(Equation 9)}$$

where α=arcsin(1/n).

Here, θ is an inclination angle of the inclined surface 73, α is a critical angle of total reflection of the light guide plate material, and n is a refractive index of the light guide plate material. Here, in the case of the first embodiment, the directivity conversion pattern 75 formed of the V grooves 76 is provided on the inclined surface 73, and therefore a maximum value of the inclination angle θ is slightly larger than 45°−α.

Also, with the light being reflected from the directivity conversion pattern 75, the directivity characteristic is desired to be narrowed in a thickness direction of the light guide plate 63 and be widened in a width direction thereof. Therefore, the V grooves 76 may extend in a direction perpendicular to the light incidence end face 70 (an x-axis direction) when viewed from a direction perpendicular to the light guide plate 63.

Figure 17:
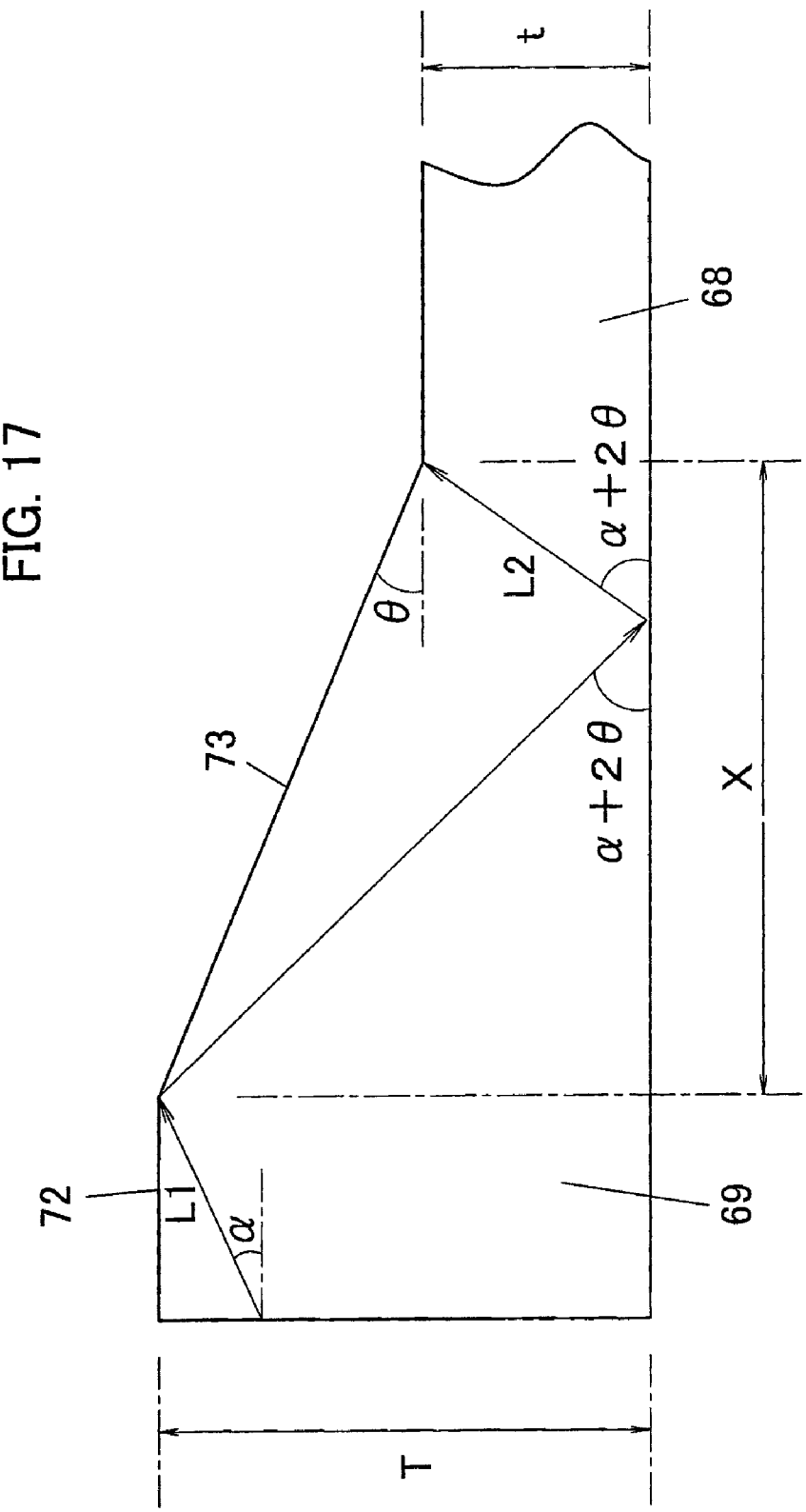
FIG. 17 is a diagram depicting the condition that light incident twice or more to the inclined surface of the light introducing part is present according to one or more embodiments of the present invention.

Next, a condition for the presence of light entering the inclined surface 73 twice or more is considered. In consideration of the case of entering the inclined surface 73 barely twice, that is, the case of a minimum length when light entering the inclined surface 73 twice or more is present, as depicted in FIG. 17, light entering the upper end of the inclined surface 73 at a minimum incident angle is totally reflected from the inclined surface 73 and the bottom surface, and then enters a lower end of the inclined surface 73. At this time, a length X (a length in an x-axis direction) of the inclined surface 73 is represented by $$X=(T+t)\cot(\alpha+2\theta),$$

where α=arcsin(1/n).

Here, T is a thickness of the light introducing part 69 at the upper end of the inclined surface 73, t is a thickness of the light guide plate body 68, θ is an inclination angle of the inclined surface 73, and n is a refractive index of the light guide plate material. Thus, when the directivity conversion pattern 75 is provided on the inclined surface 73, the condition that light entering the inclined surface 73 twice or more is present is $$X \geq (T+t)\cot(\alpha+2\theta) \qquad \text{(Equation 10)}.$$

Furthermore, Equation 10 can also be represented by $$X \geq (T+t)\tan\alpha \qquad \text{(Equation 11)}.$$

As for the directivity conversion pattern 75, the one formed of the V grooves 76 having a vertical angle of 120° is shown in the first embodiment. Therefore, if the sectional shape of each V groove 76 is symmetrical, the inclination angle of the V groove 76 is 30°. The reason why efficiency can be improved by setting, as described above, the vertical angle of the V groove 76 at 120° (the inclination angle thereof at 30°) is described below.

Figure 18A:
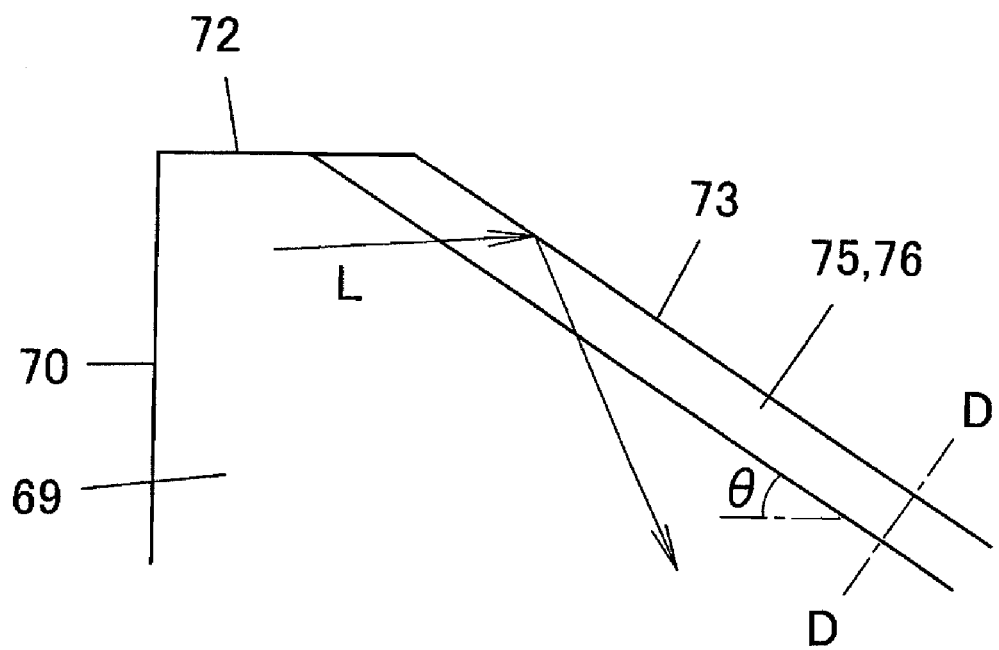
FIG. 18A is a schematic diagram of light incident to the inclined surface of the light introducing part according to one or more embodiments of the present invention.
Figure 18B:
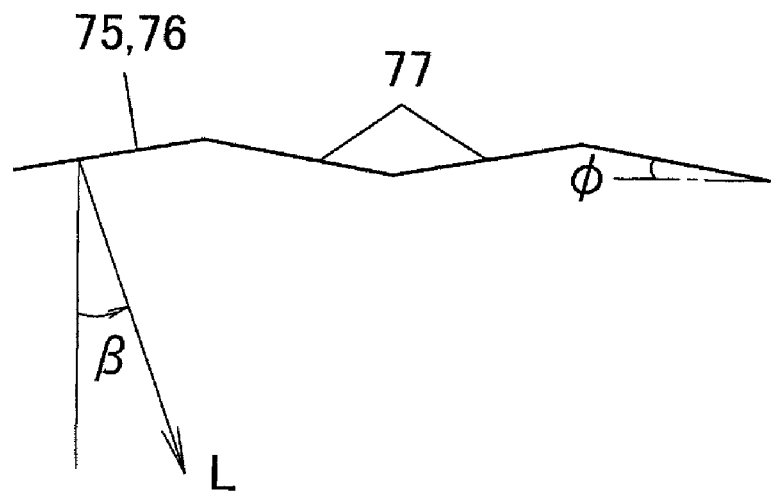
FIG. 18B is a schematic sectional view taken along a D-D line in FIG. 18A according to one or more embodiments of the present invention.

FIG. 18A is a schematic diagram of light incident to the inclined surface 73 of the light introducing part 69. FIG. 18B is a schematic sectional view taken along a D-D line in FIG. 18A, depicting a section perpendicular to a length direction of the V groove 76. To make light entering the inclined surface 73 less prone to leak even if the inclination angle θ of the inclined surface 73 is large, a shift angle β of light beams before and after reflection of light totally reflected from the directivity conversion pattern 75 is required to be increased.

The shift angle β of light beams (before and after reflection) is, as depicted in FIG. 18B, an angle formed by a light beam before reflection and a light beam after reflection when viewed from the length direction of the V groove 76. Also, an angle of an inclined surface 77 of the V groove 76 in a section perpendicular to the length direction of the V groove 76 (for example, a D-D section of FIG. 18A) is referred to as an inclination angle φ of the V groove 76.

FIG. 18B depicts the case in which the inclination angle φ of the inclined surface 77 of the V groove 76 is small (for example, φ=10°). In this case, the shift angle β of the light beam L totally reflected from the directivity conversion pattern 75 is small, and therefore efficiency is small.

Figure 19A:
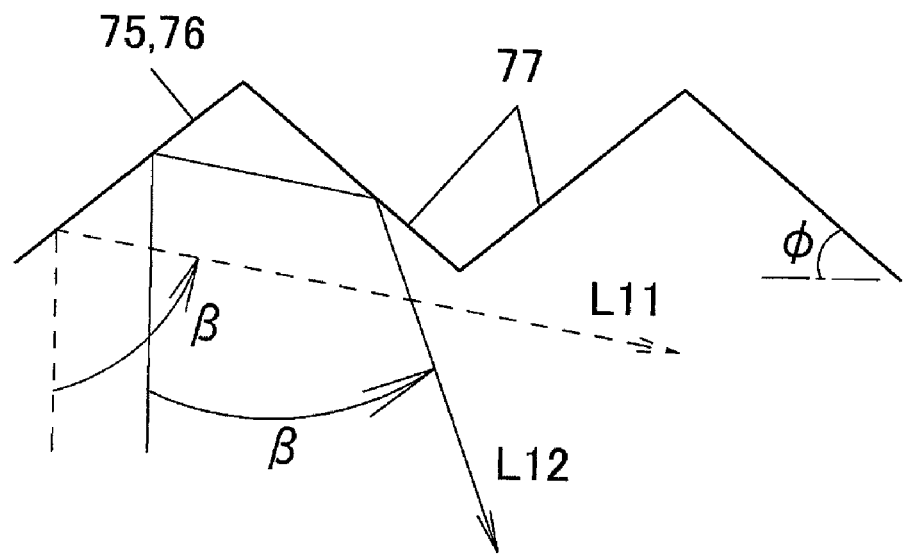
FIGS. 19A and 19B are schematic sectional diagrams taken along the D-D line of FIG. 18A, depicting the behavior of light when the inclination angle of a groove is large according to one or more embodiments of the present invention.
Figure 19B:
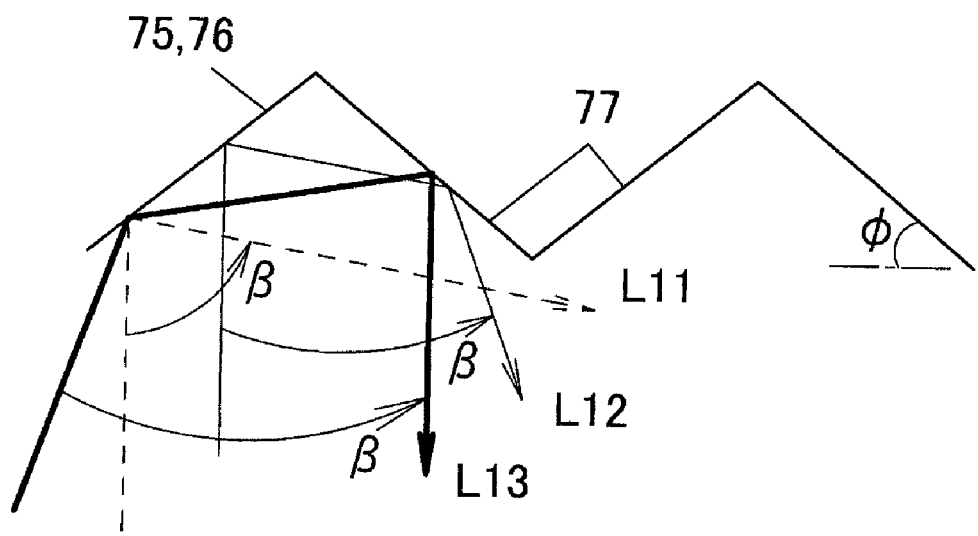

FIG. 19A and FIG. 19B also each depict a schematic section taken along the D-D line of FIG. 18A, but the inclination angle φ of the V groove 76 is large (for example, φ=40°. If the inclination angle φ of the V groove 76 is large, as a light beam L11 depicted in FIG. 19A, the shift angle β of the light beam totally reflected from the inclined surface 77 is increased. However, like a light beam L12 depicted in FIG. 19A, a part of light beams is totally reflected from the other inclined surface 77 and, as a result, the shift angle β may be decreased in some cases.

Also, when the inclination angle φ of the V groove 76 is large and the incident light has a spreading directivity characteristic, like a light beam L13 depicted in FIG. 19B, the amount of light beams having a small shift angle β is increased, and the shift angle β is not increased as targeted.

Figure 20A:
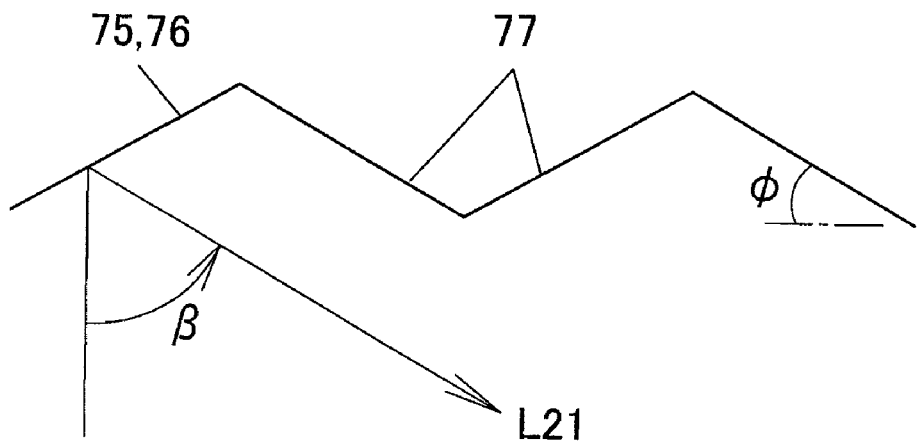
FIGS. 20A and 20B are schematic sectional diagrams taken along the D-D line of FIG. 18A, depicting the behavior of light when a V groove has an inclination angle of 30° according to one or more embodiments of the present invention.
Figure 20B:
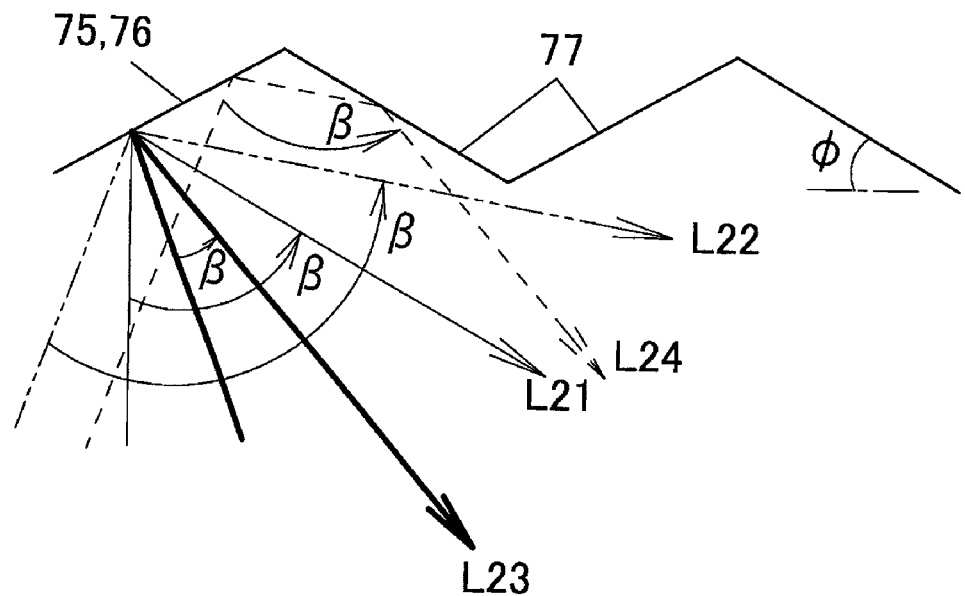

By contrast, FIG. 20A and FIG. 20B depict the case in which the inclination angle φ of the V groove 76 is 30°. When the inclination angle φ of the inclined surface 77 of the V groove 76 is on the order of 30°, a light beam traveling straight along the V groove 76 (in the strict sense, a light beam travelling along the inside of an xz plane), like a light beam L21 depicted in FIG. 20A is totally reflected on one inclined surface 77 and then reflected in a direction parallel to the other inclined surface 77 and, as a result, a large shift angle β can be obtained. Also in this case, like light beams L21, L22, and L23 depicted in FIG. 20B, even if the directivity characteristic of the light beam entering the directivity conversion pattern 75 is widened, for most of light beams, light reflected from one inclined surface 77 is less prone to be reflected from the other inclined surface, and therefore the shift angle β is less prone to be decreased. Although a part of light is totally reflected from one inclined surface 77 and is then further totally reflected from the other inclined surface 77, the reflecting direction is within a spread of the reflected light, like a light beam L24 depicted in FIG. 20B, and light can be reflected in an approximately targeted direction (in the case of FIG. 20B, a direction parallel to the light beam L23).

When the inclination angle θ of the inclined surface 77 is 30°, a direction after the light beam traveling straight along the V groove 76 is reflected from the inclined surface 77, and the other inclined surface 77 are parallel to each other. If a relation between the light-beam direction after this light beam is reflected from the inclined surface 77, and the inclined surface 77 is shifted from being parallel, the amount of reflected-light component having a small angle of reflection by the directivity conversion pattern 75 is increased. Thus, theoretically, the directivity conversion pattern 75 may be configured with the V grooves 76 having a vertical angle of 120°.

Figure 21:
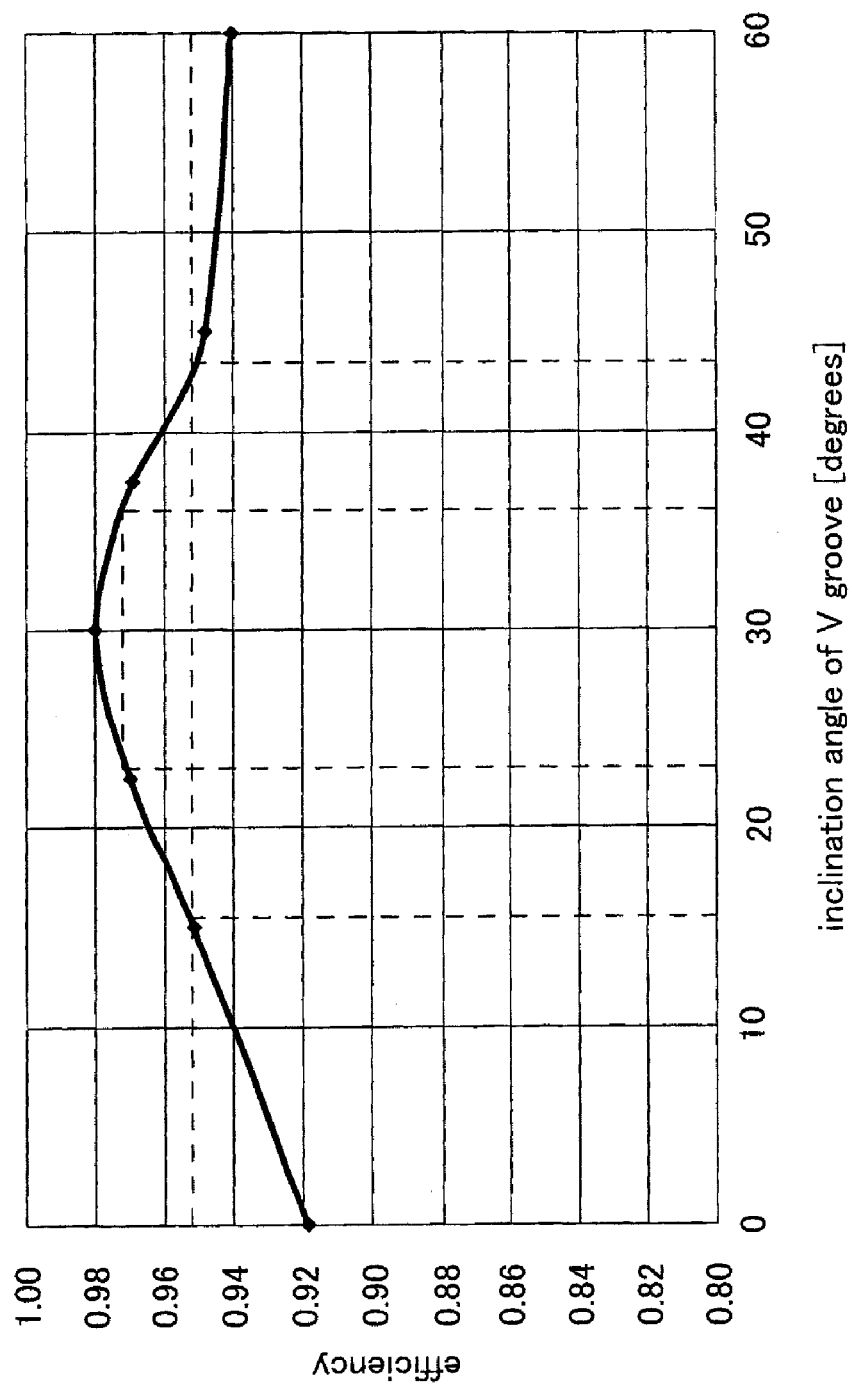
FIG. 21 is a diagram of the results of calculating a relation between the inclination angle of the light introducing part and efficiency according to one or more embodiments of the present invention.

FIG. 21 depicts the results of calculating a relation between the inclination angle φ and efficiency to verify a range of the inclination angle φ of the V groove 76. As described above also, efficiency represents how much light of incident light is transmitted from the light introducing part 69 to the light guide plate body 68 without leakage when the light is let enter the light incidence end face 70 or the light introducing part 69 with a flat edge. Efficient of 1 means the case in which all of light entering the light introducing part 69 is sent to the light guide plate body 68 without leakage.

As can be seen from FIG. 21, efficiency is best with the inclination angle φ=30°, and efficiency decreases even if the inclination angle φ is smaller or larger than 30°. If the inclination angle is far away from 30°, a decreasing rate of efficiency is mild. What is characteristic is a range of efficiency higher than a line of approximately 0.952. Thus, according to one or more embodiments of the present invention, the inclination angle φ of the V groove 76 may be equal to or larger than 15.5° and equal to or smaller than 43.5°. Additionally, according to one or more embodiments of the present invention, the inclination angle θ may be equal to or larger than 23° and equal to or smaller than 36° (efficiency is equal to and larger than 0.972).

However, because the actual shape of the V groove 76 may have its tip rounded or a flat part, it is also possible to define the shape not with the range of the inclination angle θ but with the ratio of components. Therefore, if the directivity conversion pattern 75 is configured of the V grooves 76 with 50% or more of those in the inclination angle range described above, efficiency can be increased compared with the case in which only the inclined surface 73 is provided to the light introducing part 69. Also, the directivity of the point light source 62 is concentrated on a place near the center, and therefore the V grooves may be densely provided near the center of the point light source 62, and their distribution may be symmetrical. Conversely, efficiency is low in the state where the place near the center is entirely a total flat surface and the V grooves 76 are provided to a place other than the place near the center.

(Inclination Angle Frequency Distribution)

Also, the directivity conversion pattern 75 can be represented by using a concept of an inclination angle frequency distribution. That is, the directivity conversion pattern 75 has an inclination angle frequency distribution in which a frequency in a range of inclination angles equal to or larger than 15.5° and equal to or smaller than 43.5° occupies 50% or more of the total. The concept of the inclination angles and the frequency distribution used herein is described below.

First, in a region in which the directivity conversion pattern 75 is formed, a predetermined region is divided into micro-regions each having a small area, and project areas of the respective micro-regions are taken as M1, M2, . . . and their (maximum) inclination angles are taken as φ1, φ2, . . . . Here, the project areas M1, M2, . . . are project areas of the respective micro-regions viewed in a direction perpendicular to the light guide plate body 68. Then, the inclination angles φ1, φ2, . . . of the micro-regions are classified in units of 1°, a total of project areas is found for each inclination angle, and the result obtained by dividing the total of the project areas by all project areas (the area of the predetermined region) is taken as a frequency. For example, a range from inclination angles 0.5° to 1.5° is taken as 1°, and a sum of the project areas of the micro-regions within the range of the inclination angles 0.5° to 1.5° is found, and the result is divided by all project areas to obtain a frequency of an inclination angle of 1°. Similarly, frequencies of inclination angles of 2°, 3°, . . . are found. These frequencies plotted on a vertical axis and the inclination angles plotted on a horizontal axis is referred to as an inclination angle frequency distribution.

Figure 22A:
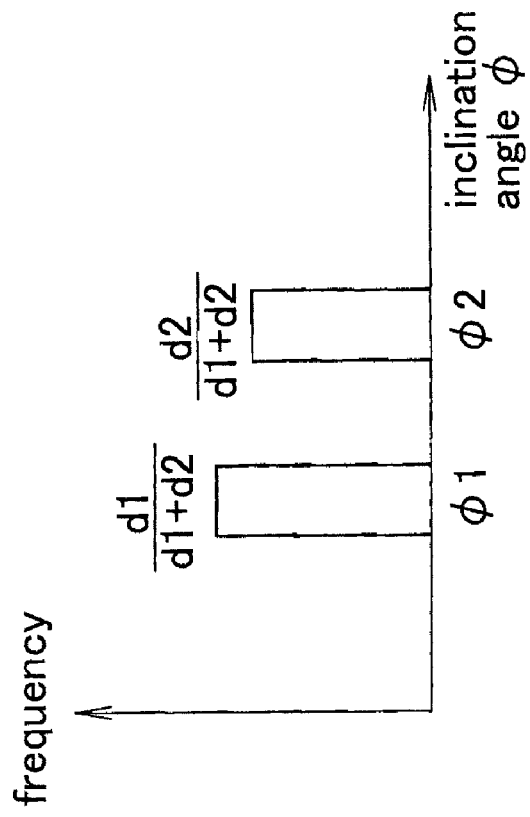
FIG. 22A is a diagram of a unit pattern having a mountain-shaped section according to one or more embodiments of the present invention.
Figure 22B:
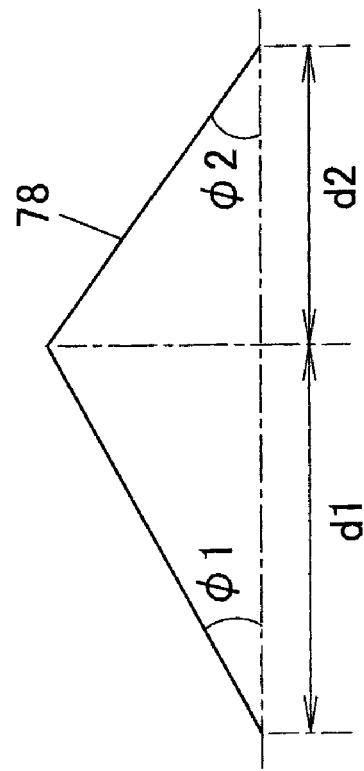
FIG. 22B is a diagram of an inclination angle frequency distribution of the unit pattern depicted in FIG. 12A according to one or more embodiments of the present invention.

If all unit patterns forming the directivity conversion pattern 75 have the same shape and each unit pattern has a uniform section along its length direction, a section of only one unit pattern (a section perpendicular to a length direction of the unit pattern) is considered for the inclination angle frequency distribution. FIG. 22A depicts a unit pattern 78 having a mountain-shaped section, with an inclination angle of one inclined surface being φ1, its width being d1, an inclination angle of the other inclined surface being φ2, and its width being d2. In this case, the frequencies of the inclination angles φ1 and φ2 are d1/(d1+d2) and d2/(d1+d2), respectively, and the inclination angle frequency distribution is as depicted in FIG. 22B.

Figure 23B:
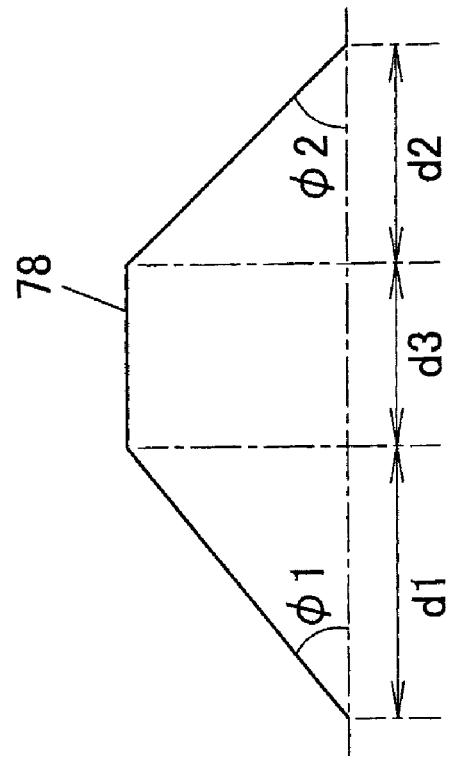
FIG. 23B is a diagram of an inclination angle frequency distribution of the unit pattern depicted in FIG. 23A according to one or more embodiments of the present invention.
Figure 23A:
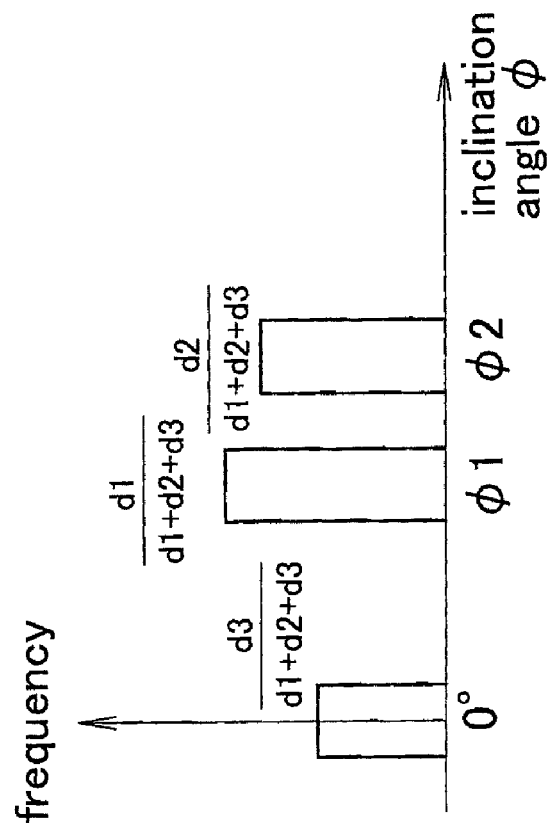
FIG. 23A is a diagram of a unit pattern having a trapezoidal section according to one or more embodiments of the present invention.

Also, FIG. 23A depicts a unit pattern 78 having a trapezoidal section, with an inclination angle of one inclined surface being φ1, its width being d1, an inclination angle of the other inclined surface being φ2, its width being d2, and a width of a horizontal surface at center being d3. In this case, the frequencies of the inclination angles of 0°, φ1, and φ2 are d3/(d1+d2+d3), d1/(d1+d2+d3), and d2/(d1+d2+d3), respectively, and the inclination angle frequency distribution is as depicted in FIG. 23B.

Figure 24:
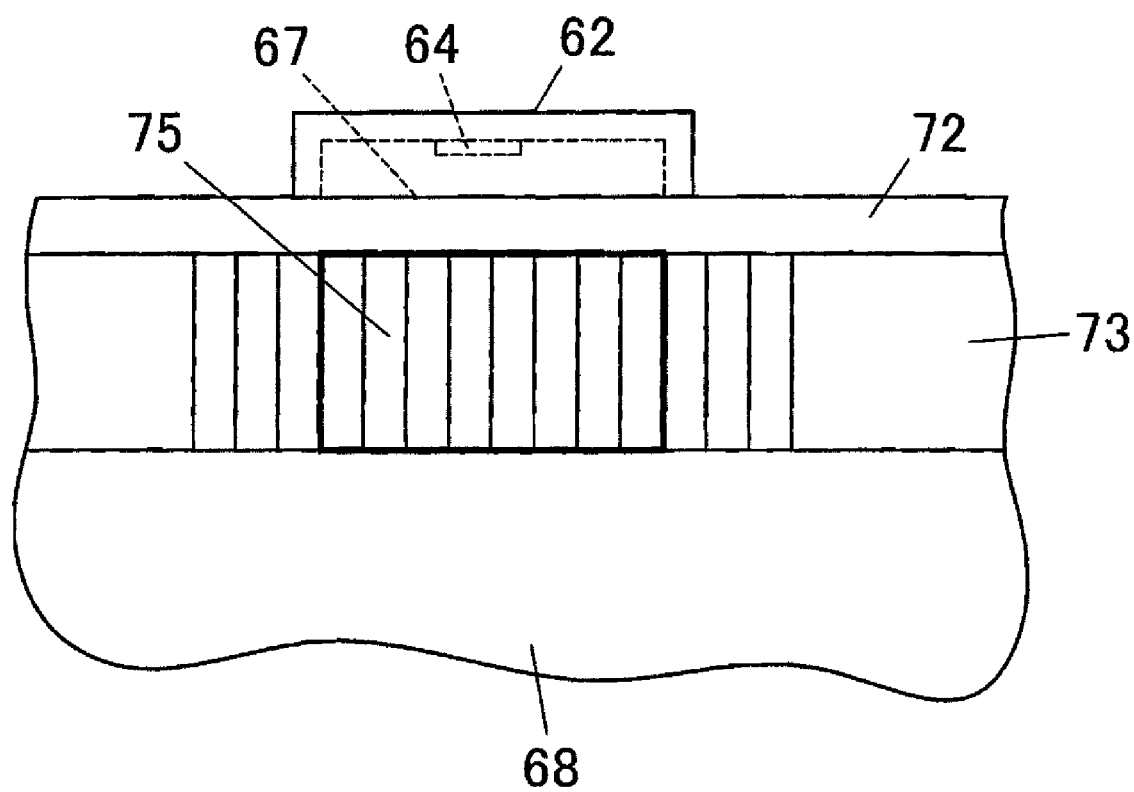
FIG. 24 is a diagram of a predetermined region for calculating an inclination angle frequency distribution according to one or more embodiments of the present invention.
Figure 25:
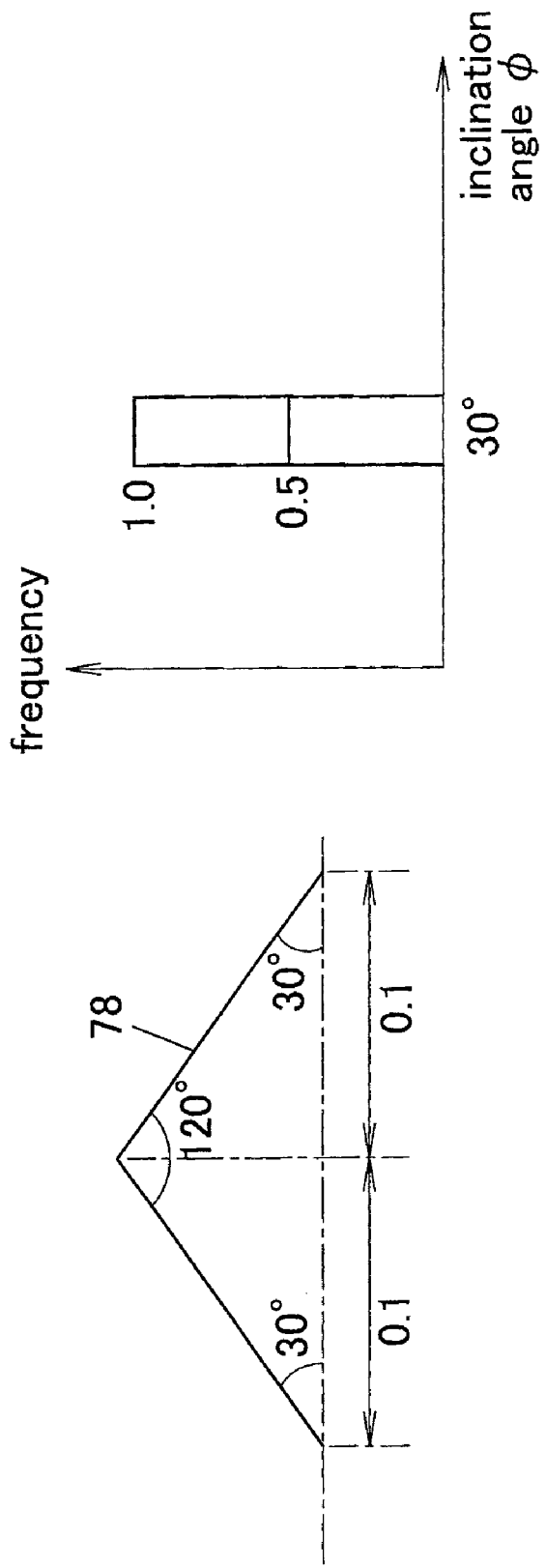
FIG. 25A depicts a triangular pattern having a vertical angle of 120° according to one or more embodiments of the present invention.
FIG. 25B is a diagram of an inclination angle frequency distribution of the pattern depicted in FIG. 25A according to one or more embodiments of the present invention.
Figure 26:
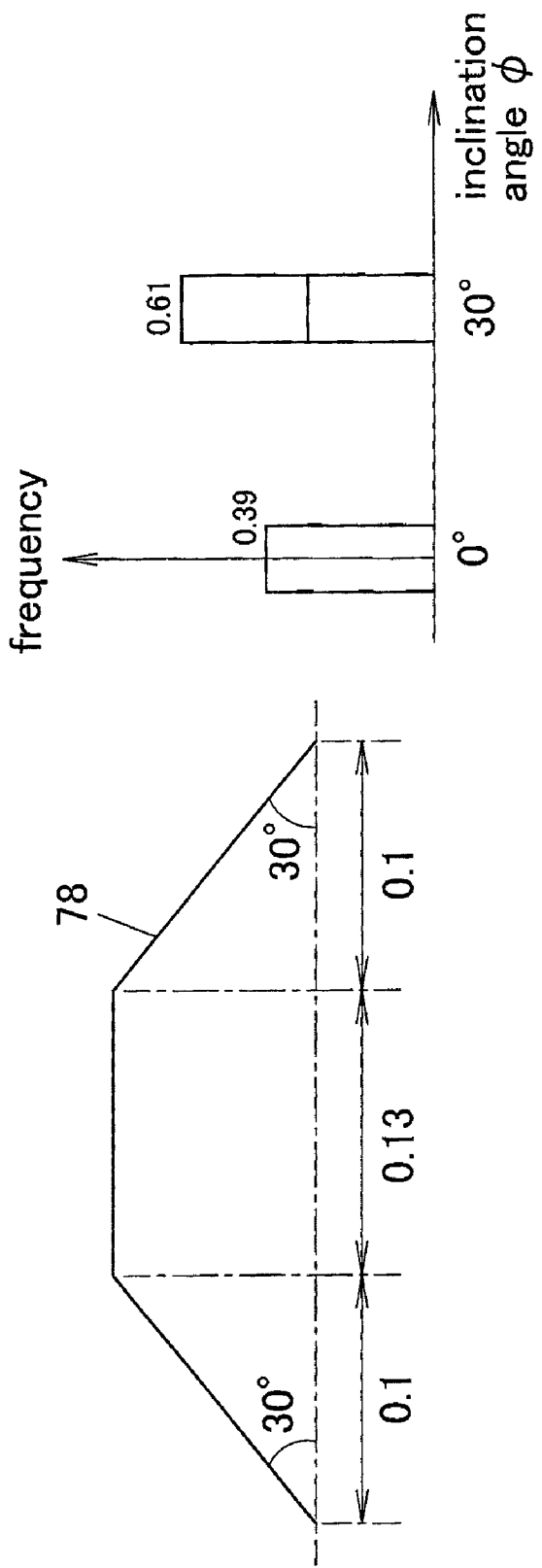
FIG. 26A depicts a trapezoidal pattern having a base angle of 30° according to one or more embodiments of the present invention.
FIG. 26B is a diagram of an inclination angle frequency distribution of the pattern depicted in FIG. 26A according to one or more embodiments of the present invention.

FIG. 24 depicts the directivity conversion pattern 75 disposed toward the front of the point light source 62, and a region surrounded by a bold solid line represents the predetermined region for calculating an inclination angle frequency distribution. When the directivity conversion pattern 75 is provided on the inclined surface 73 of the light introducing part 69, the inclination angle frequency distribution is calculated in a region positioned between an upper end edge and a lower end edge of the inclined surface 73 and having a width equal to that of the light exit window 67 (light-emitting surface) of the point light source 62.

Figure 27:
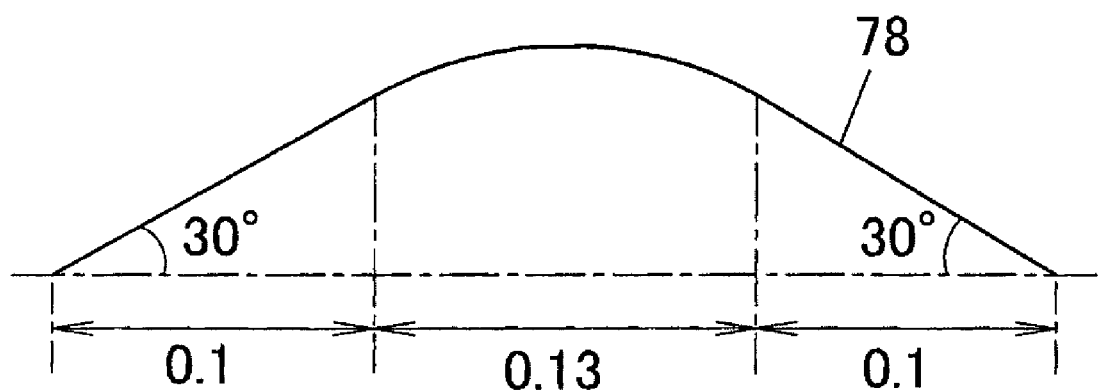
FIG. 27 is a schematic diagram of a unit pattern with inclined surfaces at both ends and a curved center portion, each of the inclined surfaces having an inclination angle of 30° according to one or more embodiments of the present invention.
Figure 28:
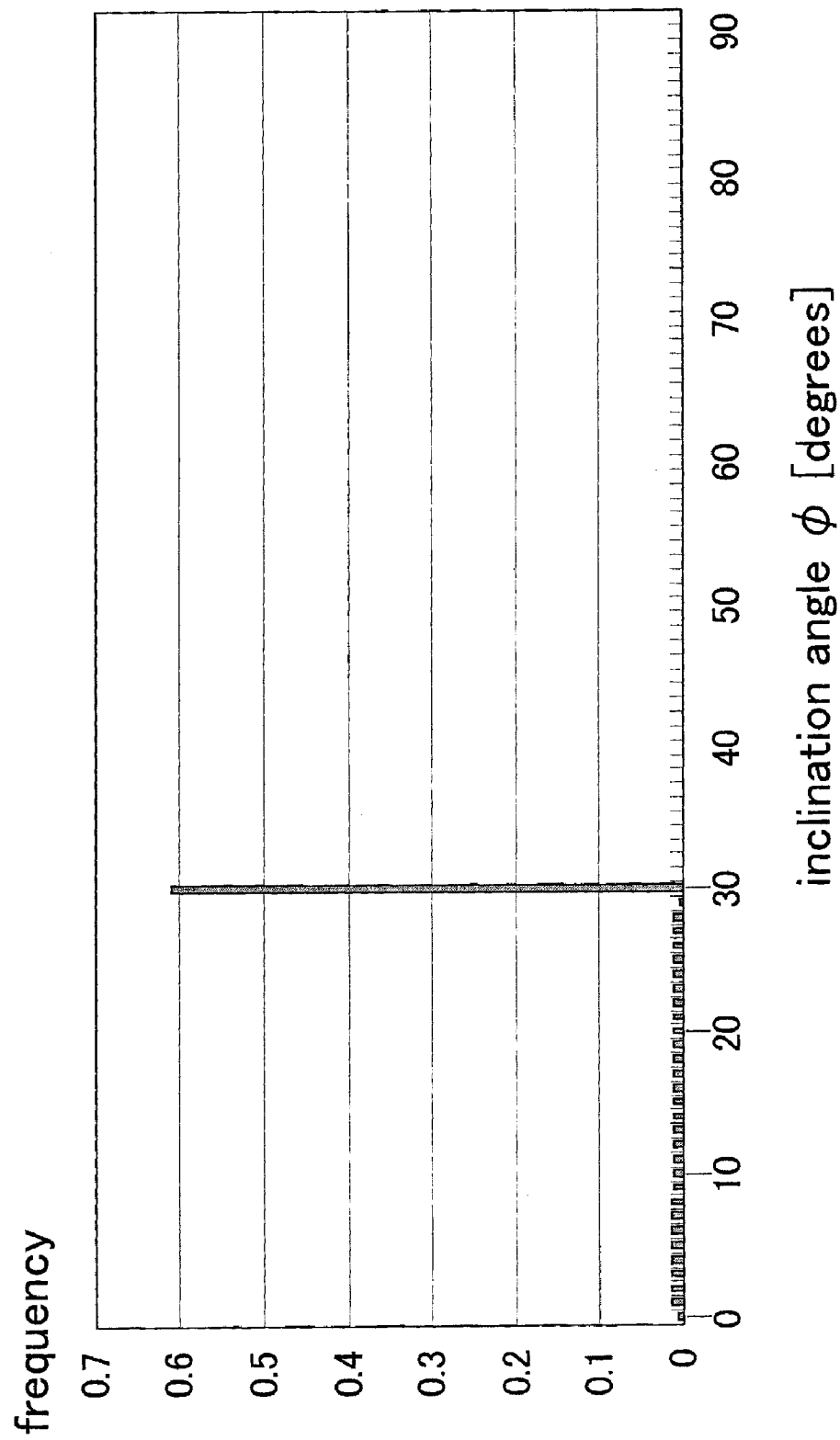
FIG. 28 is a diagram of an inclination angle frequency distribution of the unit pattern depicted in FIG. 27 according to one or more embodiments of the present invention.
Figure 29:
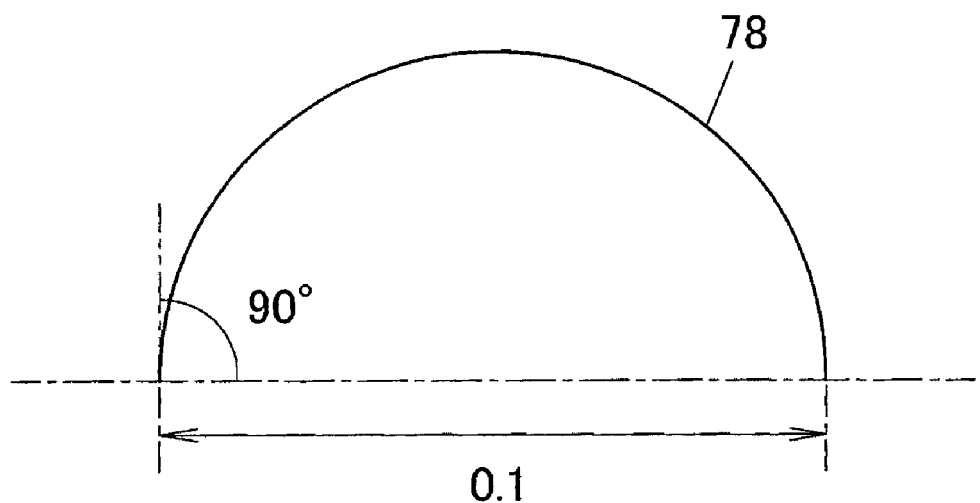
FIG. 29 is a schematic diagram of a unit pattern having a semicircular section according to one or more embodiments of the present invention.
Figure 30:
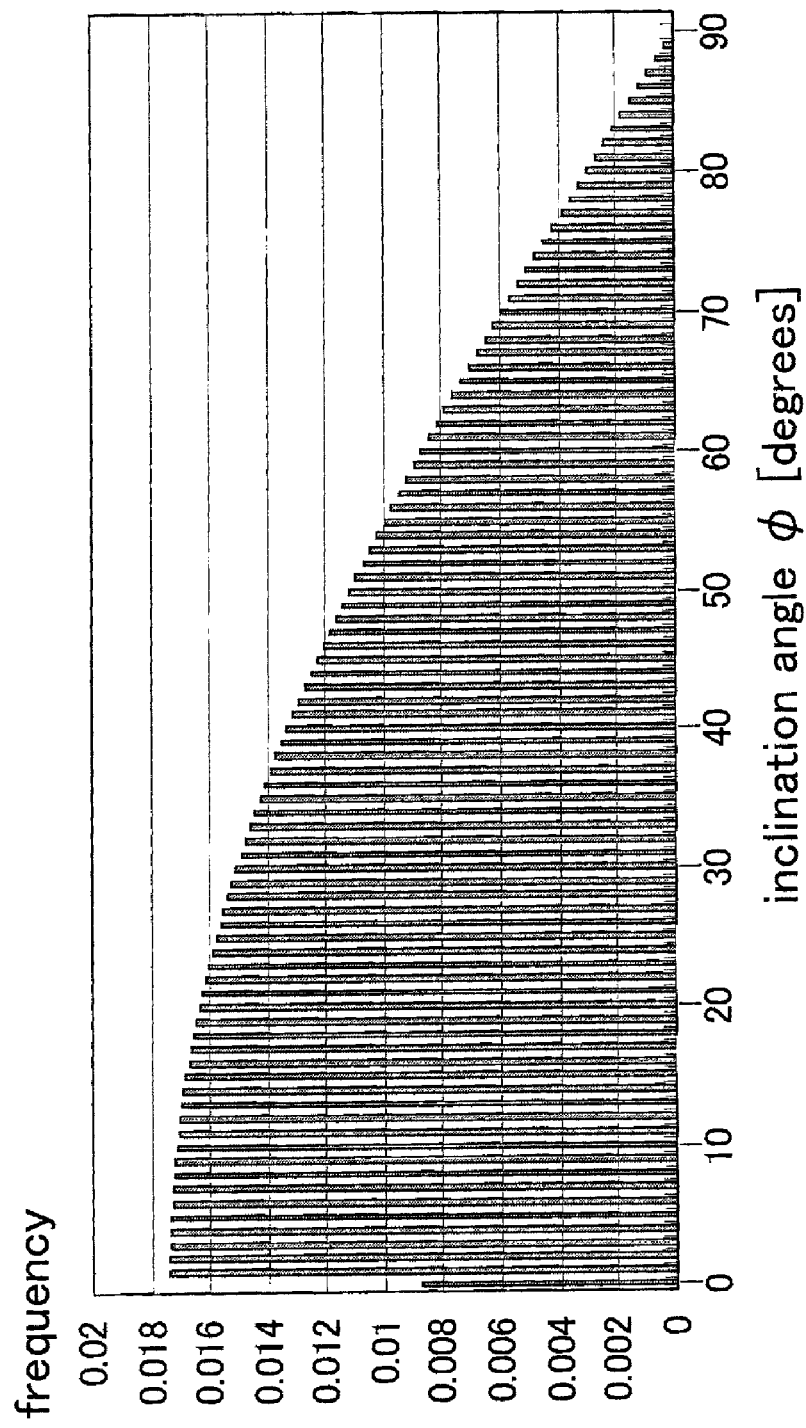
FIG. 30 is a diagram of an inclination angle frequency distribution of the unit pattern depicted in FIG. 29 according to one or more embodiments of the present invention.
Figure 31:
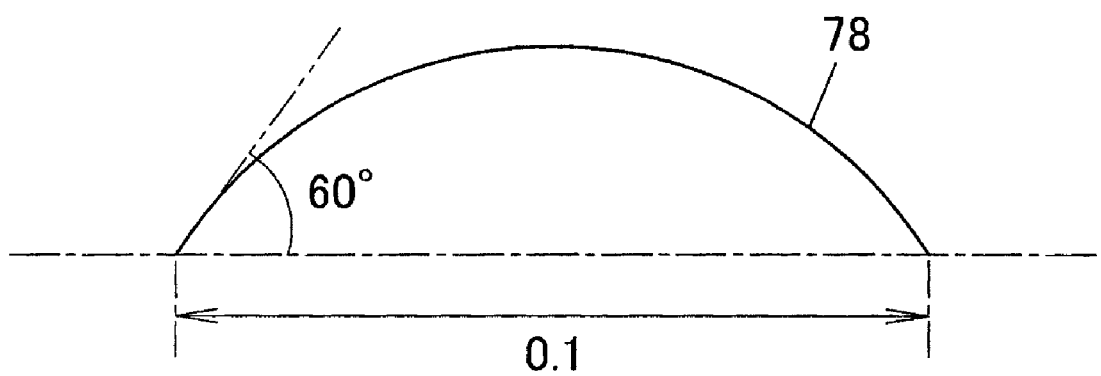
FIG. 31 is a schematic diagram of a unit pattern having an arc-shaped section according to one or more embodiments of the present invention.
Figure 32:
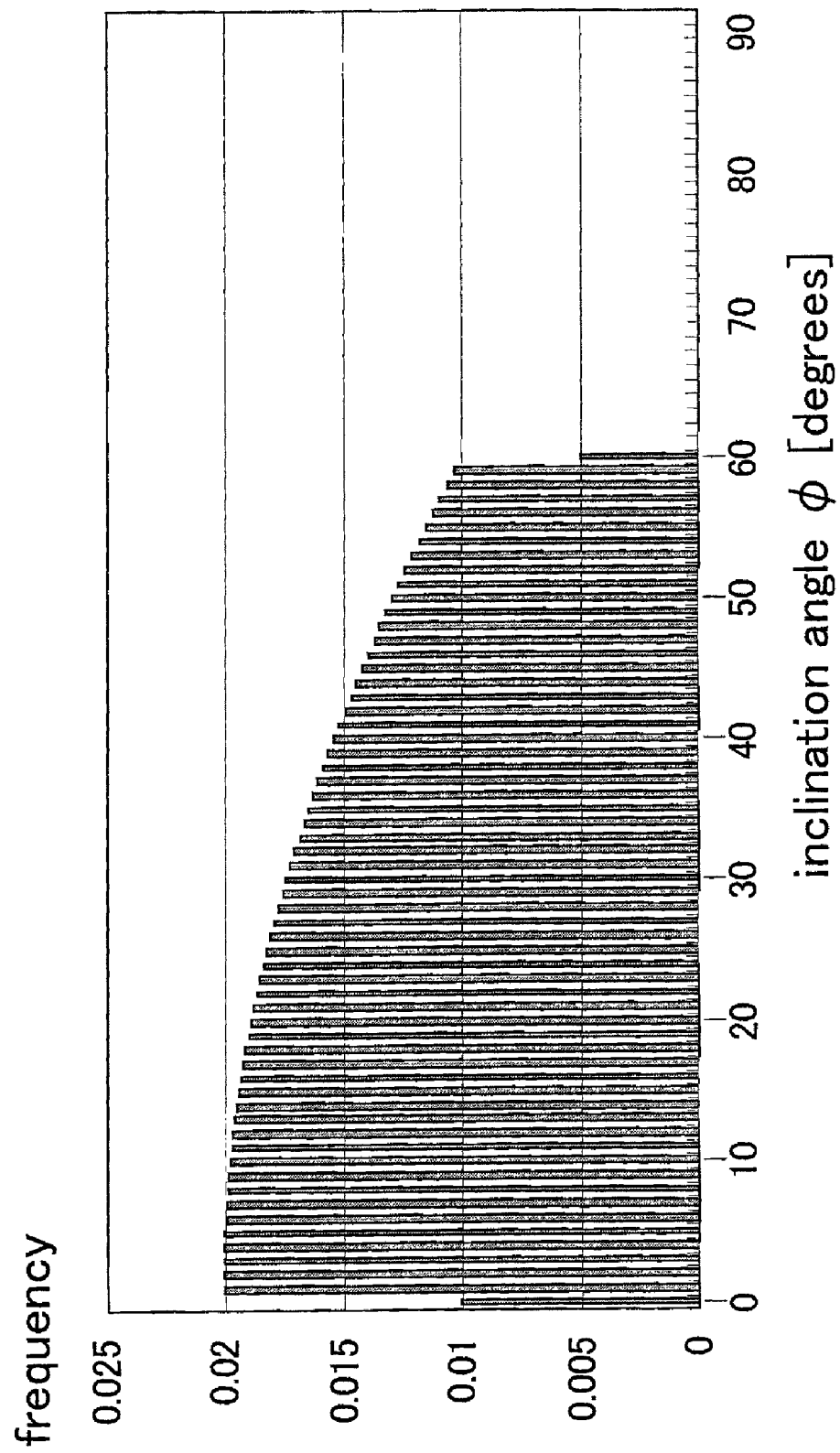
FIG. 32 is a diagram of an inclination angle frequency distribution of the unit pattern depicted in FIG. 31 according to one or more embodiments of the present invention.

Some examples of the inclination angle frequency distribution are depicted in FIG. 25 to FIG. 29. FIG. 25A depicts a mountain-shaped unit pattern having an inclination angle of φ=30° (a vertical angle of 120°, and FIG. 25B depicts an inclination angle frequency distribution of that pattern. This is in the case of the directivity conversion pattern 75 of the surface light source device 61 depicted in FIG. 10 and FIG. 11. FIG. 26A depicts a trapezoidal unit pattern having an inclination angle of inclined surfaces at both ends of φ=30°, and FIG. 26B depicts an inclination angle frequency distribution of that pattern. FIG. 27 depicts a unit pattern with inclined surfaces at both ends and a curved center portion, each of the inclined surfaces having an inclination angle of φ=30°, and FIG. 28 depicts an inclination angle frequency distribution of that unit pattern. FIG. 29 depicts a unit pattern having a semicircular section, and FIG. 30 depicts an inclination angle frequency distribution of that unit pattern. FIG. 31 depicts a unit pattern having an arc-shaped section, and FIG. 32 depicts an inclination angle frequency distribution of that unit pattern.

According to FIG. 21, the inclination angle φ of the V groove 76 may be equal to or larger than 15.5° and equal to or smaller than 43.5°. Additionally, in one or more embodiments of the present invention, the inclination angle φ is equal to or larger than 23° and equal to or smaller than 36°. In consideration of fluctuations in molding and bluntness of the shape of the V grooves 76, this optimum condition can be represented as follows by using an inclination angle frequency distribution. That is, regarding to an inclination angle frequency distribution of the directivity conversion pattern 75 in a region positioned between an upper end edge and a lower end edge of the inclined surface 73 of the light introducing part 69 and having a width equal to that of the light exit window 67 (light-emitting surface) of the point light source 62, it may be that, according to one or more embodiments of the present invention, a frequency in a range of inclination angles equal to or larger than 15.5° and equal to or smaller than 43.5° occupies 50% or more of the total. And, it is also may be that, according to one or more embodiments of the present invention, a frequency in a range of inclination angles equal to or larger than 23° and equal to or smaller than 36° occupies 50% or more of the total.

Figure 33:
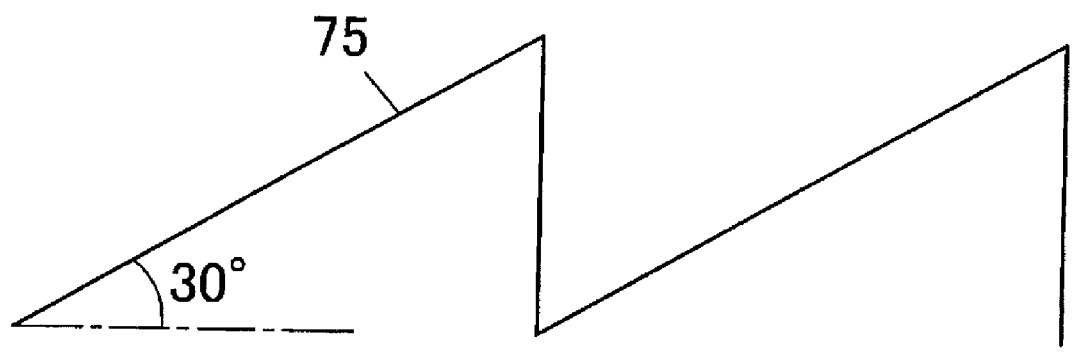
FIG. 33 is a schematic diagram of a unit pattern having a sawtooth section according to one or more embodiments of the present invention.

Note that the unit pattern configuring the directivity conversion pattern 75 is not restricted to a V groove, a mountain-shaped pattern, and others having a symmetrical section and similar effects can be obtained even with a pattern having a sawtooth section as depicted in FIG. 33, the section being formed of inclined surfaces (in the example depicted in the drawing, inclined surfaces having an inclination angle of 30° and vertical surfaces. In short, any pattern can be used as long as at least a part is formed of an inclined surface.

(Other Conditions)

Figure 34:
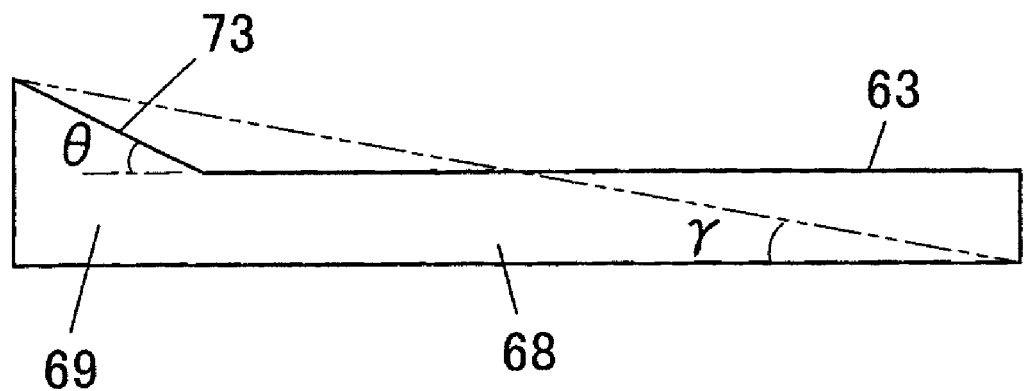
FIG. 34 is a diagram of a relation between an inclination angle formed with a line segment connecting an upper end of the inclined surface and an end of a surface opposite to the inclined surface of a light guide plate body on aside away from a point light source in a vertical section of an inclined surface along a maximum inclination direction, and an inclination angle of the inclined surface according to one or more embodiments of the present invention.

In the light guide plate 63 for use in one or more embodiments of the present invention, as depicted in FIG. 34, the inclination angle θ of the inclined surface 73 of the light introducing part 69 is larger than an inclination angle γ formed with a line segment connecting an upper end of the inclined surface 73 and an end of a surface opposite to the inclined surface 73 of the light guide plate body 68 on a side away from the point light source 62 in a vertical section of the inclined surface 73 along a maximum inclination direction (an x-axis direction), and is smaller than 90°. This has a meaning of distinguishing from a wedge-shaped light guide plate with its thickness gradually thinner as a whole. This is because the light guide plate having a wedge shape as a whole is difficult to mold due to a thin tip, and making the light guide plate thinner is also difficult.

Furthermore, in the light guide plate 63 for use in one or more embodiments of the present invention, a ratio t/T of the thickness t of the light guide plate bode 68 with respect to the thickness T (maximum thickness) of the light introducing part 69 is equal to or smaller than 0.8. When no directivity conversion pattern 75 is provided to the light introducing part 69 and only the inclined surface 73 is present, the thickness of the light guide plate body 68 capable of confining light and being made thinner is uniquely defined. According to FIG. 4 described above, a ratio capable of confining light between the thickness T of the light introducing part 69 and the thickness t of the light guide plate body 68 is t/T=0.91 in the case of acrylic resin and t/T=0.84 in the case of polycarbonate resin. If the ratio is higher than the above, only the inclined surface 73 will suffice. However, if the ratio is lower than the above, a combination with the directivity conversion pattern 75 is important. Thus, in one or more embodiments of the present invention, the ratio is defined as t/T≦0.8.

Still further, in the surface light source device 61 of one or more embodiments of the present invention, the depth and height of the directivity conversion pattern 75 (in the embodiment, the V groove 76) may be constant with respect to the inclined surface 73. The reason for this is described in comparison with comparison examples.

Figure 35A:
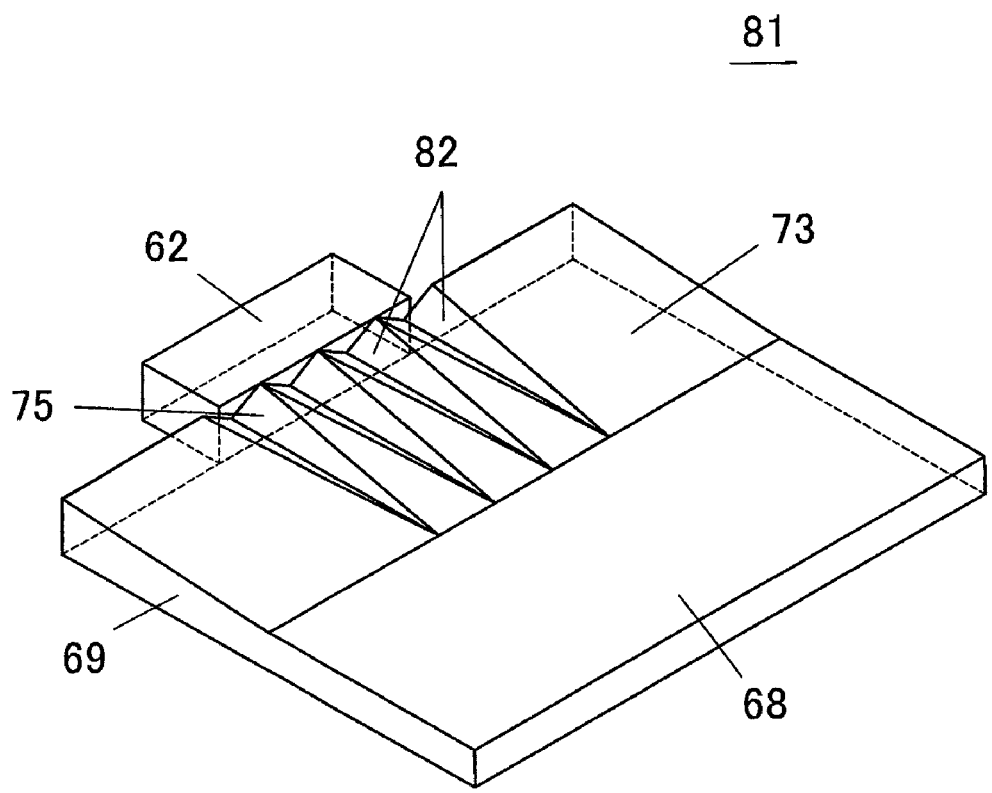
FIG. 35A is a perspective view of a surface light source device according to a first comparison example according to one or more embodiments of the present invention.
Figure 35B:
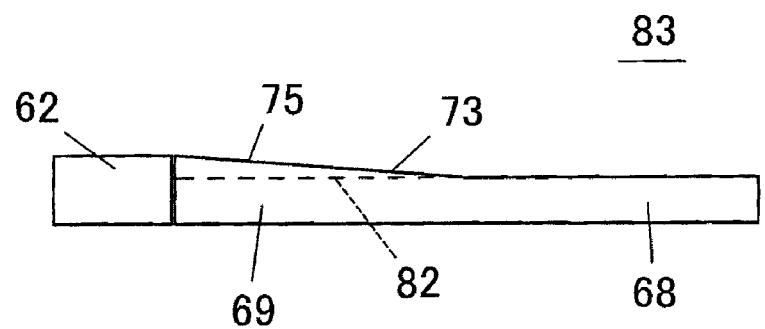
FIG. 35B is a side view of the surface light source device depicted in FIG. 35A according to one or more embodiments of the present invention.
Figure 36:
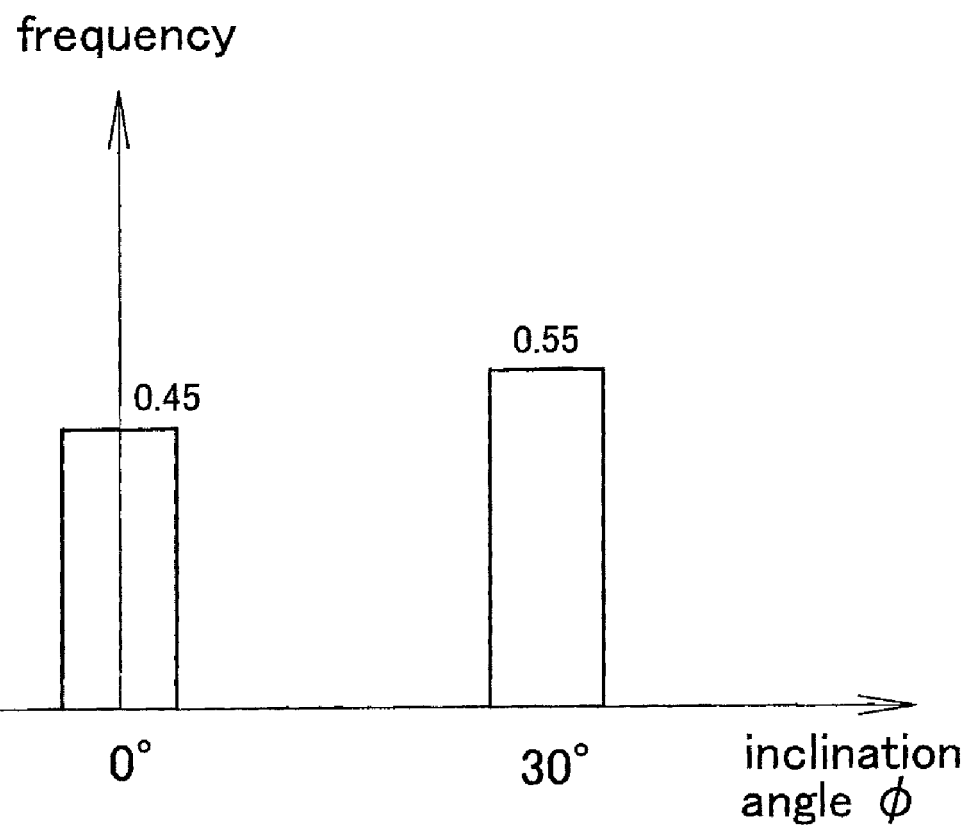
FIG. 36 is a diagram of an inclination angle frequency distribution of the first comparison example according to one or more embodiments of the present invention.

FIG. 35A is a perspective view of a surface light source device 81 according to a first comparison example, and FIG. 35B is a side view thereof. In this first comparison example, the directivity conversion pattern 75 formed of V grooves 82 having a vertical angle of 120° is provided on the inclined surface 73 immediately before the point light source 62. The V grooves 82 are gradually deeper on a point light source 62 side, and valley lines of the V grooves 82 are within a plane obtained by extending the light exit surface 71 of the light guide plate body 68. In this case, an inclination angle frequency distribution calculated in a region positioned toward the front of the point light source 62 is as depicted in FIG. 36.

Figure 37A:
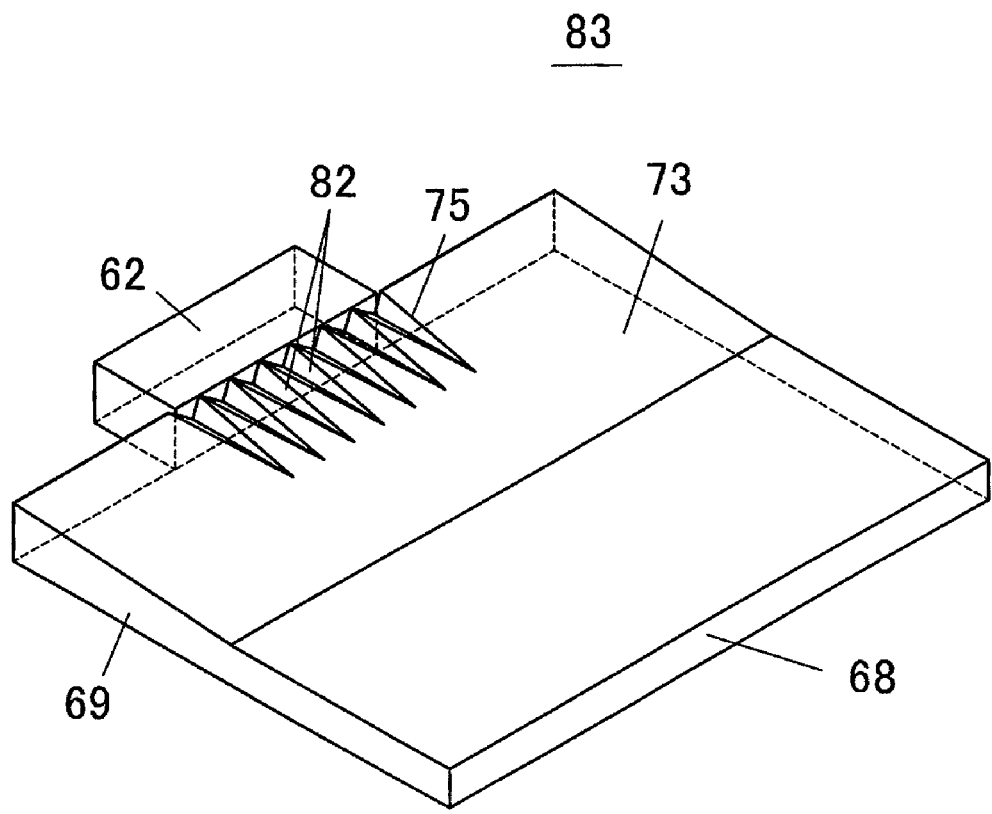
FIG. 37A is a perspective view of a surface light source device according to a second comparison example according to one or more embodiments of the present invention.
Figure 37B:
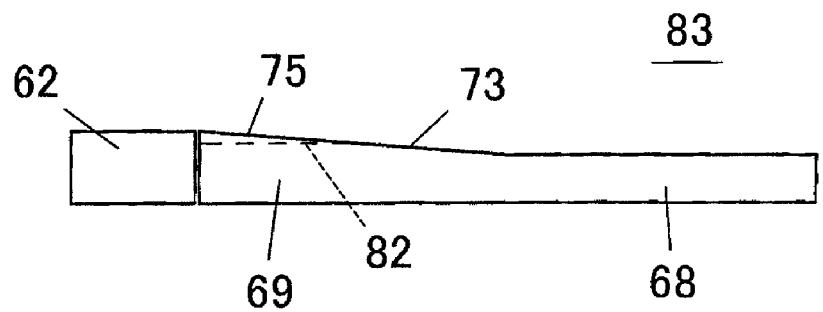
FIG. 37B is a side view of the surface light source device depicted in FIG. 37A according to one or more embodiments of the present invention.
Figure 38:
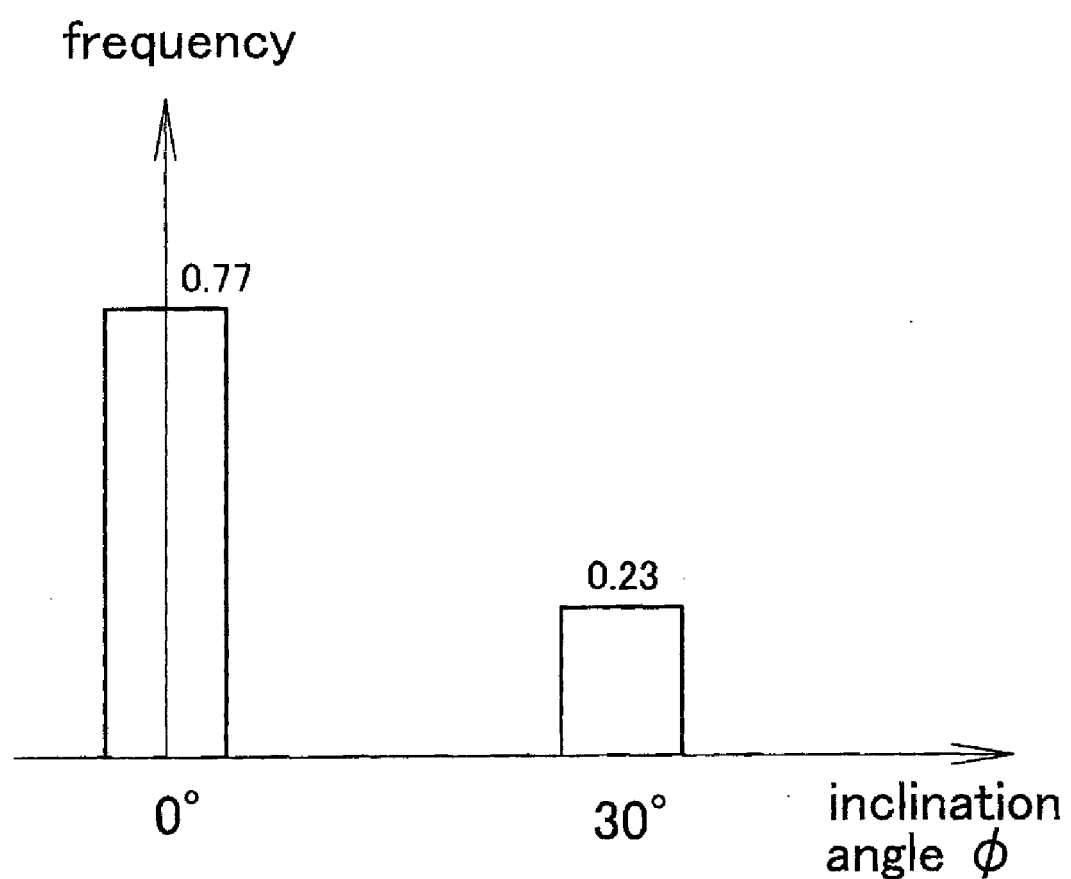
FIG. 38 is a diagram of an inclination angle frequency distribution of the second comparison example according to one or more embodiments of the present invention.

FIG. 37A is a perspective view of a surface light source device 83 according to a second comparison example, and FIG. 37B is a side view thereof. The V grooves 82 of this second comparison example also have a shape similar to that of the first comparison example, having a vertical angle of 120°. However, the directivity conversion pattern 75 is provided in a region half the length of the inclined surface 73, and the depth of the V grooves 82 in the light incidence end face 70 is half the depth of the first comparison example. That is, in the second comparison example, valley lines of the V grooves 82 are positioned at a height half a vertical distance between the light exit surface 71 and the upper end edge of the light incidence end face 70 when vertically measured from the light exit surface 71. In this case, an inclination angle frequency distribution calculated in a region positioned toward the front of the point light source 62 is as depicted in FIG. 38.

Figure 39A:
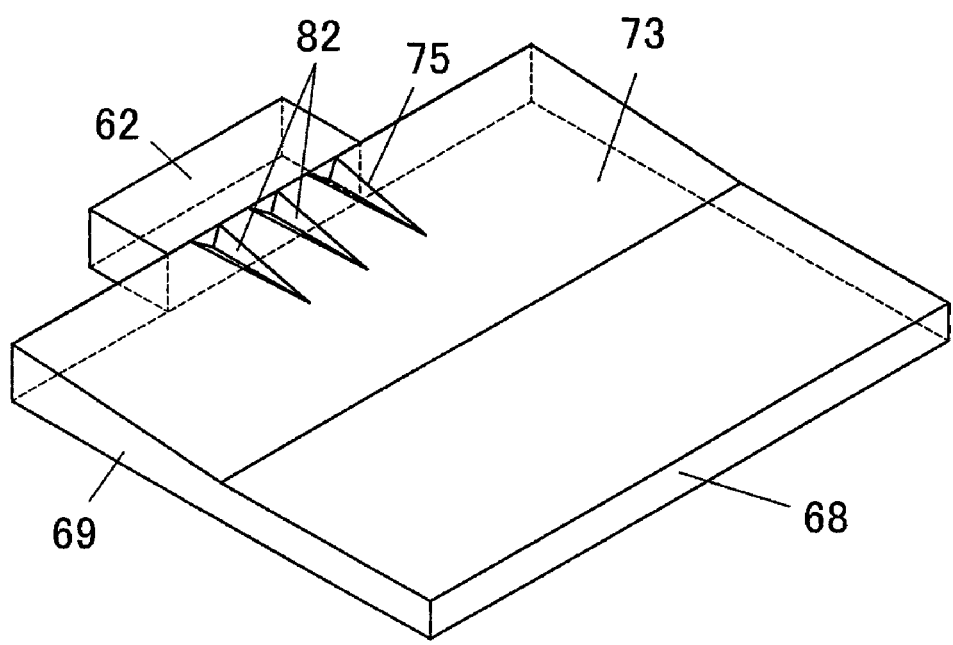
FIG. 39A is a perspective view of a surface light source device according to a third comparison example according to one or more embodiments of the present invention.
Figure 39B:
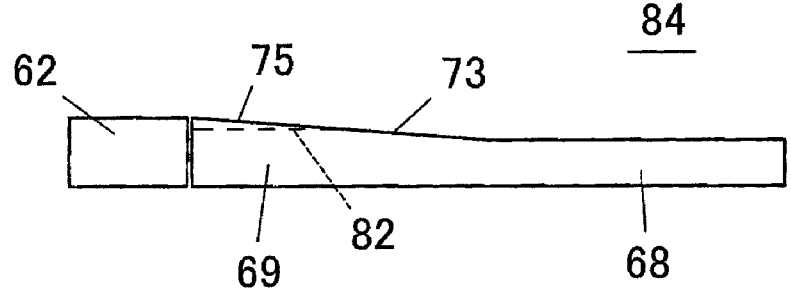
FIG. 39B is a side view of the surface light source device depicted in FIG. 39A according to one or more embodiments of the present invention.
Figure 40:
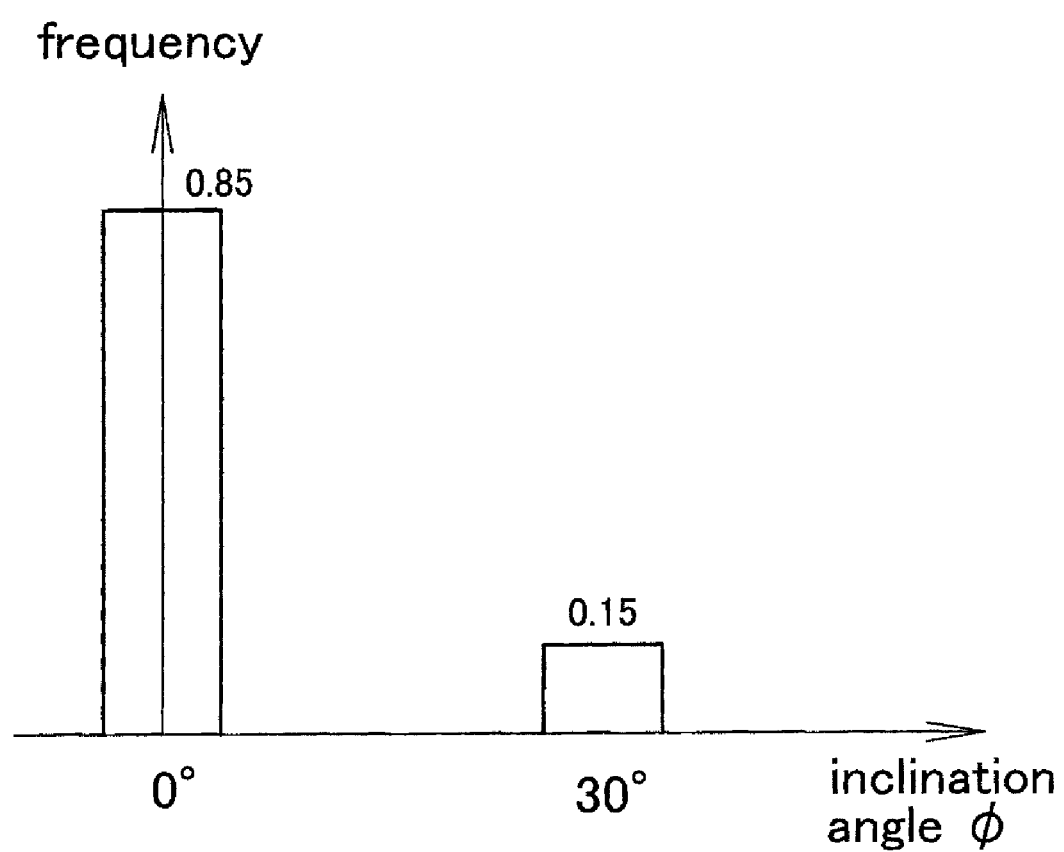
FIG. 40 is a diagram of an inclination angle frequency distribution of the third comparison example according to one or more embodiments of the present invention.

FIG. 39A is a perspective view of a surface light source device 84 according to a third comparison example, and FIG. 39B is a side view thereof. In the third comparison example, the number of V grooves 82 is decreased by omitting every other V grooves 82 of the second comparison example. In this case, an inclination angle frequency distribution calculated in a region positioned toward the front of the point light source 62 is as depicted in FIG. 40.

Efficiencies (=light amounts reaching the light guide plate body/light amounts entering the light introducing part) of the surface light source devices 81, 83, and 84 of these first to third comparison examples are found, and are compared with the efficiency of the surface light source device 61 of the first embodiment, thereby obtaining the results as follows.

First embodiment efficiency: 98%
First comparison example efficiency: 83%
Second comparison example efficiency: 89%
Third comparison example efficiency: 90%

From this, it can be found that efficiency is decreased with the V grooves 82 having varied groove depth, compared with the V grooves 76 having a uniform groove depth.

Figure 41A:
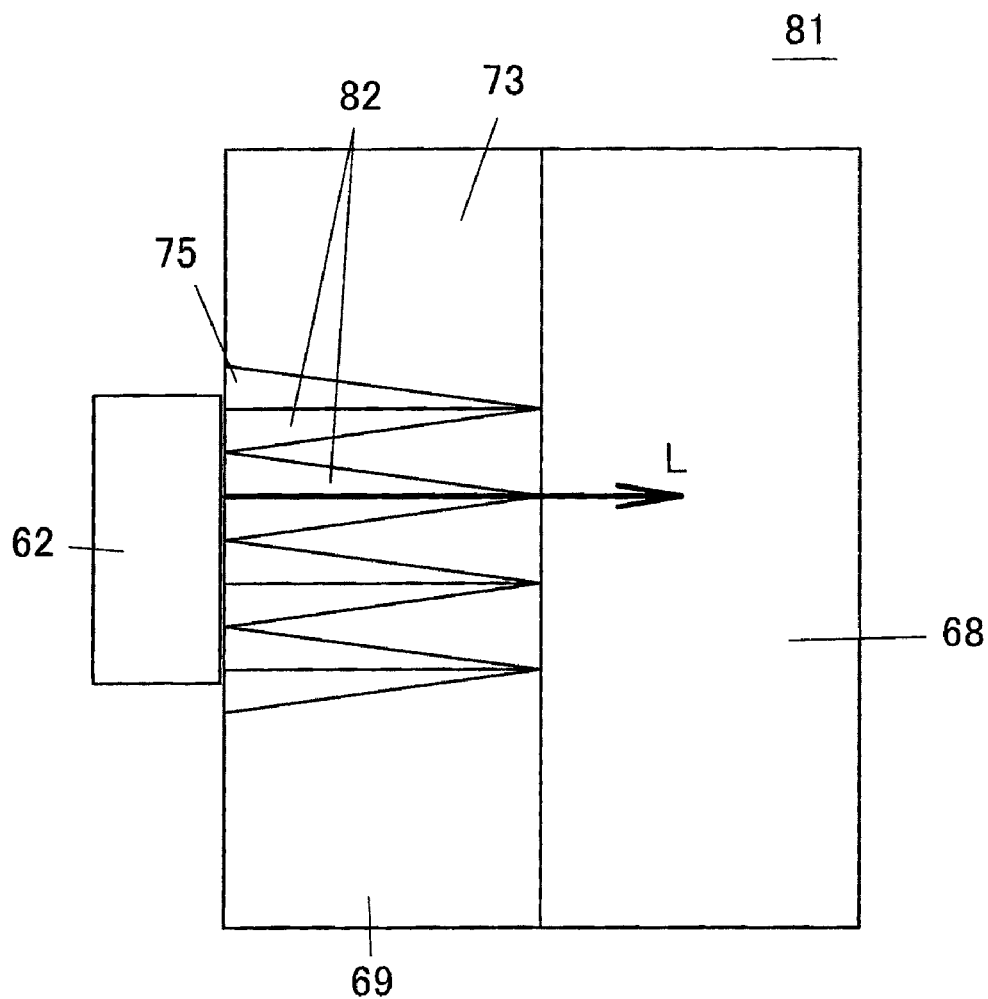
FIGS. 41A and 41B are diagrams for describing the reason whey light from a point light source tends to leak in the first comparison example according to one or more embodiments of the present invention.
Figure 41B:
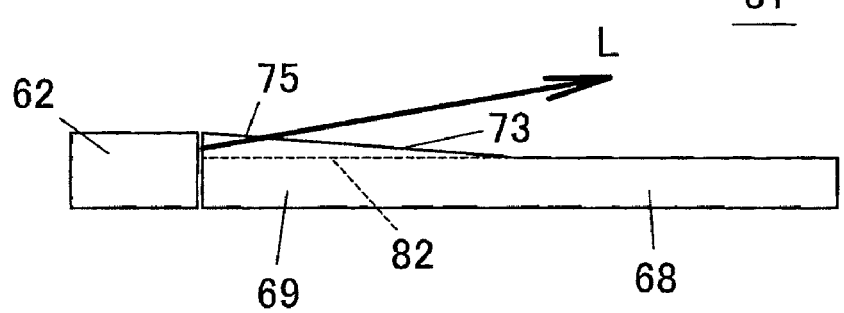

The reason why the efficiency is low in the first to third comparison examples can be guessed as follows. In the case of the first comparison example, by deepening the depth of the V grooves 82 in order to maximize the ratio of the inclination angle of 30° in the inclination angle frequency distribution, as depicted in FIG. 41A and FIG. 41B, the light L does not enter the light guide plate 63 from the light incidence end face 70 but directly passes through a space of the V groove 82 on an air layer side. Thus, the light L from the point light source 62 is prone to leak.

In the second comparison example, because the depth of the V grooves 82 is shallower than that of the first comparison example, light not entering the light guide plate 63 but passing through the V grooves 82 is less than that of the first comparison example, thereby increasing efficiency. However, because the ratio of frequency of the inclination angle of 30° in the inclination angle frequency distribution is equal to or lower than 50%, a light confining effect is decreased, and therefore efficiency is lower than that of the first embodiment.

Also, in the third comparison example with a less number of V grooves 82, light not entering the light guide plate 63 but passing through the V grooves 82 is further less than that of the second comparison example. However, the ratio of frequency of the inclination angle of 30° in the inclination angle frequency distribution is further decreased to decrease the light confining effect, and therefore efficiency is lower than that of the first embodiment.

Therefore, in one or more embodiments of the present invention, the directivity conversion pattern 75 (or the V grooves 76) are formed so as to have uniform depth and height and be in parallel to the inclined surface 73 of the light introducing part 69. With this, every light from light incident surface can be confined, and therefore light from the point light source 62 can be made less prone to leak. Also, the inclination angle frequency distribution of the directivity conversion pattern in a predetermined region can be such that a frequency of the inclination angle of 30° occupies 50% or more of the total, and therefore efficiency of the surface light source device can be easily increased.

Second Embodiment

Figure 42A:
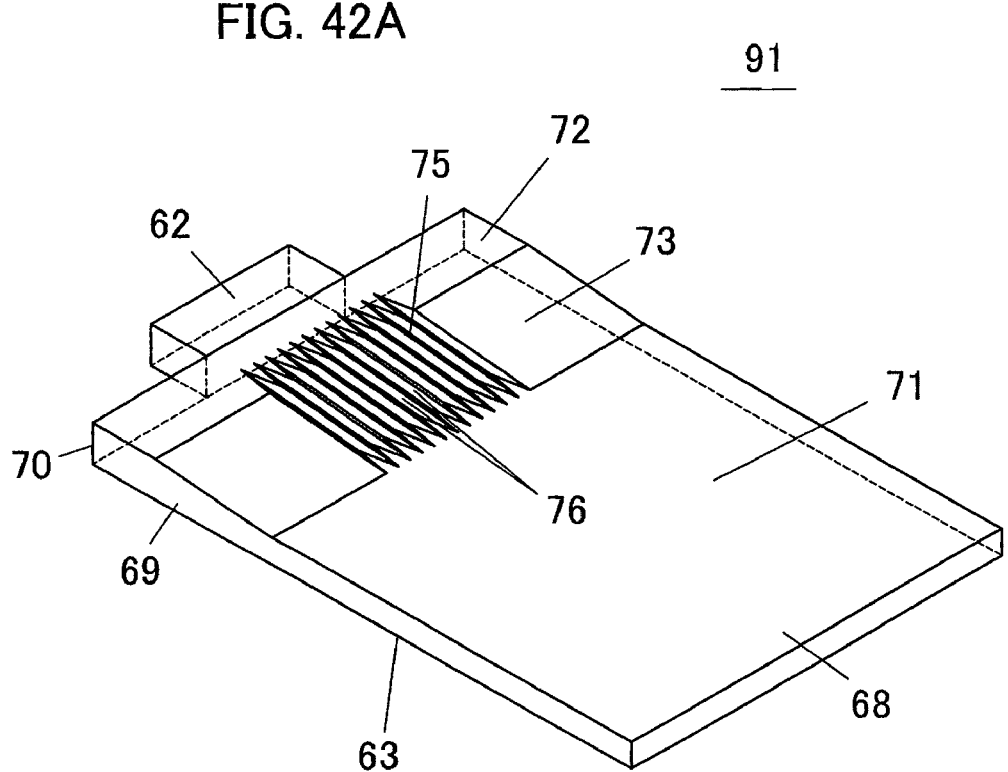
FIG. 42A is a perspective view of a surface light source device according to a second embodiment of the present invention.
Figure 42B:
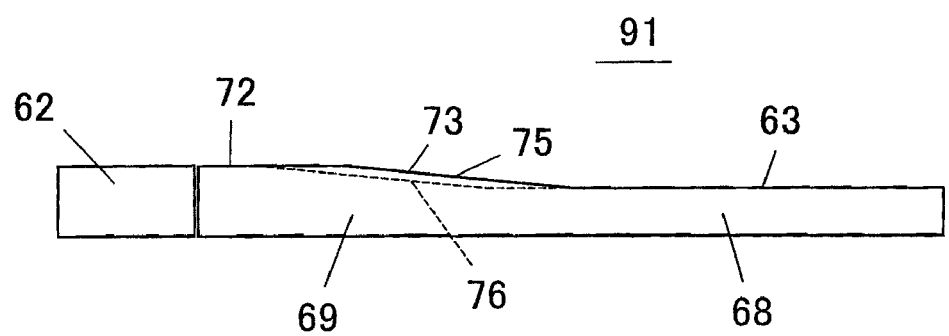
FIG. 42B is a side view of the surface light source device depicted in FIG. 42A according to the second embodiment of the present invention.

FIG. 42A is a perspective view of a surface light source device 91 according to a second embodiment of the present invention, and FIG. 42B is a side view thereof. The surface light source device 91 of the second embodiment has a feature in which an upper end of the V grooves 76 configuring the directivity conversion pattern 75 does not reach an end of the horizontal surface 72 on a light incidence end face side. According to this embodiment, because the horizontal surface 72 remains between the upper end of the V grooves 76 and the light incidence end face 70, a metal mold for molding the light guide plate 63 can be easily manufactured.

Third Embodiment

Figure 43:
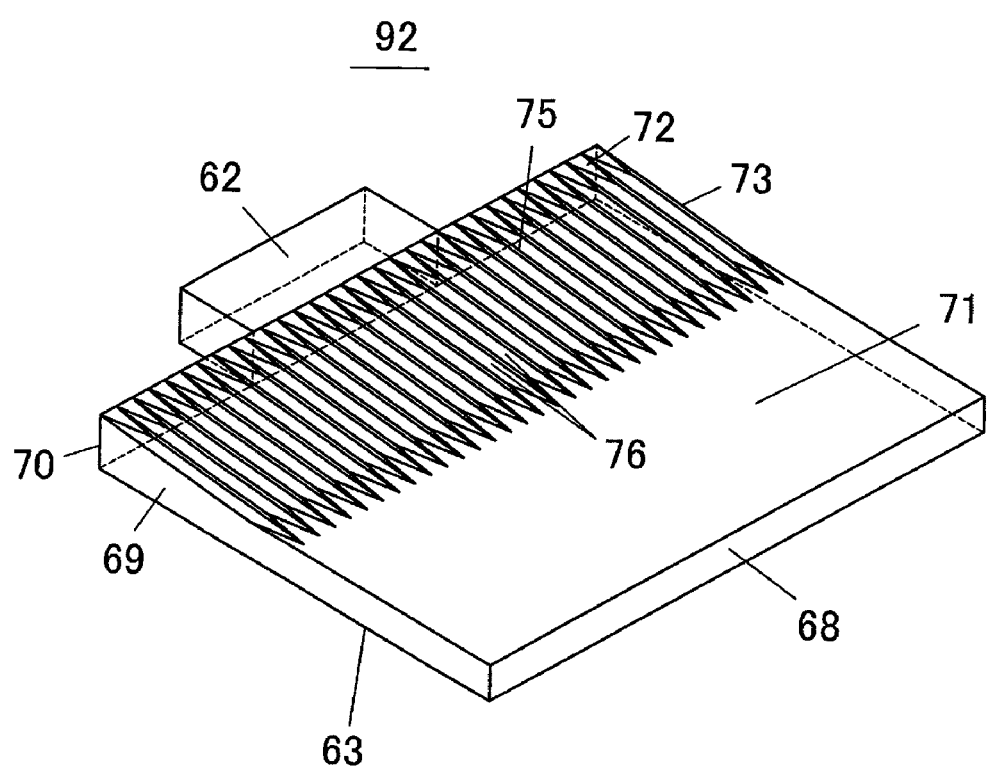
FIG. 43 is a perspective view of a surface light source device according to a third embodiment of the present invention.

FIG. 43 is a perspective view of a surface light source device 92 according to a third embodiment of the present invention. The surface light source device 92 of the third embodiment has a feature in which the directivity conversion pattern 75 is provided not only in a region immediately before the point light source 62 but over the entire width of the inclined surface 73 and the horizontal surface 72. According to this embodiment, the point light source 62 can be placed at an arbitrary position along the light incidence end face 70. Therefore, versatility of the light guide plate 63 can be achieved, and it is possible to eliminate the need of redesigning the light guide plate 63 depending on the number or position of the point light source, or remanufacturing a metal mold for molding.

In the case of this embodiment, in place of a point light source, a linear light source can be used, such as a cold-cathode tube.

Fourth Embodiment

Figure 44:
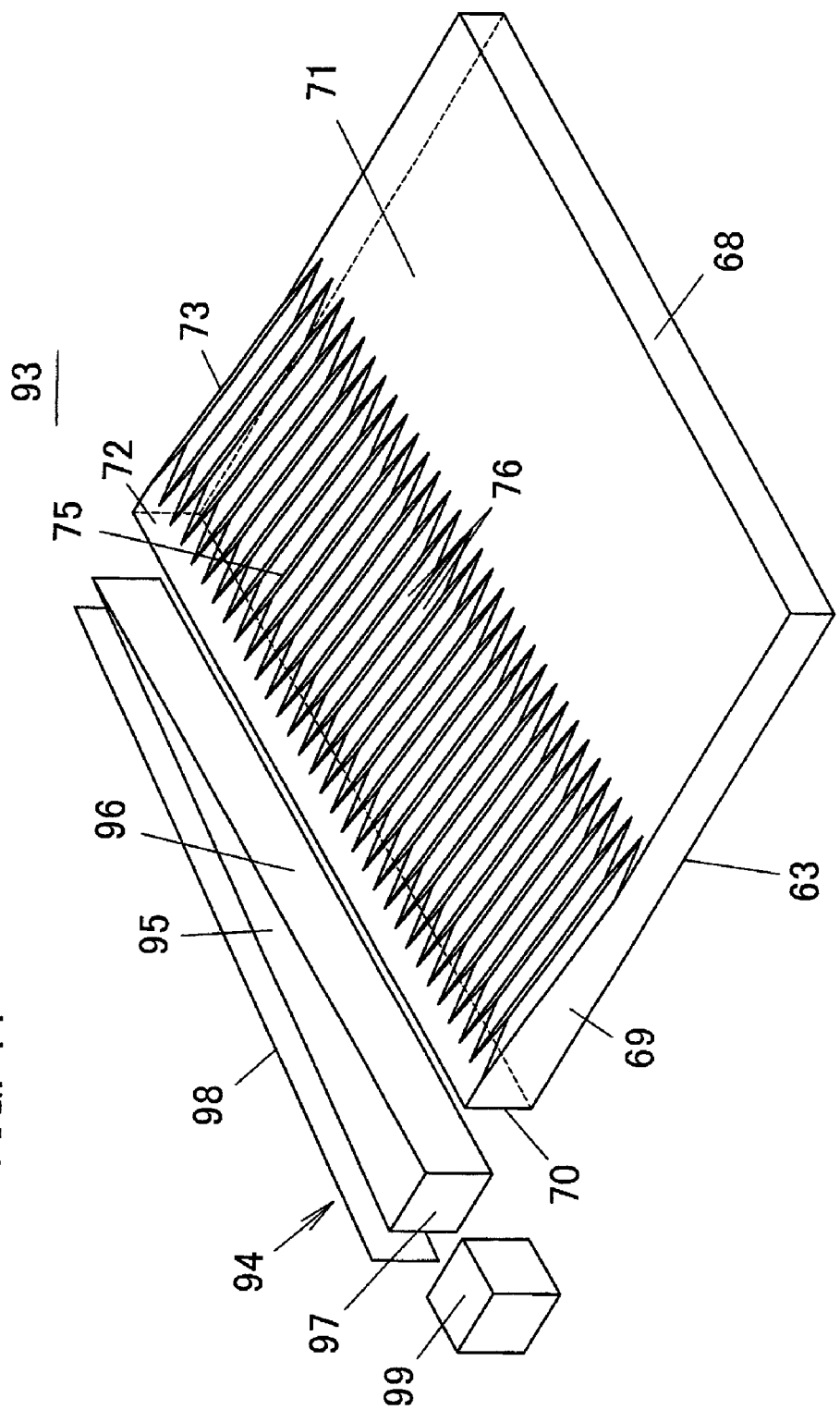
FIG. 44 is a perspective view of a surface light source device according to a fourth embodiment of the present invention.

FIG. 44 is a perspective view of a surface light source device 93 according to a fourth embodiment of the present invention. In the surface light source device 93 of the fourth embodiment, the inclined surface 73 is provided over the entire width of the inclined surface 73. Also, a linear light source 94 is provided at a position facing the light incidence end face 70.

The linear light source 94 is configured of a wedge-shaped light guide body 95, a reflective sheet 98, and a light-emitting source 99. The wedge-shaped light guide body 95 is made of transparent resin or glass having a high refractive index formed in a wedge shape, and has a light-emitting surface 96 that emit light faces the light incidence end face 70 of the light guide plate 63. The reflective sheet 98 is formed of a white sheet or the like, and faces a surface opposite to the light-emitting surface 96 of the wedge-shaped light guide body 95. The light-emitting source 99 is a point light source, such as an LED, and faces an incident surface 97 of the wedge-shaped light guide body 95. Thus, light emitted from the light-emitting source 99 enters the wedge-shaped light guide body 95 from the incident surface 97, and is guided in the wedge-shaped light guide body 95 with repeated total reflections from the light-emitting surface 96 and its opposite surface. Every time the light guided in the wedge-shaped light guide body 95 is totally reflected from the light-emitting surface 96 and its opposite surface, an incident angle to the light-emitting surface 96 is decreased. When the incident angle to the light-emitting surface 96 is smaller than the critical angle of total reflection, the light is emitted from the light-emitting surface 96. As a result, the entire light-emitting surface 96 emits light, and the light emitted from the light-emitting surface 96 enters the light guide plate 63 from the light incidence end face 70. Note that a prism sheet may be provided between the light-emitting surface 96 and the light incidence end face 70 so as to arrange the directions of exit light beams from the light-emitting surface 96 in parallel to each other.

Fifth Embodiment

Figure 45:
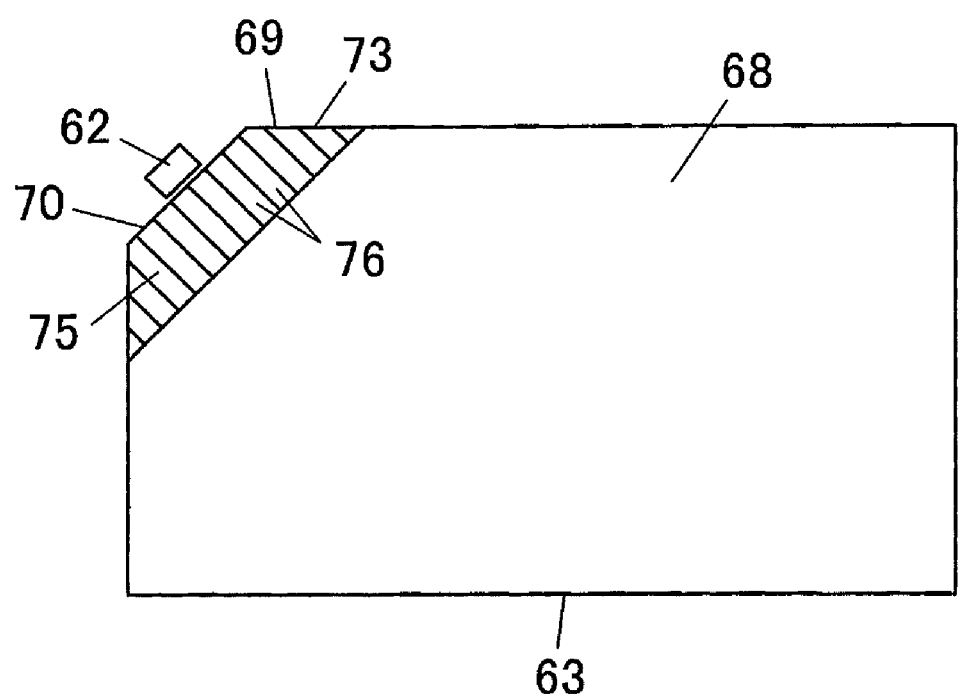
FIG. 45 is a schematic plan view of a surface light source device according to a fifth embodiment of the present invention.

FIG. 45 is a schematic plan view of a surface light source device 101 according to a fifth embodiment of the present invention. In this surface light source device 101, the light incidence end face 70 is formed by obliquely cutting a corner portion of the light guide plate 63, and the point light source 62 is disposed so as to face the light incidence end face 70. In a region adjacent to the light incidence end face 70 of the light guide plate 63, the point light source 62 with its surface as the inclined surface 73 is provided. On the inclined surface 73, the directivity conversion pattern 75 is formed. The directivity conversion pattern 75 is configured of the V grooves 76 arranged in parallel to each other, and the V grooves 76 extend in a direction perpendicular to the light incidence end face 70.

Sixth Embodiment

Figure 46:
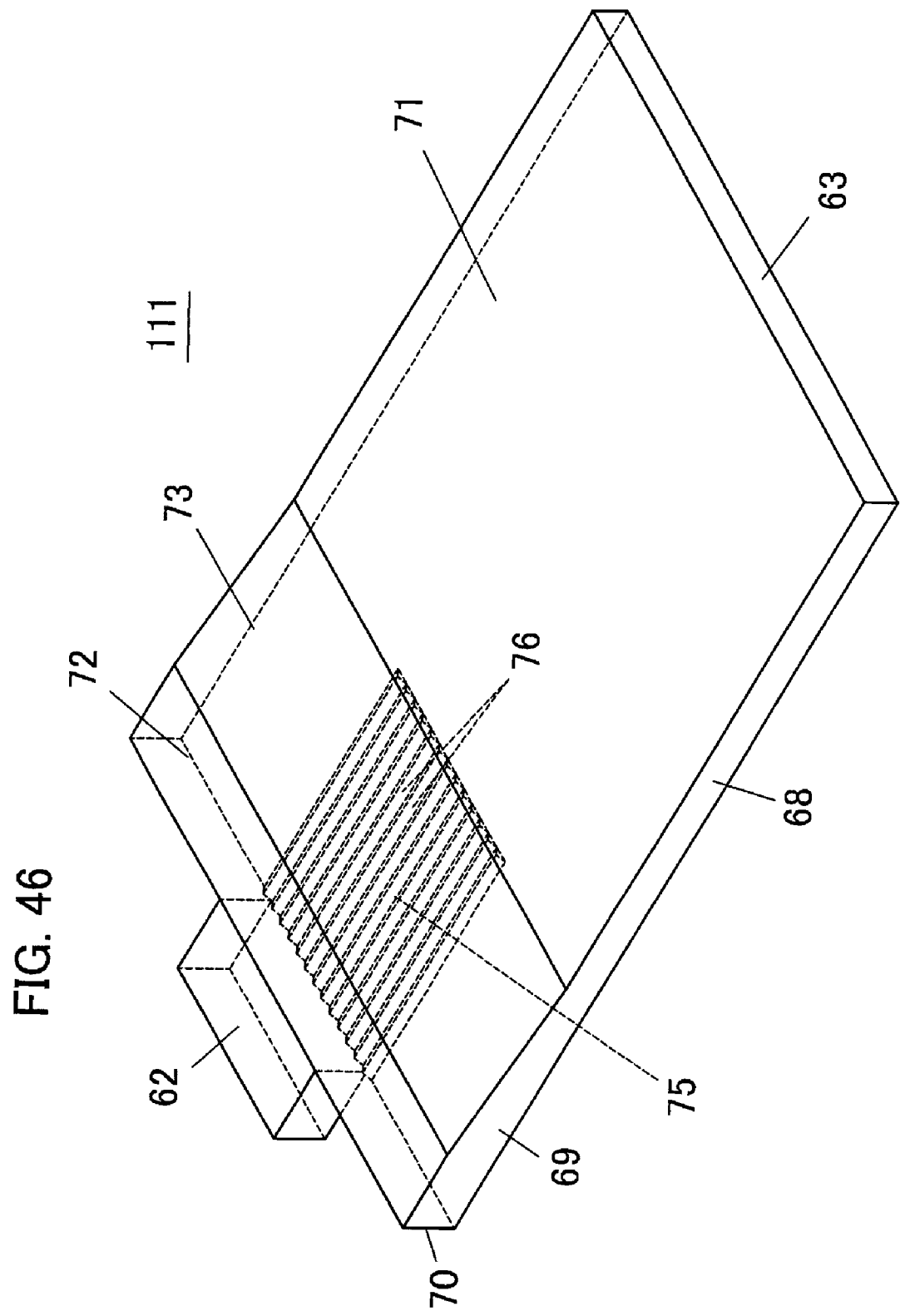
FIG. 46 is a perspective view of a surface light source device according to a sixth embodiment of the present invention.
Figure 47A:
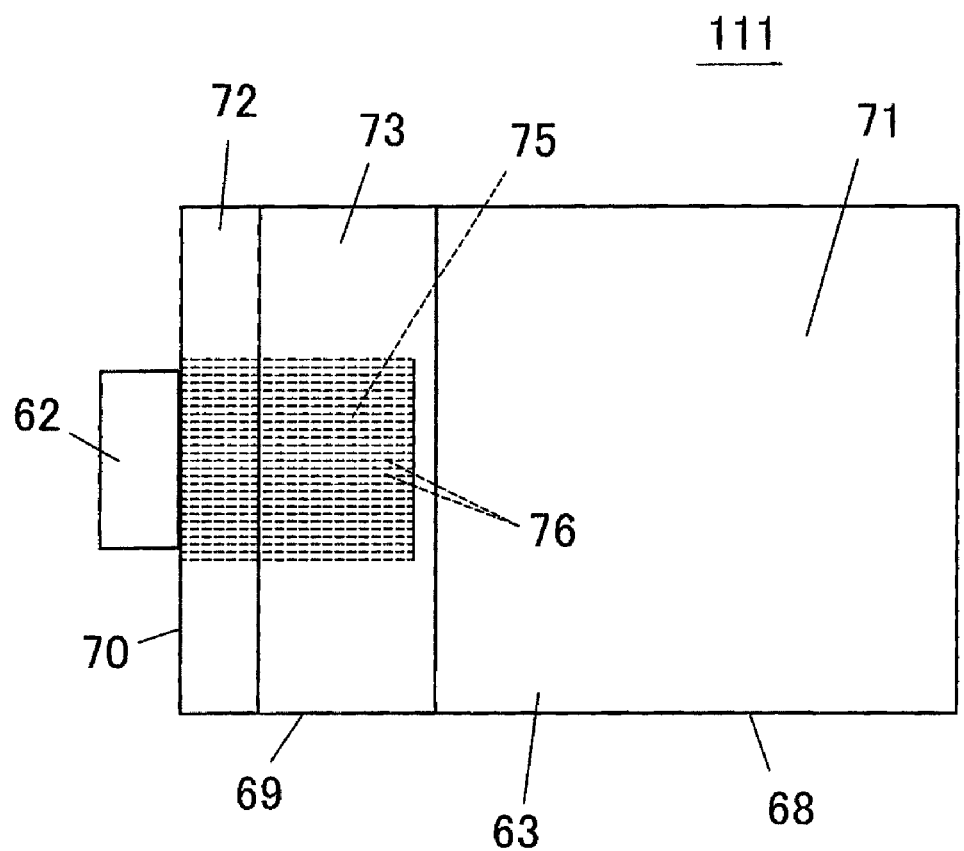
FIG. 47A is a plan view of the surface light source device according to the sixth embodiment of the present invention.
Figure 47B:
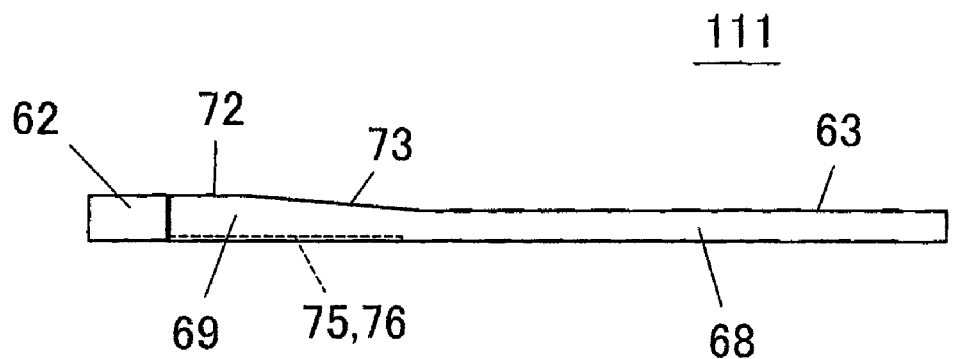
FIG. 47B is a side view of the surface light source device depicted in FIG. 47A according to the sixth embodiment of the present invention.

FIG. 46 is a perspective view of a surface light source device 111 according to a sixth embodiment of the present invention. FIG. 47A is a plan view of such surface light source device 111, and FIG. 47B is a side view thereof. In this surface light source device 111, the inclined surface 73 is provided on a surface on the same side of the light exit surface 71 of the light guide plate 63, and the directivity conversion pattern 75 is provided on a surface opposite to the surface where the inclined surface 73 is provided. As with the case of the first embodiment, the directivity conversion pattern 75 has the plurality of V grooves 76 extending in a direction perpendicular to the light incidence end face 70 arranged in parallel to each other, but is formed on a flat rear surface of the light guide plate 63.

In the case of this embodiment, a part of light entering the light introducing part 69 is totally reflected from the inclined surface 73, is totally reflected from the directivity conversion pattern 75 formed on its opposite surface, and then enters the inclined surface 73 again to be totally reflected from the inclined surface 73 to be introduced to the light guide plate body 68.

Also in sixth embodiment, operations and effects similar to those of the first embodiment can be achieved. However, there are differences depending on the difference in position of the directivity conversion pattern 75, and therefore those different from the first embodiment are described.

First, regarding the light confining principle, there is a difference in change of the directivity characteristic. In the first embodiment, the directivity characteristic at the time of primary incidence and secondary incidence of light to the inclined surface 73 is changed as G1→G6→G8 (or G1→G6→G9) in FIG. 15 and FIG. 16. By contrast, in the case of the sixth embodiment, because the directivity conversion pattern 75 is provided on a surface opposite to the inclined surface 73, the directivity characteristic is sequentially changed as G1→G5→G6→G7→G8 (or G1→G5→G6→G7→G9) in FIG. 15 and FIG. 16.

Figure 48A:
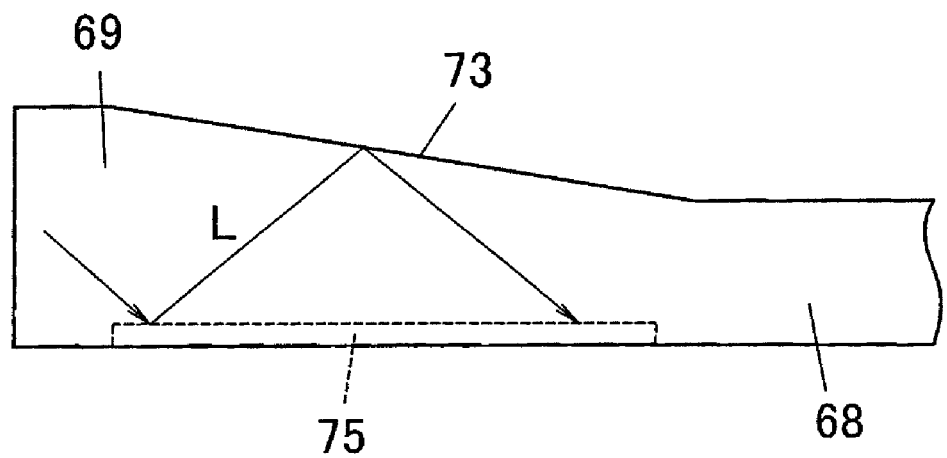
FIGS. 48A and 48B are diagrams for finding a positional condition of a directivity conversion pattern according to one or more embodiments of the present invention.
Figure 48B:
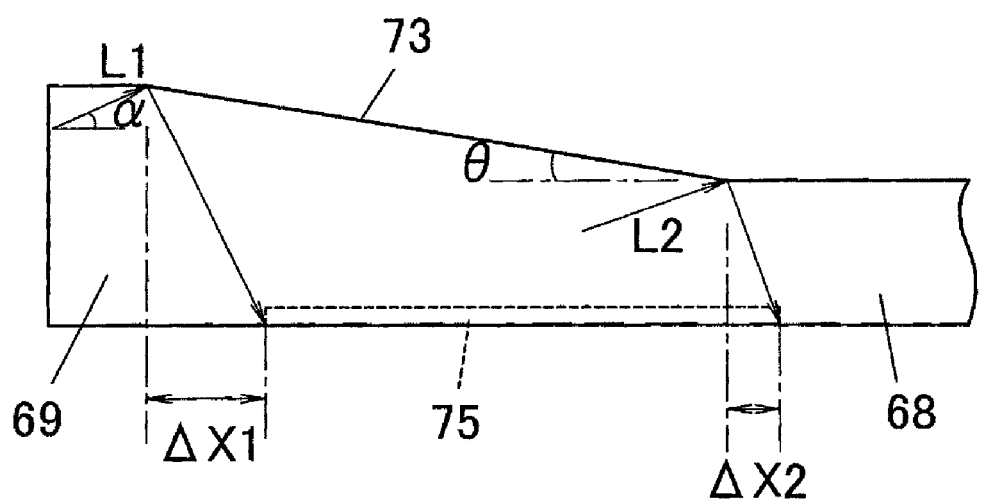

Next, in the first embodiment, the conditions that a part of light enters the inclined surface 73 twice or more are represented by Equation 9 and Equation 10. In the sixth embodiment, a further condition is added to these conditions above. FIG. 48A and FIG. 48B are schematic diagrams for describing this condition. As depicted in FIG. 48A, when light in the light introducing part 69 enters the directivity conversion pattern 75 before entering the inclined surface 73, because light directivity characteristic is not change in the directivity conversion pattern 75, leakage of light cannot be suppressed. Therefore, as depicted in FIG. 48B, the range of the directivity conversion pattern 75 is required to be determined so that light enters the inclined surface 73 earlier than the directivity conversion pattern 75. As depicted in FIG. 48B, it is set that the directivity conversion pattern 75 starts from a position where light reflected at the upper end of the inclined surface 73 enters the rear surface and the directivity conversion pattern 75 ends at a position where the light reflected at the lower end of the inclined surface 73 enters the rear surface. Thus, when a distance between the upper end of the inclined surface 73 and a starting edge of the directivity conversion pattern 75 is taken as ΔX1 and a distance between the lower end of the inclined surface 73 and an ending edge of the directivity conversion pattern 75 is taken as ΔX2, both being viewed from a direction perpendicular to the light guide plate 63, $$\Delta X1 = T \cdot \tan(90° - \alpha - 2\theta) \quad \text{(Equation 12)}$$
$$= T \cdot \cot(\alpha + 2\theta),$$

and $$\Delta X2 = t \cdot \tan(90° - \alpha - 2\theta) \quad \text{(Equation 13)}$$
$$= t \cdot \cot(\alpha + 2\theta).$$

Here, α=arcsin(1/n), n is a refractive index of the light guide plate material, θ is an inclination angle of the inclined surface 73, T is a maximum thickness of the light introducing part 69, and t is a thickness of the light guide plate body 68.

Figure 49:
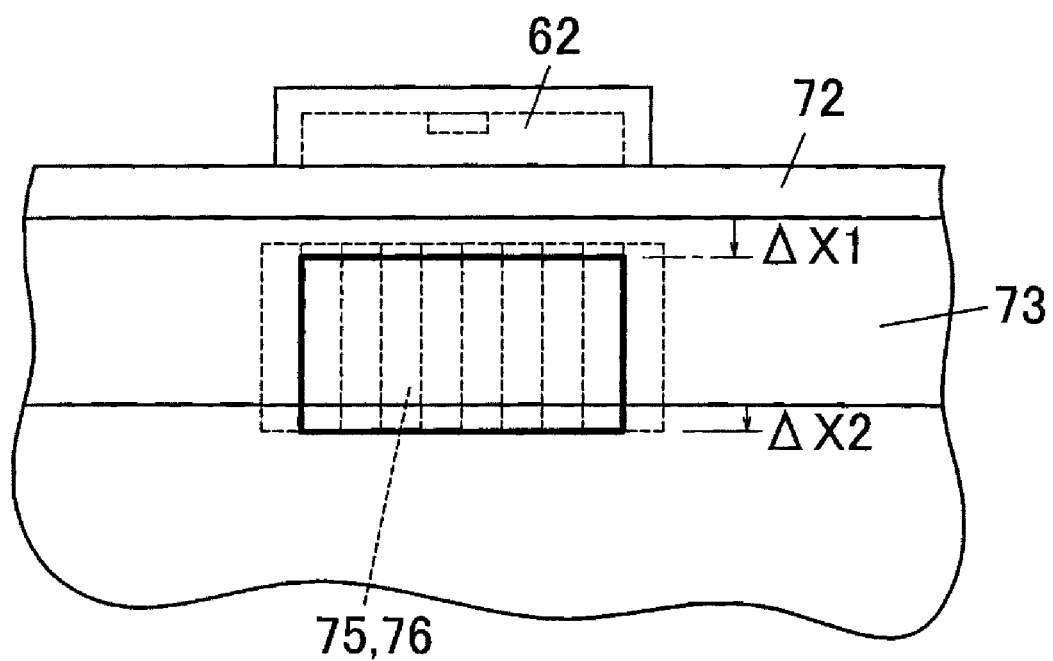
FIG. 49 is a schematic diagram of a region for calculating an inclination angle frequency distribution according to one or more embodiments of the present invention.

Furthermore, in the case of the sixth embodiment, a predetermined region for calculating an inclination angle frequency distribution is a region surrounded by a bold solid line in FIG. 49. This region is represented as below by using ΔX1 and ΔX2 of Equation 12 and Equation 13. That is, the predetermined region is between a position shifted from the upper end of the inclined surface 73 to a side opposite to the point light source 62 by ΔX1 and a position shifted from the lower end of the inclined surface 73 to a side opposite to the point light source 62 by ΔX2 when viewed from a direction perpendicular to the light guide plate 63, and has a width equal to that of the light exit window 67 of the point light source 62. And, if the inclination angle frequency distribution of the directivity conversion pattern 75 in this region has a frequency in a range of inclination angles equal to or larger than 15.5° and equal to or smaller than 43.5° occupying 50% or more of the total, good efficiency can be achieved.

Other Embodiments

FIG. 50A to FIG. 50C, FIG. 51A to FIG. 51C, and FIG. 52A and FIG. 52B are side views of the light guide plate 63 having other shapes. Even when these light guide plates are used, the effects of one or more embodiments of the present invention can be achieved.

Figure 50A:
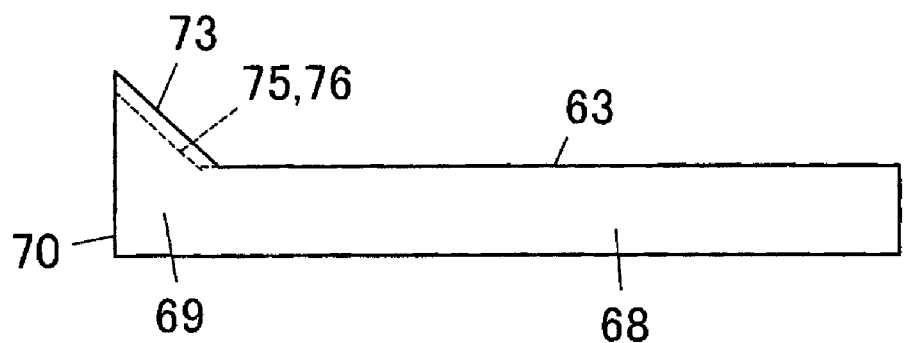
FIGS. 50A to 50C are side views of light guide plates of different shapes according to one or more embodiments of the present invention.

In the one depicted in FIG. 50A, the horizontal surface 72 is omitted, and the upper end of the inclined surface 73 is positioned at an end on a light incidence end face side.

Figure 50B:
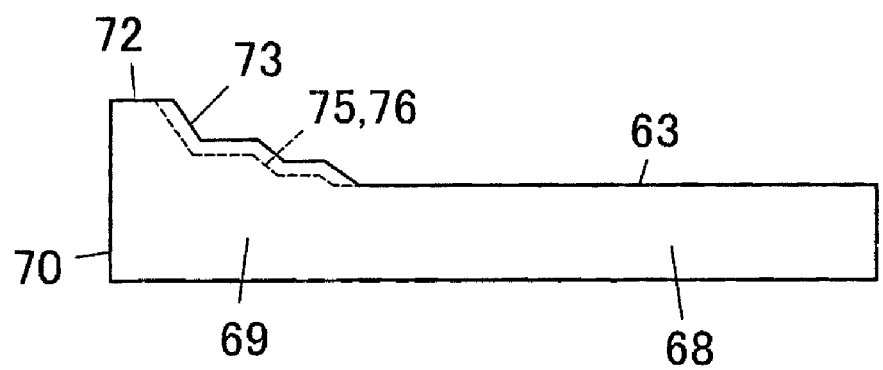

In the one depicted in FIG. 50B, a plurality of stages are provided on the inclined surface 73.

Figure 50C:
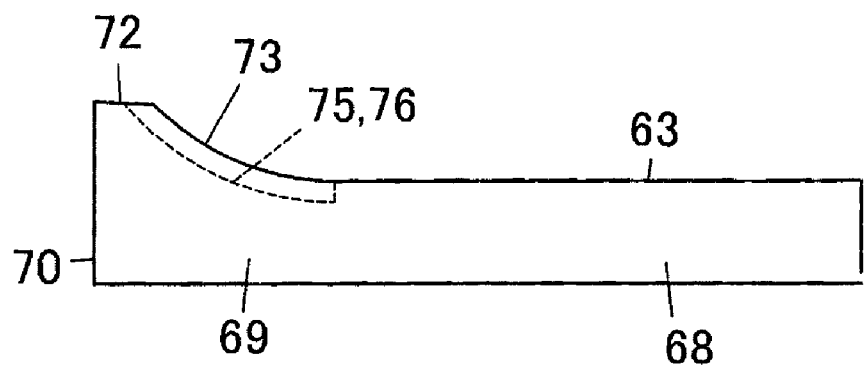

In the one depicted in FIG. 50C, the inclined surface 73 is shaped in a curved surface.

Figure 51A:
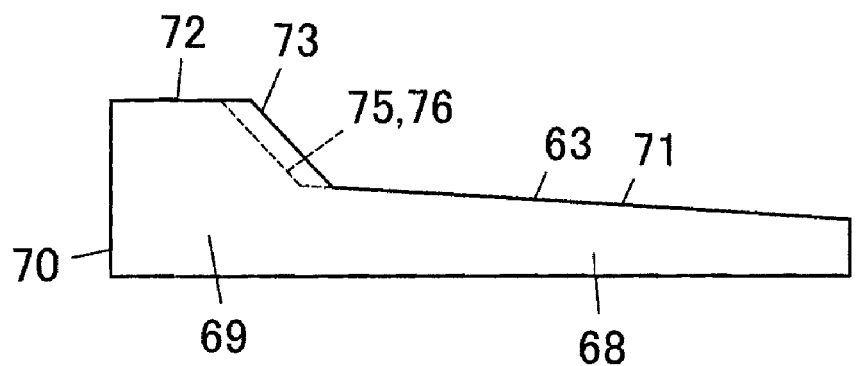
FIGS. 51A to 51C are side views of light guide plates of further different shapes according to one or more embodiments of the present invention.

In the one depicted in FIG. 51A, a surface of the light guide plate body 68 on a light exit surface 71 side is inclined, thereby forming the light guide plate body 68 in a tapered shape.

Figure 51B:
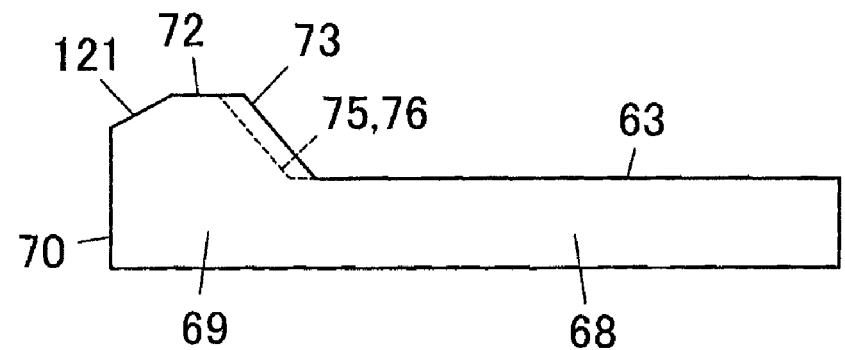
Figure 51C:
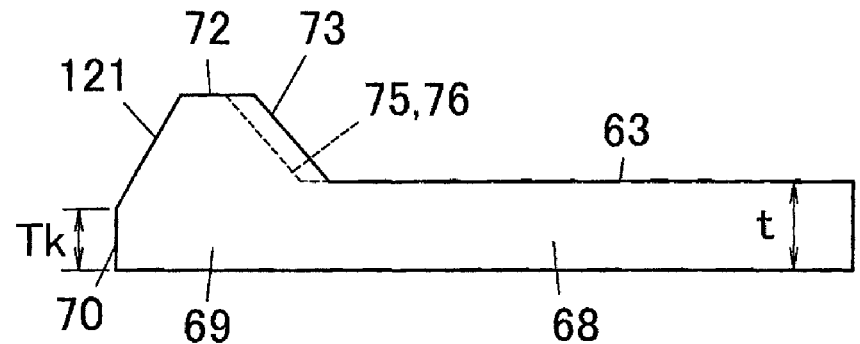

In the one depicted FIG. 51B and FIG. 51C, an inverted inclined part 121 is provided with an end of the upper surface of the light introducing part 69 on a light incidence end face 70 side being inclined in a direction opposite to the inclined surface 73. In particular, in FIG. 51C, by providing the inverted inclined part 121, a height Tk of the end of the light introducing part 69 is lower than the thickness t of the light guide plate body 68.

Figure 52A:
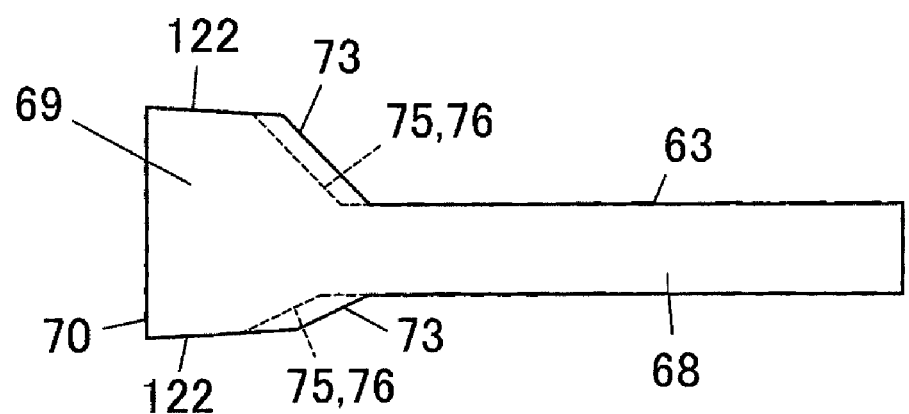
FIGS. 52A and 52B are side views of light guide plates of still further different shapes according to one or more embodiments of the present invention.

In the one depicted in FIG. 52A, the inclined surface 73 is provide on both upper and lower surfaces of the light introducing part 69, and the directivity conversion pattern 75 is provided on one of these inclined surfaces 73 or both of the inclined surfaces 73.

Figure 52B:
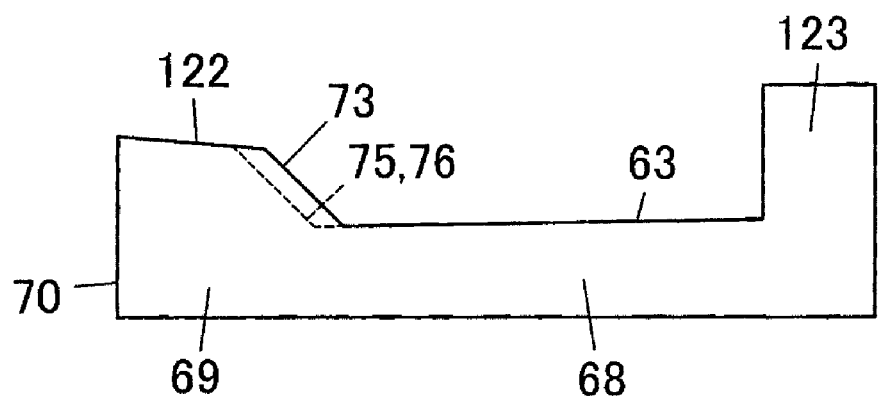

Furthermore, as depicted in FIG. 52B, a part 123 larger than the thickness of the light introducing part 69 may be provided to a part of the light guide plate body 68.

Still further, as depicted in FIG. 52A and FIG. 52B, a surface serving as the horizontal surface 72 may be mildly inclined to form a mildly inclined surface 122.

REFERENCE MARKS IN THE DRAWINGS

61, 91, 92, 93 surface light source device
62 point light source
63 light guide plate
67 light exit window
68 light guide plate body
69 light introducing part
70 light incidence end face
72 horizontal surface
73 inclined surface
75 directivity conversion pattern
76 V groove
77 inclined surface
95 wedge-shaped light guide body
96 light-emitting surface
99 light-emitting source While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A surface light source device, comprising:
a light source; and
a light guide plate introducing light of the light source from a light incidence surface and letting the light exit to outside from the light exit surface,
wherein the light source is provided at a position where a light-emitting surface thereof faces the light incidence surface of the light guide plate, and
wherein the light guide plate comprises:
a light introducing part for confining the light from the light source entering from the light incidence surface; and
a light guide plate body having a thickness smaller than a maximum thickness of the light introducing part, being provided so as to continue to the light introducing part, and letting the confined light exit to outside from the light exit surface by light emitting means,
wherein a ratio of the thickness of the light guide plate body with respect to the maximum thickness of the light introducing part is equal to or lower than 0.8,
wherein the light introducing part has an inclined surface inclined from a surface of a part having a thickness larger than the light guide plate body toward an end of a surface of the light guide plate body, the inclined surface is on a surface on a light exit side of the light guide plate or a surface opposite thereto,
wherein an inclination angle of the inclined surface is larger than an inclination angle formed with a line segment connecting an upper end of the inclined surface and an end of a surface opposite to the inclined surface of the light guide plate body on a side away from the light source in a vertical section of the inclined surface along a maximum inclination direction, and the inclination angle is smaller than 90°,
wherein the light guide plate has a directivity conversion pattern on the surface on the light exit side or the surface opposite thereto, the directivity conversion pattern for converting a directivity spread of the light entering the light introducing part in a thickness direction of the light guide plate to a directivity characteristic inclined toward a direction parallel to a surface direction of the light guide plate,
wherein the inclined surface and the directivity conversion pattern are disposed so that a part of the light entering the light introducing part is reflected simultaneously or alternately from the inclined surface and the directivity conversion pattern to be guided in the light guide plate, and
wherein a length of the inclined surface in an inclined direction is defined so that a part of the light entering the light introducing part enters the inclined surface at least twice.

2. The surface light source device according to claim 1,
wherein the directivity conversion pattern is formed on the inclined surface; and
wherein an inclination angle frequency distribution of the directivity conversion pattern in a region positioned between an upper end edge and a lower end edge of the inclined surface, and having a width equal to the light-emitting surface of the light source, has a frequency in a range of inclination angles equal to or larger than 15.5° and equal to or smaller than 43.5° occupying 50% or more of a total.

3. The surface light source device according to claim 1,
wherein the directivity conversion pattern is formed on a surface opposite to the inclined surface of the light guide plate; and
wherein an inclination angle frequency distribution of the directivity conversion pattern in a region between a position shifted from the upper end of the inclined surface to a side opposite to the light source by $T \cdot \tan(90° - \alpha - 2\theta)$ and a position shifted from a lower end of the inclined surface to the side opposite to the light source by $T \cdot \tan(90° - \alpha - 2\theta)$ (where T is a maximum thickness of the light introducing part, and t is a thickness of the light guide plate body, $\alpha$ is a critical angle of total reflection of a light guide plate material, and θ is the inclination angle of the inclined surface) when viewed from a direction perpendicular to the light exit surface, and the region also having a width equal to the light-emitting surface of the light source, has a frequency in a range of inclination angles equal to or larger than 15.5° and equal to or smaller than 43.5° occupying 50% or more of a total.

4. The surface light source device according to claim 1, wherein the directivity conversion pattern has a depth and height constant with respect to a surface of the inclined surface.

5. The surface light source device according to claim 1,
wherein the directivity conversion pattern is formed of recessed or projecting unit patterns; and
wherein, when viewed from a direction perpendicular to the light exit surface, the unit patterns extend in a direction perpendicular to the light incident surface and are arranged in parallel to each other in a direction parallel to the light-emitting surface.

* * * * *